United States Patent
Akagi et al.

(10) Patent No.: US 6,434,096 B1
(45) Date of Patent: Aug. 13, 2002

(54) OPTICAL INFORMATION RECORDING/REPRODUCING DEVICE

(75) Inventors: Noritaka Akagi, Osaka; Tsutomu Kai, Katano; Shuichi Yoshida, Osaka; Kiyoshi Masaki, Amagasaki; Teruyuki Naka, Izumi; Yasuo Kashiwagi; Isao Takemoto, both of Saijo, all of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/674,023

(22) PCT Filed: Feb. 24, 2000

(86) PCT No.: PCT/JP00/01080
§ 371 (c)(1),
(2), (4) Date: Oct. 24, 2000

(87) PCT Pub. No.: WO00/51114
PCT Pub. Date: Aug. 31, 2000

(30) Foreign Application Priority Data

Feb. 26, 1999 (JP) .......................................... 11-051857
Feb. 16, 2000 (JP) ........................................ 2000-038631

(51) Int. Cl.$^7$ ................................................ G11B 7/00
(52) U.S. Cl. .............................. 369/44.32; 369/44.28; 369/53.12; 369/53.19
(58) Field of Search .......................... 369/44.11, 44.12, 369/44.27, 44.28, 44.29, 44.32, 44.35, 44.34, 44.41, 47.1, 53.1, 53.12, 53.19, 124.01

(56) References Cited

U.S. PATENT DOCUMENTS

| | | | |
|---|---|---|---|
| 5,532,990 A | * | 7/1996 | Koyama et al. ......... 369/44.32 |
| 5,566,152 A | | 10/1996 | Takamine et al. |
| 5,652,743 A | | 7/1997 | Takamine et al. |
| 6,147,944 A | * | 11/2000 | Kwon et al. ............. 369/44.32 |
| 6,233,208 B1 | * | 5/2001 | Sasaki ..................... 369/44.29 |

FOREIGN PATENT DOCUMENTS

| | | |
|---|---|---|
| JP | 62-73432 | 4/1987 |
| JP | 64-1131 | 1/1989 |
| JP | 1-125733 | 5/1989 |
| JP | 4-19833 | 1/1992 |
| JP | 5-242509 | 9/1993 |
| JP | 6-223384 | 8/1994 |
| JP | 8-273284 | 10/1996 |
| JP | 8-315376 | 11/1996 |
| JP | 6-318331 | 11/1999 |

* cited by examiner

*Primary Examiner*—Muhammad Edun
(74) *Attorney, Agent, or Firm*—Pearne & Gordon LLP

(57) ABSTRACT

In order to correct the change in the offset and amplitude of a tracking error signal because of the change in the position of an object lens from the center of an optical pickup, the offset amount and amplitude value of the tracking error signal with respect to the displacement amount of the object lens from the center of the optical pickup are checked beforehand, and the displacement amount of the object lens is estimated on the basis of a tracking correction signal by using an object lens displacement observer. An offset detection section and an amplitude detection section detect the offset amount and amplitude value of the tracking error signal respectively, and the tracking error signal is corrected by an offset correction circuit and an amplitude correction circuit on the basis of the offset amount and amplitude value having been checked beforehand so that the offset amount and the amplitude value of the tracking error signal become identical to those obtained when the displacement amount of the object lens is zero. In addition, the offset of the tilt error signal depending on the movement direction of the optical pickup 2 is detected and recorded beforehand, and the tilt error signal is corrected on the basis of the above-mentioned recorded offset when a rotation direction detection section detects the moving direction of the optical pickup.

34 Claims, 51 Drawing Sheets

FIG. 6 (a)   GAIN CHARACTERISTIC OF PHASE COMPENSATION FILTER
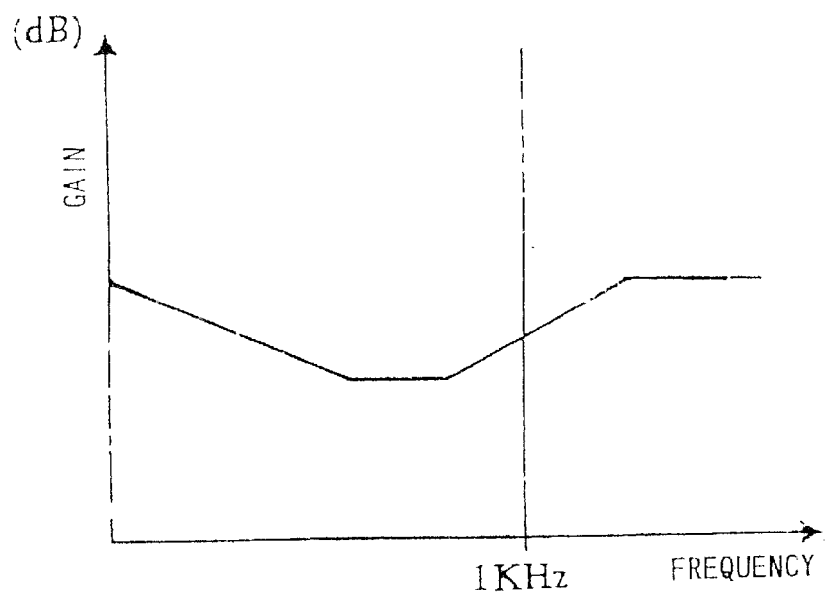
FIG. 6 (b)   PHASE CHARACTERISTIC OF PHASE COMPENSATION FILTER
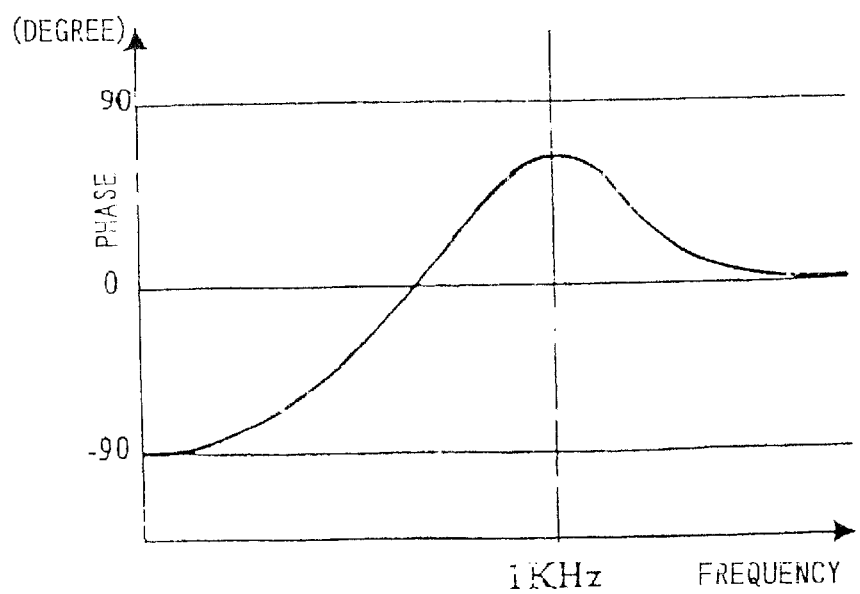

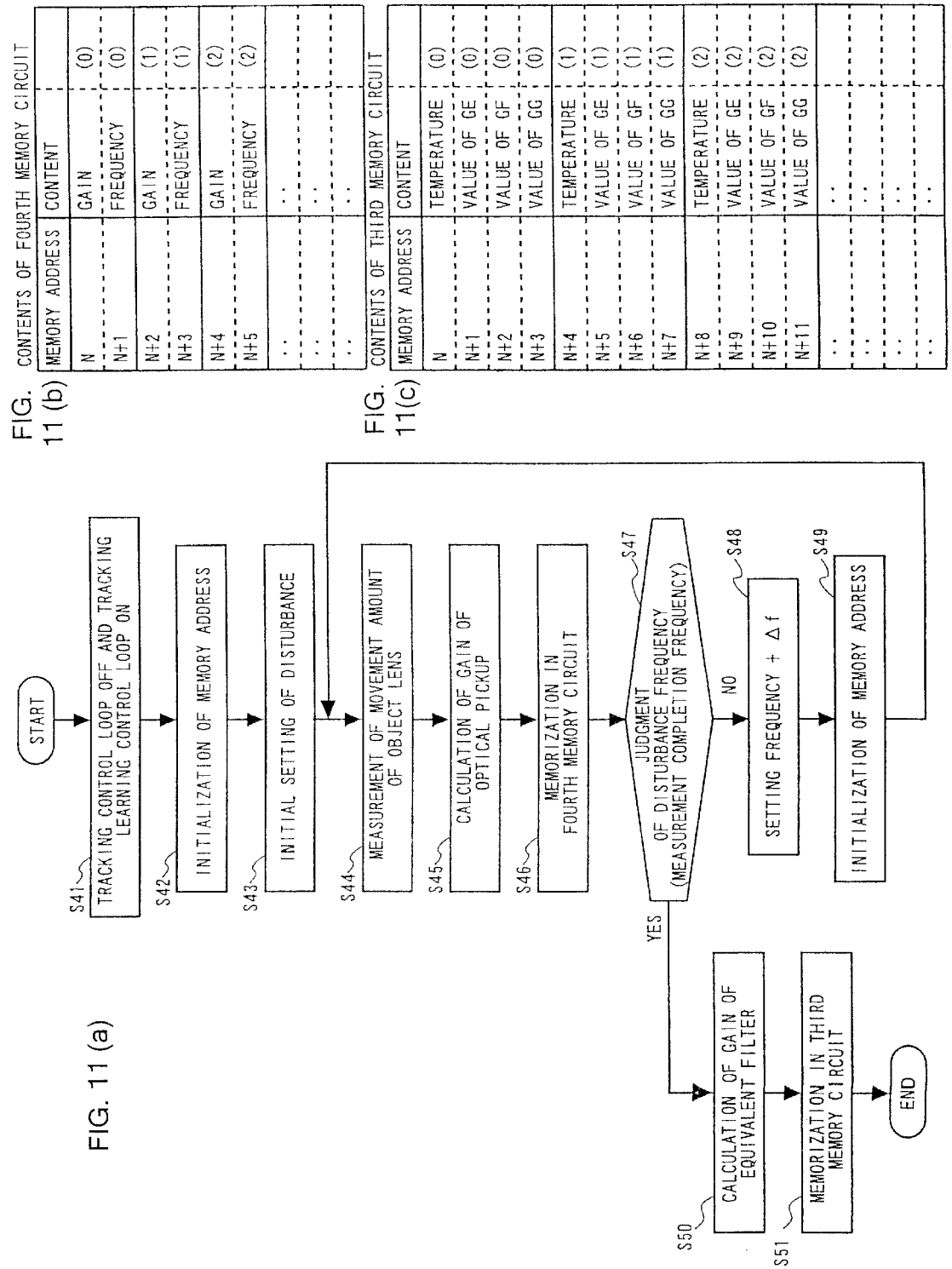

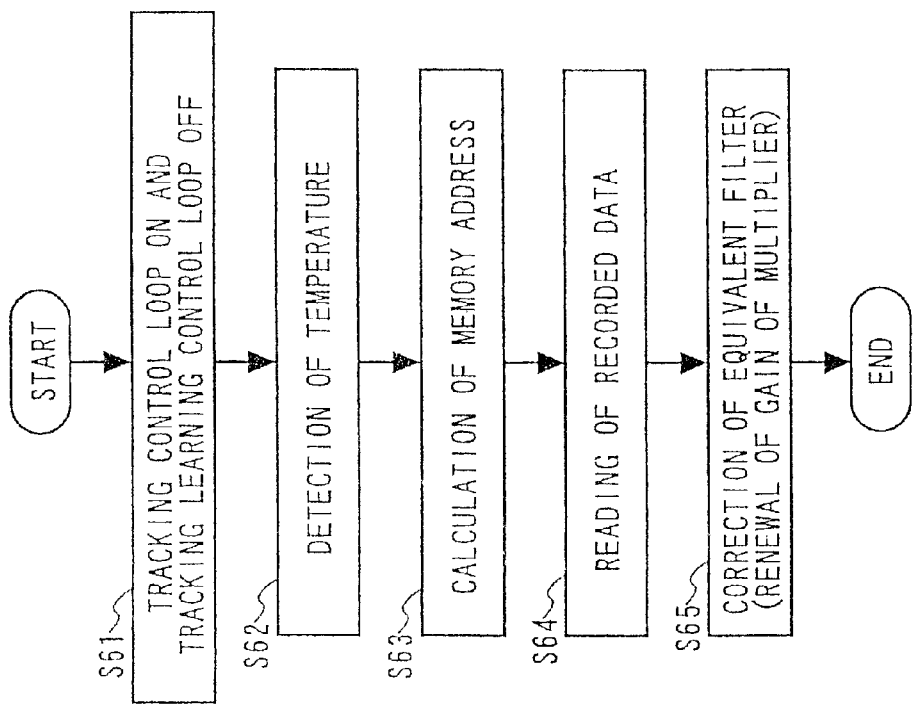

FIG. 15 (a)   CONTENTS OF FIFTH MEMORY CIRCUIT

| MEMORY ADDRESS | CONTENT | |
|---|---|---|
| N | LENS DISPLACEMENT | (0) |
| N+1 | TILT ANGLE | (0) |
| N+2 | OFFSET | (0) |
| N+3 | LENS DISPLACEMENT | (1) |
| N+4 | TILT ANGLE | (1) |
| N+5 | OFFSET | (1) |
| N+6 | LENS DISPLACEMENT | (2) |
| N+7 | TILT ANGLE | (2) |
| N+8 | OFFSET | (2) |
| .. | .. | |
| .. | .. | |
| .. | .. | |

FIG. 15 (b)   CONTENTS OF SIXTH MEMORY CIRCUIT

| MEMORY ADDRESS | CONTENT | |
|---|---|---|
| N | LENS DISPLACEMENT | (0) |
| N+1 | TILT ANGLE | (0) |
| N+2 | AMPLITUDE | (0) |
| N+3 | LENS DISPLACEMENT | (1) |
| N+4 | TILT ANGLE | (1) |
| N+5 | AMPLITUDE | (1) |
| N+6 | LENS DISPLACEMENT | (2) |
| N+7 | TILT ANGLE | (2) |
| N+8 | AMPLITUDE | (2) |
| .. | .. | |
| .. | .. | |
| .. | .. | |

FIG. 23 (a)  GAIN CHARACTERISTIC OF PHASE COMPENSATION FILTER
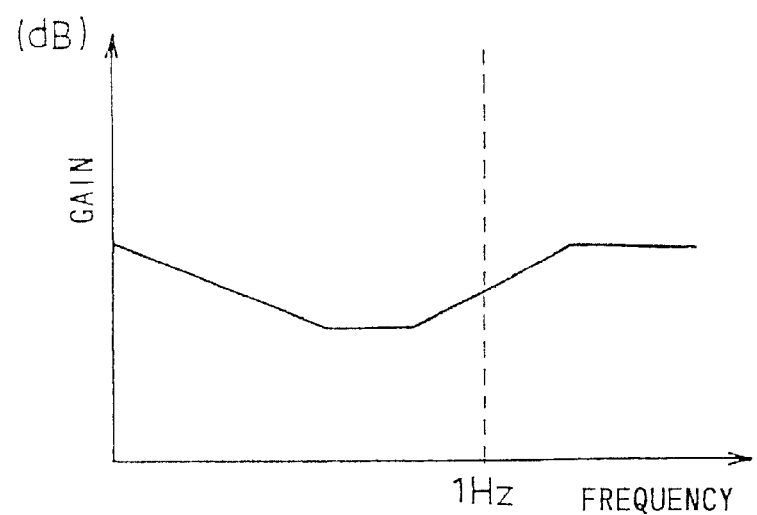
FIG. 23 (b)  PHASE CHARACTERISTIC OF PHASE COMPENSATION FILTER
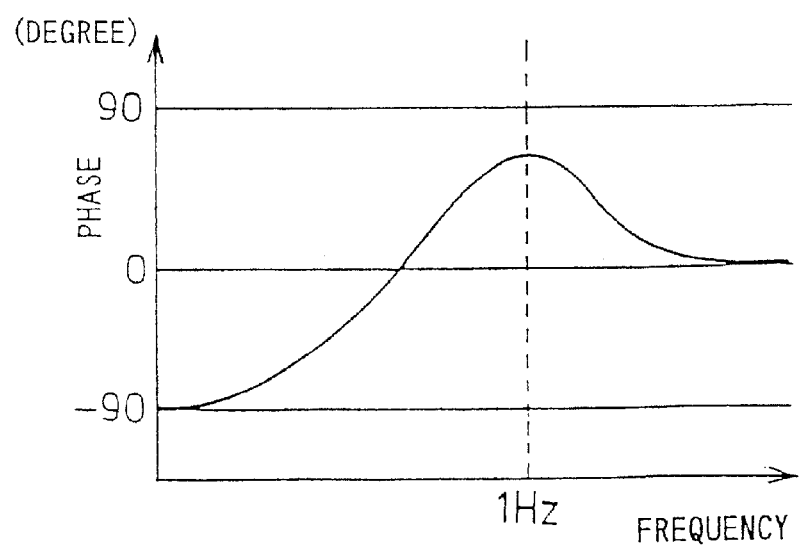

FIG. 26

| MEMORY ADDRESS | MEMORY CONTENT | |
|---|---|---|
| N | AMBIENT TEMPERATURE | (0) |
| N+1 | INNER DIRECTION OFFSET AMOUNT | (0) |
| N+2 | OUTER DIRECTION OFFSET AMOUNT | (0) |
| N+3 | AMBIENT TEMPERATURE | (1) |
| N+4 | INNER DIRECTION OFFSET AMOUNT | (1) |
| N+5 | OUTER DIRECTION OFFSET AMOUNT | (1) |
| N+6 | AMBIENT TEMPERATURE | (2) |
| N+7 | INNER DIRECTION OFFSET AMOUNT | (2) |
| N+8 | OUTER DIRECTION OFFSET AMOUNT | (2) |
| .. | .. | .. |
| .. | .. | .. |
| .. | .. | .. |

FIG. 37
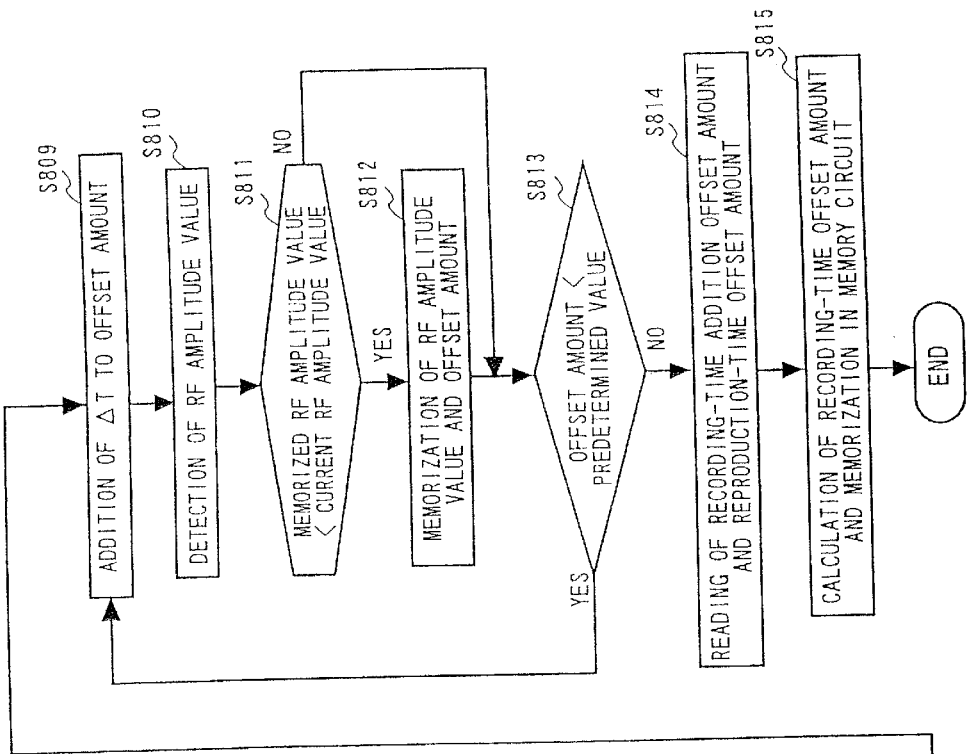
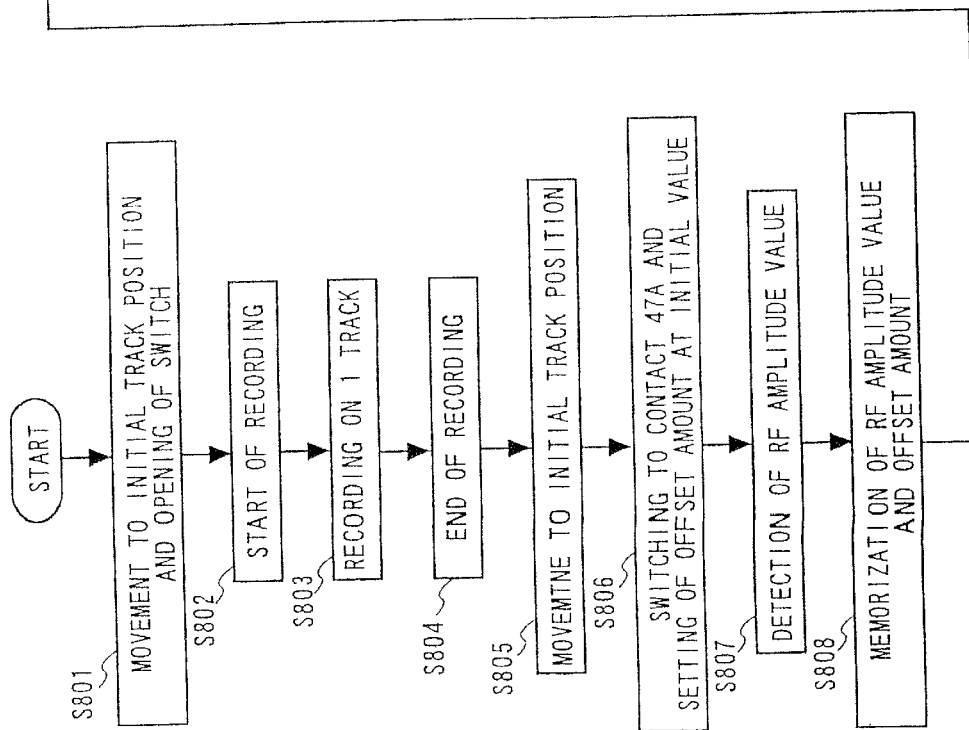

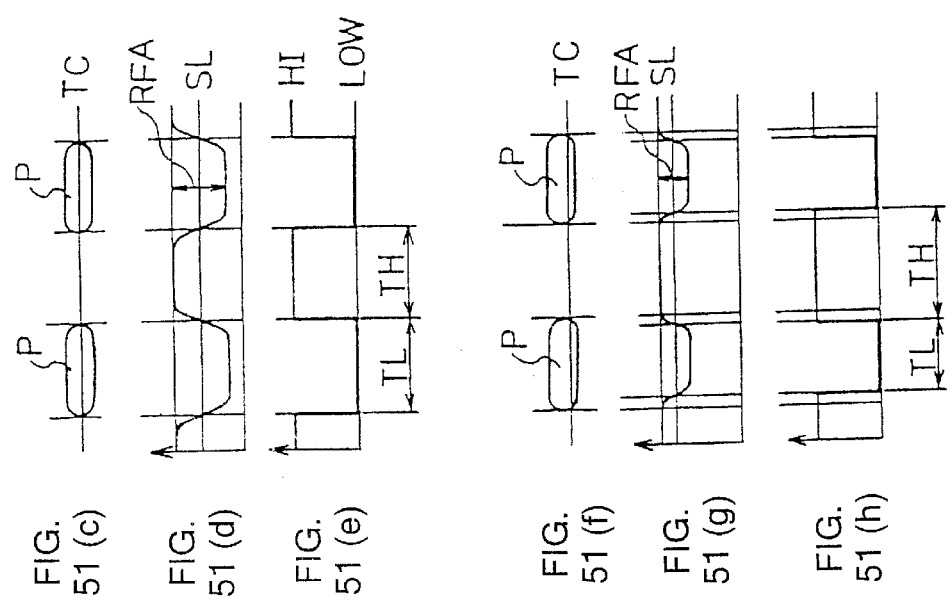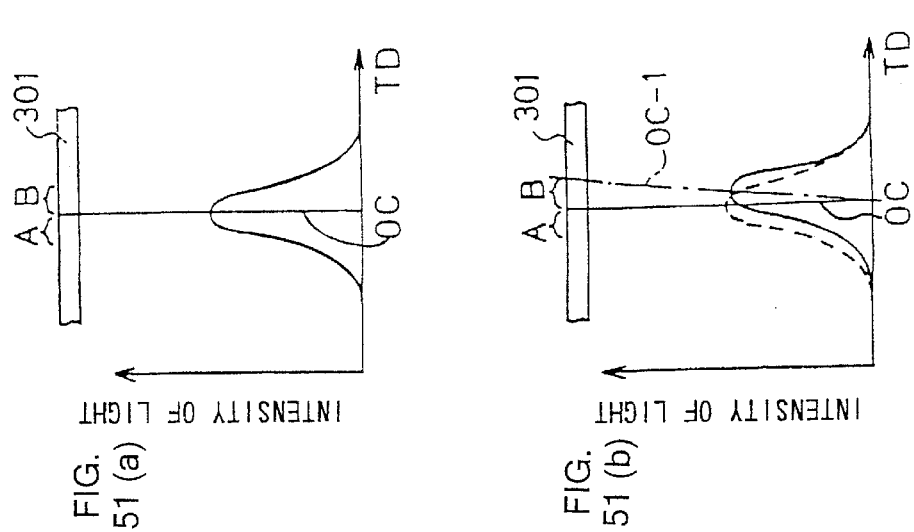

OPTICAL INFORMATION RECORDING/REPRODUCING DEVICE

TECHNICAL FIELD

The present invention relates to an optical information recording and reproducing apparatus for recording or reproducing signals on optical discs by using a light spot.

BACKGROUND ART

In optical information recording and reproducing apparatuses, typified by DVD-R and DVD-RAM apparatuses, a light spot of a diameter of about 0.5 μm is applied to information tracks formed at a pitch of 0.74 μm on a disk to record and reproduce information. When the light spot is applied to the face of the disk, focus control is carried out so that the light spot traces the disk face at an accuracy of about ±0.5 μm or less in a direction perpendicular to the disk face. In addition, tracking control is carried out so that the tracking displacement of the light spot from the information track is about ±0.1 μm or less.

A one-beam push-pull system is available as a conventional method of making a light spot to follow tracks.

A conventional optical information recording and reproducing apparatus by use of this one-beam push-pull system will be described below referring to FIG. 41. FIG. 41 is a block diagram showing the configuration of the above-mentioned conventional optical information recording and reproducing apparatus. In FIG. 41, a disk 2 having helical or concentric information tracks 1, shown magnified, is configured so as to be rotated by a spindle motor 3. Recording and reproduction on the information tracks 1 of the disk 2 are carried out by an optical pickup 4. The optical pickup 4 is provided with a semiconductor laser 5, a collimator lens 6, a beam splitter 7, an object lens 8, a two-part split PD (photodetector) 9 and a tracking actuator 10 used as a lens movement means. The tracking actuator 10 comprises a coil 11 secured to the object lens 8 and a magnet 13 secured to the housing of the optical pickup 4, and the coil 11 is connected to the magnet 13 via a spring 12. When a current flows through the coil 11, an electromagnetic force is generated between the coil 11 and the magnet 13, and the object lens 8 moves in the tracking direction. When the optical pickup 4 is not operating, that is, when no input signal is supplied to the tracking actuator 10, the object lens 8 is designed to stop at the neutral position of the optical pickup 4.

A tracking error detection circuit 14 generates a tracking error signal 101, i.e. the displacement amount of the object lens 8 from the center of the information tracks 1, on the basis of the difference between the outputs of the PD sections of the two-part split PD, and outputs the signal to a tracking control circuit 15. The tracking control circuit 15 outputs a tracking drive signal 103 to a tracking drive circuit 16 on the basis of the tracking error signal. The tracking drive circuit 16 supplies a current depending on the tracking drive signal 103 to the coil 11 of the tracking actuator 10. This circuit loop for the tracking control is referred to as a tracking control loop 201.

Concrete operations of the optical information recording and reproducing apparatus will be described next. The light beam emitted from the semiconductor laser 5 is made parallel light by the collimator lens 6 and converged to the information track 1 of the disk 2 through the beam splitter 7 and the object lens 8. By using part of the light reflected from the disk 2, focus control for moving the object lens 8 vertically is carried out so that the focus position of the light beam focused by the object lens 8 meets the face of the disk 2 at all times. However, the focus control is not described in detail since it does not directly relate to the present invention.

Part of the light reflected from the disk 2 enters the two-part split PD 9 through the object lens 8 and the beam splitter 7. The two-part split PD 9 outputs voltages indicating the amounts of light detected by the respective PD sections. The tracking error detection circuit 14 calculates the difference between the outputs of the two-part split PD 9 and outputs the tracking error signal 101 indicating the positional displacement amount between the focus of the light beam and the information track 1 to the tracking control circuit 15. By the operation of the tracking control loop 201, the tracking control circuit 15 outputs the tracking drive signal 103 to the tracking drive circuit 16 so that the amplitude of the tracking error signal 101 becomes zero, that is, so that the light beam positions at the center of the information track 1. The tracking drive circuit 16 flows a current through the coil 11 to generate an electromagnetic force thereby to move the object lens 8. With this configuration, even if the disk 2 is eccentric, the object lens 8 can be controlled so that the light spot follows the center position of the information track 1 during the rotation of the optical disk 2.

FIG. 42 is a graph showing the change of the tracking error signal with respect to time at a moment when the tracking control loop 201 is switched from its OFF state (a state wherein the tracking control loop 201 does not operate) to its ON state (a state wherein the tracking control loop 201 operates). When the tracking control loop 201 is in the OFF state, no drive force is applied to the tracking actuator 10 shown in FIG. 41; therefore, the object lens 8 is stationary at the neutral position of the optical pickup 4. If there is an eccentricity caused by the spindle motor 3 on which the disk 2 is mounted, or if the disk 2 itself has a slight eccentricity, the information track 1 also has an eccentricity with respect to the rotation center. Therefore, the information track 1 crosses the focus position of the object lens 8, and the tracking error signal 101 having a sine waveform is output in synchronization with the rotation of the disk 2. When the tracking control loop 201 is set the ON state, the object lens 8 is controlled so that the light spot follows the center position of the information track 1 by the operation of the tracking control loop 201 as described above, whereby the amplitude of the tracking error signal 101 becomes nearly zero.

In the configurations shown in the above-mentioned FIGS. 41 to 44, if the center of the object lens 8 is displaced from the neutral position of the optical pickup 4 because of some reasons, the center of the object lens 8 is displaced from the center of the,light beam emitted from the semiconductor laser 5, thereby causing an offset. As a result, the distribution of the incident light from the disk 2 to the two-part split PD 9 varies, and the waveform of the tracking error signal 101 changes, whereby the follow-up control for the information track becomes unstable.

A first problem owing to the displacement of the center of the object lens 8 is an offset in the tracking error signal 101. FIG. 43(a) is a side view showing the positional relationship between the light beam of the reflected light and the two-part split PD at the time when the optical axis of the object lens 8 is displaced from the center position of the light beam. When the object lens 8 is displaced from the position indicated in solid lines to the position indicated in two-dot chain lines, the center position A of the light beam is displaced to position B; as a result, the center of the light beam reflected by the optical disk 2 and made incident upon the two-part split PD is displaced by distance x. Consequently, regarding the amounts of incident light at the detection areas a and b of the two-part split PD 9, the amount of incident light in the detection area a is less than that in the detection area b, whereby an imbalance occurs therebetween. The tracking error detection circuit 14 detects the tracking error signal 101 by calculating the difference between the amounts of light at the detection areas a and b. Therefore, if an imbalance occurs between the amounts of light in the detection areas a and b of the two-part split PD 9, an offset occurs in the tracking error signal.

A second problem is the decrease of the amplitude of the tracking error signal 101. In FIG. 43(a), if the position of the object lens 8 is displaced, the light beam of the reflected light is away from the detection area of the two-part split PD 9 by distance y, whereby the total amount of the incident light decreases.

FIG. 43(b) is a graph showing the relationship between the displacement amount x of the object lens 8 and the tracking error signal 101 output from the tracking error detection circuit 14 at the time when the object lens 8 crosses the information tracks 1. As the displacement distance x of the object lens 8 increases, the offset of the amplitude center increases, and the amplitude of the tracking error signal decreases.

FIG. 43(c) is a graph showing the change of the tracking error signal 101 with respect to time at a moment when the tracking control loop 201 is switched from the OFF state to the ON state in the case that the object lens 8 causes a positional displacement. The case wherein the object lens 8 causes a positional displacement is indicated in a solid line, and the case wherein the object lens 8 does not cause any positional displacement is indicated in a two-dot chain line. Since the case wherein the object lens 8 does not cause any positional displacement is similar to that shown in FIG. 42, which is applied in a similar manner, its explanation is omitted. When the tracking control loop 201 shown in FIG. 41 is in the OFF state, the tracking error signal 101 is output in a sine waveform as indicated in a two-dot chain line in FIG. 43(c). However, if the object lens 8 has a positional displacement, an offset indicated in a one-dot chain line occurs at the center of the amplitude of the tracking error signal 101 depending on the displacement amount as indicated in the solid line in FIG. 43(c), and the amplitude decreases.

When the tracking control loop 201 is set at the ON state, the amplitude of the tracking error signal 101 becomes nearly zero because of the operation of the control loop. However, since the center of the information track 1 corresponds to the position indicated in the one-dot chain line, if control is carried out so that the amplitude of the tracking error signal 101 becomes zero, the object lens 8 is made to follow the position displaced from the center of the information track 1, thereby causing an off-track (the displacement between the object lens 8 and the center of the track). Furthermore, since the amplitude of the tracking error signal 101 decreases depending on the positional displacement amount of the object lens 8, the detection gain (the ratio of the off-track amount and the amplitude of the tracking error signal 101) of the tracking error detection circuit 14 becomes smaller, and the gain of the circuit of the tracking control loop 301 also becomes smaller, whereby control performance lowers. If the object lens 8 is displaced as described above, it is necessary to carry out both the offset correction and amplitude correction of the tracking error signal.

A third problem is the occurrence of the offset and an amplitude variation of the tracking error signal 101 not only when the object lens 8 is displaced but also when the optical axis of the object lens 8 is not held perpendicular to the disk face but tilted in the tangent direction of the track.

FIG. 44(a) is a side view showing the positional relationship between the light beam of the reflected light and the two-part split PD 9 at the time when the optical disk 2 is tilted with respect to the optical axis of the optical pickup 4. If the optical disk 2 is displaced by a tilt angle z from state C wherein the optical axis is perpendicular to the optical disk 2 as indicated in solid lines to state D indicated in two-dot chain lines, the light beam reflected by the optical disk 2 and made incident upon the two-part split PD 9 is displaced to the position indicated in the two-dot chain lines. Therefore, regarding the light amounts at the detection areas a and b of the two-part split PD, the light amount in the detection area a becomes less than that in the detection area b, whereby an imbalance occurs. Consequently, as shown in FIG. 44(b) (sic FIG. 44(b)) and just as in the case when the object lens 8 is displaced, the tracking error signal 101 output from the tracking error detection circuit 14 causes an offset, the amplitude decreases, and off-track occurs, thereby lowering control performance. Therefore, it is necessary to correct the tracking error signal 101 by using not only the positional displacement information of the object lens 8 but also the tilt angle information of the disk 2.

The present invention is first intended to solve the above-mentioned first to third problems thereby to greatly improve the stability of the tracking control.

If the optical axis of the object lens is not perpendicular to the disk face but tilted in a direction perpendicular to the tangent line of the information track when the light spot is applied to the disk, the light spot is also applied to an adjacent track, and the information of the adjacent track is mixed therein. Therefore, it is necessary to carry out tilt control so that the tilt angle of the optical axis from a direction perpendicular to the disk face becomes zero.

The tilt control for another conventional optical information recording and reproducing apparatus will be described below referring to drawings. FIG. 45 is a block diagram showing the configuration of the conventional optical information recording and reproducing apparatus.

In FIG. 45, a disk 301 is disposed above (upward from the paper face) a mechanism section including an optical pickup 302 and a lead screw 305; for ease in understanding, the above-mentioned mechanism section is indicated in solid lines, and the disk 301 is indicated in a one-dot chain line. A light beam 302A is applied through an object lens 303 installed on the optical pickup 302 to the information tracks formed concentrically or helically on the disk 301 to record and reproduce information. A lead rack 304 is secured to the side face of the optical pickup 302. The lead rack 304 has a projection 304A, and the projection 304A is movably fitted in the helical groove of the lead screw 305. An end of the lead screw 305 is directly connected to the motor shaft 306A of an optical pickup movement motor 306. One ends of two lead shafts 307 for holding the optical pickup 302 so as to be movable in the radial direction of the disk 301 are installed in lead shaft holders 308, and the other ends thereof, bent in the L shape, are inserted in the holes of tilt cams 309. As shown in FIG. 46 and FIG. 47(a), a tilt sensor 310 installed on the lead rack 304 has a light source 327 and a two-part split PD 326 used as a photodetector, a light beam 327A is applied from the light source 327 to the face of the disk 301, and a light beam 327B reflected by the disk 301 is detected by the two-part split PD 326. The tilt sensor 310 outputs a signal indicating "the tilt angle of the optical axis of the light beam 327A from a direction perpendicular to the face of the disk 301" (hereafter simply referred to as a tilt angle). The signal indicating the tilt Angle is treated by the tilt error detection circuit 311 of FIG. 45, and a tilt error signal 401 corresponding to the tilt angle is output.

A tilt control circuit 312 supplies a control signal to a tilt drive circuit 313 so that the level of the tilt error signal 401 becomes zero thereby to control a tilt motor 314 for rotating a tilt shaft 315 directly connected to the shaft of the tilt motor and the tilt cams 309 eccentrically installed on the tilt shaft 315.

Operations will be described in detail next. The light beam 302A emitted from the optical pickup 302 is focused on the information track 331 of the disk 301 by the object lens 303. The optical pickup 302 uses a part of the light reflected by the disk 301 to carry out focus control wherein the object lens 303 is moved in a direction perpendicular to the disk 301 so that the focus position of the light beam 302A focused by the object lens 303 meets the disk 301 at all times and to carry out tracking control wherein the object lens 303 is moved in a direction perpendicular to the information track 331 so that the light beam 302A is positioned at the center of the information track. Since the focus control and the tracking control do not directly relate to the present invention, their detailed explanations are omitted. To carry out recording or reproduction at a target track, the lead screw 305 is rotated by the pickup movement motor 306, whereby the optical pickup 302 is moved in the radial direction of the disk 301 via the lead rack 304 having the projection 304A fitted in a groove helically formed in the lead screw 305. The tilt sensor 310 installed on the lead rack 304 detects the tilt of the light beam 302A with respect to the disk face, and the tilt error detection circuit 311 generates the tilt error signal 401 and outputs the signal to the tilt control circuit 312.

The tilt control circuit 312 outputs a drive command to the tilt drive circuit 313 so that the optical axis of the light beam 302A becomes perpendicular to the face of the disk 301 and so that the level of the tilt error signal 401 becomes zero. By using the drive command, the tilt drive circuit 313 flows a current to the tilt motor 314 to rotate it. The tilt motor 314 rotates the tilt cams 309 via the tilt shaft 315. As a result, the lead shafts 307 are rotated with the lead shaft holders 308 used as fulcrums thereby to tilt the optical pickup 302, the lead rack 304 and the tilt sensor 310. Even if the disk 301 is tilted in this configuration, control is made possible by controlling the tilt of the optical pickup 302 so that the light beam 302A output from the optical pickup 302 is applied in a direction perpendicular to the face of the disk 301 at all times.

FIG. 46 is a plan view showing the concrete configurations of the tilt sensor 310 and the tilt error detection circuit 311. As shown in FIG. 46, the two-part split PD 326 of the tilt sensor 310 is split into two parts along the tangent line 331A of the information tracks 331 recorded concentrically or helically on the disk 301. The optical axis of the light beam 327A from the light source 327 is made perpendicular to the tangent line 331A of the information track 331 on the disk 301 (in other words, parallel with the optical axis of the light beam of the optical pickup 302), and is disposed on the extension line of the tangent line 331A overlapping the split line of the two-part split PD 326 so that the light reflected from the disk 301 enters the center of the two-part split PD 326. The tilt error detection circuit 311 has a subtraction circuit 328 for obtaining the difference between the outputs of the PD sections 326a and 326b of the two-part split PD 326.

The concrete operation of the tilt control will be described by using FIGS. 47 and 48. FIG. 47(b) is a plan view showing the position of the light beam 327B of the reflected light incident on the two-part split PD 326 at the time when the light beam 327A emitted from the light source 327 of the tilt sensor 310 is applied to the disk 301. As shown in FIG. 48(a), if the disk 301 is tilted by tilt angle z from the state wherein the light beam 327A perpendicularly enters the disk 301 indicated in solid lines 301A to the state wherein the disk 301 is indicated in two-dot chain lines (sic two-dot chain lines) 301B, the light beam 327B reflected by the disk 301 and made incident upon the two-part split PD 326 is displaced to the position indicated in the dotted line in FIG. 4b(b). As a result, the light amount at the PD section 326b of the two-part split PD 326 becomes less than the light amount at the PD sectional 326a, whereby the output levels of the PD sections 326a and 327b of the two-part split PD 326 change as shown in the top and intermediate graphs of FIG. 48(b) respectively. The difference between the two output levels of the PD sections 326a and 326b is obtained by the subtraction circuit 328 of the tilt detection circuit 310, whereby the tilt error signal 401 shown in the bottom graph of FIG. 48(b) is obtained. In this way, the level of the tilt error signal 401 output from the tilt error detection circuit 310 changes depending on the tilt angle of the disk 301 indicated on the abscissa. When the light beam 327A is made incident perpendicularly upon the face of the disk 301, the output level of the PD section 326a is equal to that of the PD section 326b, and the level of the tilt error signal 401 becomes zero. By controlling the tilt of the integrated unit of the optical pickup 302 and the tilt sensor 310 so that the level of the tilt error signal 401 becomes zero, the light beam 327A output from the optical pickup 302 is controlled so as to be applied perpendicularly to the face of the disk 301. If the level of the tilt error signal 401 is not zero even when the light beam 327A is made incident perpendicularly upon the face of the disk 301, this state is referred to as "an offset has occurred," and this level is referred to as "an offset amount."

In the conventional example shown in the above-mentioned FIG. 45, in the case when an offset occurs in the tilt error signal 401 detected by the tilt sensor 310 because of some reasons, if control is carried out so that the level of the tilt error signal 401 becomes zero, the optical axis of the optical pickup 302 is tilted by an angle corresponding to the amount of the offset with respect to a plane perpendicular to the disk 301, whereby the accuracy of the tilt control becomes low. The causes of offset occurrence will be described below.

As the optical pickup 302 is moved, the lead rack 304 may be deformed and the tilt sensor 310 may be tilted. Because of this tilt, the optical axis of the light beam 302A output from the optical pickup 302 is not held parallel with the optical axis of the outgoing light 327A from the light source 327 of the tilt sensor 310, and an offset occurs in the tilt error signal 401. FIG. 49 is a side view showing forces exerted on the lead rack 304 at the time when the lead screw 305 rotates. In FIG. 49, the projection 304A is formed on the side face of the lead rack 304 and fitted in the groove 305A of the lead screw 305. When the lead screw 305 is rotated in the direction indicated by arrow W, the groove 305A of the lead screw 305 moves apparently in the direction indicated by arrow C, and the lead rack 304 also moves in the direction indicated by the arrow C. At this time, a force is also applied to the lead rack 304 via the groove 305A in the direction indicated by arrow D. Therefore, the lead rack 304 is rotated clockwise as indicated in one-dot chain lines and slightly displaced in the direction indicated by arrow E. By this rotation and displacement, the tilt sensor 310 installed on the lead rack 304 shown in FIG. 45 is tilted, and the optical axis of the light beam 302A output from the optical pickup 302 does not become parallel with the optical axis of the outgoing light 327A of the light source 327 of the tilt sensor 310. As a result as indicated in one-dot chain lines in the graphs of FIG. 50(a) (sic FIG. 50(a)), the level of the output signal from the two-part split PD 326 of the tilt sensor 310 is shifted, and an offset occurs in the tilt error signal 401. If the lead screw 305 is rotated in the direction opposite to the direction of the arrow W, the lead rack 304 is displaced in the direction opposite to the direction of the arrow E, thereby causing an offset in the direction opposite to that in the above-mentioned case as indicated in two-dot chain lines in the graphs of FIG. 50(a). The solid lines in the graphs of FIG. 50(a) show the respective outputs at the time when the lead rack 304 is not displaced.

Furthermore, an offset also occurs owing to a temperature change at the peripheral sections of the tilt sensor 310 and the lead rack 304.

If the temperatures of the tilt sensor 310 and the lead rack 304 change, an imbalance occurs between the detection sensitivity levels of the PD sections 326a and 326b of the two-part split PD 326 inside the tilt sensor 310, whereby an offset occurs in the tilt error signal 401. In addition, the lead rack 304 itself is deformed, and the optical axis of the optical pickup 302 does not becomes parallel with the optical axis of the light source 327 of the tilt sensor 310, whereby an offset occurs in the tilt error signal 401.

The magnitude of the offset of the tilt error signal 401 may change depending on the reflectivity of the disk 301. The graphs of FIG. 50(b) show the relationship between the reflectivity of the disk 301 and the tilt error signal output 401 at the time when an offset occurs in the tilt error signal. 401. The solid lines of FIG. 50(b) indicate the output signals of the PD sections 326a and 326b of the two-part PD 326 and the tilt error signal 401 at the time when the reflectivity of the disk is 30%. When the reflectivity of the disk 301 becomes 50%, the detection levels of the PD sections 326a and 326b increase as the reflectivity increases as shown in the one-dot chain lines of FIG. 50(b), and the output level with respect to the tilt angle of the disk 301 also increases. Therefore, the level of the tilt error signal 401 with respect to the tilt angle of the disk 301 increases, and the offset of the tilt error signal 401 at the time when the tilt angle of the disk 301 is zero increases as the reflectivity increases.

In the case when the disk 301 is a recordable optical disk, problems described below are caused. FIG. 51 shows the distribution of the light intensity of the light beam of the optical pickup 302, the states of pits formed in the disk and the relationship of reproduced signals read by the optical pickup 302. The light reflectivity of the pit section formed by recording is lower than that of other sections. This difference in the reflectivity is detected based on a level difference in the amount of the reflected light of the light beam emitted from the optical pickup 302. FIGS. 51(a) and (b) are graphs showing the distribution of the light intensity in the tracking direction TD of the light beam output from the optical pickup 302. First, as shown in FIG. 51(a), the case wherein the distribution of the intensity of the light beam is symmetrical with respect to the optical axis OC of the light beam will be explained.

When the light sensitivity levels of the areas A and B of the disk 301 irradiated with the light beam in the vicinity of the optical axis OC are equal to each other, and when a single data (data having a pit length being equal to the length between pits) is recorded on the optical disk 301, pits P symmetrical with respect to the center line TC of the track are recorded as shown in FIG. 51(c). When the recorded single data is read by the optical pickup 302, reflected light having a low level is obtained while the light beam passes through the pits P, and reflected light having a high level is obtained at areas having no pits. An RF signal, whose level changes depending on the presence or absence of the pits P, is obtained from this reflected light as shown in FIG. 51(d). When this RF signal is binarized by slicing the RF signal at the center value SL of the RF signal, and when it is assumed that the level of the signal not less than the center value SL is Hi and the level less than the center value is Low, a binary RF signal shown in FIG. 51(e) is obtained. When a single data is recorded, time TH during which the RF signal is Hi becomes equal to time TL during which the RF signal is Low.

When the light sensitivity of the above-mentioned area A is lower than the light sensitivity of the area B for example, the recorded pits P do not become symmetrical with respect to the track center line TC but become deviated as shown in FIG. 51(f). For example, when the distribution of the intensity of the light beam is not symmetrical with respect to the optical axis OC of the light beam but deviated rightward in the graph of FIG. 51(b), even if the light sensitivity levels of the areas A and B of the disk 301 are equal to each other, the recorded pits P become deviated shape with respect to the track center line TC as shown in FIG. 51(f). When the pits P deviated with respect to the track center line TC as described above are read by the optical pickup 302, an RF signal shown in FIG. 51(g) is obtained. The reasons are as follows: since the light beam passes through the ends of the pits P, the difference between the level at the time of passing through the pits P and the level at the time of passing through the no-pit area becomes small. In addition, depending on the deviation from the track center line TC of the pits P, the timing when the light beam arrives at the pits P is delayed. When the RF signal of FIG. 51(g) is inverted into a binary value by slicing it at the center value SL of the RF signal, a binary RF signal is obtained as shown in FIG. 51(h); however, the Hi time does not become equal to the Low time, but the time TH becomes longer than the time TL. As a result, reproduced data becomes different from the recorded single data. In this way, the pits P deviated with respect to the track center line TC are not detected properly at the time of reproduction.

The deviation in the intensity of the light beam shown in FIG. 51(b) differs depending on the intensity of the outgoing light of the light beam. For example, the distribution of the light intensity at the time of a high intensity during recording is indicated in a dot line and the distribution of the light intensity at the time of a low intensity during reproduction is indicated in a solid line in FIG. 51(i) (sic FIG. 51(i)). This is because when the intensity of the outgoing light of the light beam becomes high, the wavelength of the outgoing light changes depending on the change in the temperature around the optical pickup, or strains occur at the mechanism section of the optical pickup. In addition, the deviation of the distribution of the intensity of the light beam may occur depending on changes in various environmental conditions, such as the temperature, humidity and pressure around the apparatus. This is because strains occur at the mechanism sections of the apparatus owing to changes in the environmental conditions. Strains may also occur at the mechanism sections of the apparatus because of changes with the passage of time. In addition, the reflectivity at the face of the optical disc and the reflectivity at the pits P are different depending on the manufacturer of the disk. The amplitude RFA of the RF signal changes depending on these differences in the reflection, whereby the time TH may become unequal to the time TL in some cases. Furthermore, in order to increase the density of recording capacity, it is necessary to reduce the distance between the tracks on the disk or to decrease the width of the recording pits P; this tends to further increase errors at the time of reproduction.

DISCLOSURE OF INVENTION

An optical information recording and reproducing apparatus in accordance with the present invention comprises a disk on which information is recorded along tracks, an optical pickup, having an object lens, for applying a light spot to the recording face of the above-mentioned disk, a tracking error detection section for detecting the positional displacement amount between the above-mentioned light spot and an information track recorded on the above-mentioned optical disk and for outputting a tracking error signal corresponding to the positional displacement amount, a lens movement section for moving the object lens of the above-mentioned optical pickup in a direction crossing the above-mentioned information tracks, a tracking control section, including a compensation calculation section, for controlling the above-mentioned lens movement section depending on the above-mentioned tracking error signal, an object lens displacement estimation section for estimating the displacement of the optical axis of the object lens from the center position of the light beam of the above-mentioned optical pickup on the basis of the output of the above-mentioned compensation calculation section, an offset detection section for detecting the offset of the above-mentioned tracking error signal, a memory section for storing the output of the above-mentioned offset detection section and the output of the above-mentioned object lens displacement estimation section as a pair, and an offset correction section for outputting the output of the above-mentioned offset detection section corresponding to the output of the above-mentioned object lens displacement estimation section from the above-mentioned memory section and for correcting the offset of the above-mentioned tracking error signal.

From the output of the offset detection section and the output of the object lens displacement estimation section stored as a pair in the memory section, the output of the offset detection section corresponding to the output of the object lens displacement estimation section is obtained. A tracking signal is obtained from the obtained output, and the offset of the tracking error signal is corrected. As a result, the positional displacement of the object lens of the optical pickup is corrected, whereby the light spot can be positioned properly on the track of the disk.

An optical information recording and reproducing apparatus in another aspect of the present invention comprises a disk on which information is recorded along tracks, an optical pickup, having an object lens, for applying a light spot to the recording face of the above-mentioned disk, a tracking error detection section for detecting the positional displacement amount between the above-mentioned light spot and an information track recorded on the above-mentioned optical disk and for outputting a tracking error signal corresponding to the positional displacement amount, a lens movement section for moving the object lens of the above-mentioned optical pickup in a direction crossing the above-mentioned information tracks, a tracking control section, including a compensation calculation section, for controlling the above-mentioned lens movement section depending on the above-mentioned tracking error signal, an object lens displacement estimation section for estimating the displacement of the optical axis of the object lens from the center position of the light beam of the above-mentioned optical pickup on the basis of the output of the above-mentioned compensation calculation section, an amplitude detection section for detecting the amplitude of the above-mentioned tracking error signal, a memory section for storing the output of the above-mentioned amplitude detection section and the output of the above-mentioned object lens displacement estimation section so as to correspond to each other, and an amplitude correction section for outputting the output of the above-mentioned amplitude detection section corresponding to the output of the above-mentioned object lens displacement estimation section from the above-mentioned memory section and for correcting the amplitude value of the above-mentioned tracking error signal.

From the output of the amplitude detection section and the output of the object lens displacement estimation section stored so as to correspond to each other in the memory section, the amplitude value of the tracking error signal corresponding to the output of the object lens displacement estimation section is obtained. The tracking error signal is corrected by using the obtained amplitude value. As a result, the positional displacement of the object lens of the optical pickup is corrected, whereby the light spot can be positioned properly on the track of the disk.

An optical information recording and reproducing apparatus in other aspect of the present invention comprises a disk on which information is recorded along tracks, an optical pickup, having an object lens, for applying a light spot to the recording face of the above-mentioned disk, a tracking error detection section for detecting the positional displacement amount between the above-mentioned light spot and an information track recorded on the above-mentioned optical disk and for outputting a tracking error signal corresponding to the positional displacement amount, a lens movement section for moving the object lens of the above-mentioned optical pickup in a direction crossing the above-mentioned information tracks, a tracking control loop for controlling the above-mentioned lens movement section depending on the above-mentioned tracking error signal, an object lens displacement estimation section for estimating the displacement of the optical axis of the object lens from the center position of the light beam of the above-mentioned optical pickup, and a tracking correction control loop for controlling the above-mentioned lens movement section depending on the displacement amount of the optical axis of the object lens estimated by the above-mentioned object lens displacement estimation section.

In the tracking control loop, the lens movement section is controlled depending on the tracking error signal; in the tracking correction control loop, the lens movement section is controlled depending on the displacement amount of the optical axis of the object lens. As a result, the tracking error is corrected, and the displacement of the optical axis of the object lens is corrected.

An optical information recording and reproducing apparatus in other aspect of the present invention comprises a disk on which information is recorded along tracks, an optical pickup, having an object lens, for applying a light spot to the recording face of the above-mentioned disk, a tracking error detection section for detecting the positional displacement amount between the above-mentioned light spot and an information track recorded on the above-mentioned optical disk and for outputting a tracking error signal corresponding to the positional displacement amount, a lens movement section for moving the object lens of the above-mentioned optical pickup in a direction crossing the above-mentioned information tracks, a tracking control section for controlling the above-mentioned lens movement section depending on the above-mentioned tracking error signal, an object lens displacement detection section for detecting the displacement of the optical axis of the object lens from the center position of the light beam of the above-mentioned optical pickup, an offset detection section for detecting the offset of the above-mentioned tracking error signal, a tilt detection section for detecting the tilt amount of the light beam of the above-mentioned optical pickup with respect to the above-mentioned disk face in a direction perpendicular to the information track, a memory section for storing the output of the above-mentioned offset detection section, the output of the above-mentioned object lens displacement detection section and the output of the above-mentioned tilt detection section so as to correspond to one another, and an offset correction section for outputting the output of the above-mentioned offset detection section corresponding to the output of the above-mentioned object lens displacement detection section and the output of the above-mentioned tilt detection section from the above-mentioned memory section and for correcting the offset of the above-mentioned tracking error signal.

From the output of the offset detection section, the output of the object lens displacement estimation section and the output of the tilt detection section stored so as to correspond to one another in the memory section, the output of the offset detection section corresponding to the output of the object lens displacement estimation section and the output of the tilt detection section is obtained. A tracking signal is obtained from the obtained output, and the offset of the tracking error signal is corrected.

An optical information recording and reproducing apparatus in other aspect of the present invention comprises a disk on which information is recorded, an optical pickup, having an object lens, for applying a light spot to the recording face of the above-mentioned disk, a tracking error detection section for detecting the positional displacement amount between the above-mentioned light spot and an information track recorded on the above-mentioned optical disk and for outputting a tracking error signal corresponding to the positional displacement amount, a lens movement section for moving the object lens of the above-mentioned optical pickup in a direction crossing the above-mentioned information tracks, a tracking control section for controlling the above-mentioned lens movement section depending on the above-mentioned tracking error signal, an object lens displacement detection section for detecting the displacement of the optical axis of the object lens from the center position of the light beam of the above-mentioned optical pickup, a tilt detection section for detecting the tilt amount of the light beam of the above-mentioned optical pickup with respect to the above-mentioned disk face in a direction perpendicular to the information track, an amplitude detection section for detecting the amplitude of the above-mentioned tracking error signal, a memory section for storing the output of the above-mentioned amplitude detection section, the output of the above-mentioned object lens displacement detection section and the output of the above-mentioned tilt detection section so as to correspond to one another, an offset correction section for outputting the output of the above-mentioned amplitude detection section corresponding to the output of the above-mentioned object lens displacement detection section and the output of the above-mentioned tilt detection section from the above-mentioned memory section and for correcting the amplitude value of the tracking error signal of the above-mentioned tracking error detection section.

From the output of the amplitude detection section, the output of the lens displacement detection section and the output of the tilt detection section stored in the memory section, the amplitude value of the tracking error signal corresponding to these is corrected.

In order to record or reproduce information on the information tracks of a disk, an optical information recording and reproducing apparatus in accordance with the present invention from another point of view comprises an optical pickup for applying a light spot to the recording face of the above-mentioned disk via an object lens, a pickup movement section having a pickup movement motor for moving the above-mentioned optical pickup in a direction crossing the information tracks on the above-mentioned disk, a movement direction detection section for detecting the movement direction of the above-mentioned optical pickup, a tilt error detection section for detecting the tilt of the optical axis of the light beam of the above-mentioned optical pickup with respect to the above-mentioned disk face and for outputting the tilt as a tilt error signal, a tilt drive section for tilting the above-mentioned optical pickup and the above-mentioned tilt error detection section as an integrated unit, a tilt control section for controlling the above-mentioned tilt drive section depending on the above-mentioned tilt error signal, an offset detection section for detecting the offset of the above-mentioned tilt error signal, a memory section for storing the output of the above-mentioned offset detection section and the output of the movement direction detection section of the above-mentioned optical pickup as a pair, and an offset correction section for reading the output of the above-mentioned offset detection section corresponding to the output of the movement direction detection section of the above-mentioned optical pickup from the above-mentioned memory section and for correcting the offset of the above-mentioned tilt error signal.

The offset amount of the tilt error signal depending on the movement direction of the optical pickup is stored beforehand, the above-mentioned stored offset is read, and the tilt error signal is corrected depending on the movement direction of the optical pickup detected by the rotation direction detection section. Consequently, a tilt control error depending on the movement direction is prevented; when the disk is tilted, the tilt is controlled so that the light beam output from the optical pickup is perpendicularly applied to the disk 301 at all times. As a result, the stability of the information recording and reproducing apparatus can be improved greatly.

In order to record or reproduce information on the information tracks of a disk, an optical information recording and reproducing apparatus in accordance with the present invention from another point of view comprises an optical pickup for applying a light spot to the recording face of the above-mentioned disk via an object lens, a pickup movement section having a pickup movement motor for moving the above-mentioned optical pickup in a direction crossing the information tracks on the above-mentioned disk, an optical pickup movement direction detection section for detecting the movement direction of the above-mentioned optical pickup, a tilt error detection section, provided in the above-mentioned optical pickup and having a tilt sensor for detecting the tilt angle of the optical axis of the light beam of the optical pickup with respect to the above-mentioned disk face, for outputting a tilt error signal representing the above-mentioned tilt angle, a tilt drive section for tilting the above-mentioned optical pickup and the above-mentioned tilt sensor as an integrated unit, a tilt control section for controlling the above-mentioned tilt drive section depending on the above-mentioned tilt error signal, an offset detection section for detecting the offset of the above-mentioned tilt error signal, a temperature detection section disposed in the vicinity of the above-mentioned tilt sensor, a memory section for storing the output of the above-mentioned offset detection section, the output of the above-mentioned optical pickup movement direction detection section and the output of the above-mentioned temperature detection section as a group, and an offset correction section for reading the output of the above-mentioned offset detection section corresponding to the output of the above-mentioned optical pickup movement direction detection section and the output of the above-mentioned temperature detection section from the above-mentioned memory section and for correcting the offset of the above-mentioned tilt error signal.

The change amount of the offset with respect to an ambient temperature is measured beforehand, and both are stored in the memory section as a pair. When the apparatus is operated, the ambient temperature and the offset amount corresponding to the temperature are read from the above-mentioned memory section, and the offset of the tilt error detection circuit is corrected by using the read offset amount. Therefore, proper offset correction is carried out at all times even if the ambient temperature changes.

An optical information recording and reproducing apparatus in other aspect of the present invention comprises an optical pickup, including an object lens, for applying a light spot to the recording face of an optical disk on which information is recorded or reproduced on information tracks, a pickup movement section including a pickup movement motor for moving the above-mentioned optical pickup in a direction crossing the above-mentioned information tracks, a tilt error detection section for detecting the tilt amount of the optical axis of the light beam of the above-mentioned optical pickup with respect to the above-mentioned disk face and for outputting the tilt amount as a tilt error signal, a tilt drive section for tilting the above-mentioned optical pickup and the above-mentioned tilt detection section as an integrated unit, a tilt control section for controlling the above-mentioned tilt drive section depending on the above-mentioned tilt error signal so that the tilt amount conforms to a tilt control target value indicating a predetermined tilt amount, and a control target value change section for changing the control target value of the above-mentioned tilt control section.

By changing the control target value of the tilt control section, the optical pickup is maintained at an optimal tilt angle at all times, and the reliability during disk recording and reproduction is improved.

In order to record or reproduce information on the information tracks of a disk, an optical information recording and reproducing method in accordance with the present invention comprises a step of moving an optical pickup for applying a light spot to the recording face of the above-mentioned disk via an object lens in a direction crossing the information tracks on the above-mentioned disk, a step of detecting the movement direction of the above-mentioned optical pickup, a step of detecting the tilt of the optical axis of the light beam of the above-mentioned optical pickup with respect to the above-mentioned disk face and of outputting the tilt as a tilt error signal from the tilt error detection section, a step of tilting the above-mentioned optical pickup and the above-mentioned tilt error detection section as an integrated unit, a step of controlling the above-mentioned tilt drive section depending on the above-mentioned tilt error signal, a step of detecting the offset of the above-mentioned tilt error signal by using the offset detection section, a step of storing the output of the above-mentioned offset detection section and the output of the movement direction detection section of the above-mentioned optical pickup as a pair, and a step of reading the output of the above-mentioned offset detection section corresponding to the output of the movement direction detection section of the above-mentioned optical pickup from the above-mentioned memory section and of correcting the offset of the above-mentioned tilt error signal.

In order to record or reproduce information on the information tracks of a disk, an optical information recording and reproducing method in accordance with the present invention from another point of view comprises a step of moving an optical pickup for applying a light spot to the recording face of the above-mentioned disk via an object lens in a direction crossing the information tracks on the above-mentioned disk, a step of detecting the movement direction of the above-mentioned optical pickup, a step of detecting the tilt angle of the optical axis of the light beam of the optical pickup with respect to the above-mentioned disk face by using a tilt sensor provided in the above-mentioned optical pickup, a step of detecting a tilt error signal representing the above-mentioned tilt angle and of outputting the signal, a step (sic a step) of tilting the above-mentioned optical pickup and the above-mentioned tilt sensor as an integrated unit, a step of controlling the above-mentioned tilt drive section depending on the above-mentioned tilt error signal, a step of detecting the offset of the above-mentioned tilt error signal by using the offset detection section, a step of detecting the temperature in the vicinity of the above-mentioned tilt sensor, a step of storing the output of the above-mentioned offset detection section, the detection output of the movement direction of the above-mentioned optical pickup and the detection output of the above-mentioned temperature as a group, and a step of reading the output of the above-mentioned offset detection section corresponding to the detection output in the movement direction of the above-mentioned optical pickup and the detection output of the above-mentioned temperature from the above-mentioned memory section and of correcting the offset of the above-mentioned tilt error signal.

An optical information recording and reproducing method in accordance with the present invention from another point of view comprises a step of moving an optical pickup, including an object lens, for applying a light spot to the recording face of an optical disk, on the information tracks of which information is recorded or reproduced, in a direction crossing the above-mentioned information tracks, a step of detecting the tilt amount of the optical axis of the light beam of the above-mentioned optical pickup with respect to the above-mentioned disk face and of outputting the tilt amount as a tilt error signal, a step of tilting the above-mentioned optical pickup and the above-mentioned tilt detection section as an integrated unit, a step of controlling the above-mentioned tilt drive section depending on the above-mentioned tilt error signal so that the tilt amount conforms to a tilt control target value indicating a predetermined tilt amount, and a control target value change step of changing the control target value of the above-mentioned tilt control section

BRIEF DESCRIPTION OF DRAWINGS

FIG. 4(a) is a flowchart showing the initialization-mode operation of the optical information recording and reproducing apparatus in accordance with the embodiment 1 of the present invention, and (b) is a graph showing the change in the level of the tracking error signal at the time when a tracking control loop in accordance with the embodiment 1 of the present invention is switched from OFF to ON;

FIGS. 6(a) and (b) are the transfer characteristic graphs of a phase compensation filter in accordance with the embodiment 1 of the present invention;

FIG. 11(a) is a flowchart showing the learning-mode operation of the optical information recording and reproducing apparatus in accordance with the embodiment 2 of the present invention, and (b) and (c) are tables showing the contents of the memory circuits of the optical information recording and reproducing apparatus in accordance with the embodiment 2 of the present invention;

FIG. 12 is a flowchart showing the correction-mode operation of the optical information recording and reproducing apparatus in accordance with the embodiment 2 of the present invention;

FIGS. 15(a) and (b) are tables showing the contents of the memory circuits of the optical information recording and reproducing apparatus in accordance with the embodiment 3 of the present invention;

FIGS. 23(a) and (b) are graphs showing the transfer characteristics of a phase compensation filter in accordance with the embodiment 5 of the present invention;

FIG. 26 is a table showing the stored contents of the memory circuit of the optical information recording and reproducing apparatus in accordance with the embodiment 6 of the present invention;

FIG. 37 is a flowchart showing the learning-mode operation of the optical information recording and reproducing apparatus in accordance with the embodiment 10 of the present invention;

FIGS. 51(a), (b) and (i) are graphs showing the light intensity distribution of the light beam of the optical pickup, (c) and (f) are views of pits, and (d), (e), (g) and (h) are waveform charts of detection signals.

BEST MODE FOR CARRYING OUT THE INVENTION

Preferred embodiments of the present invention will be described referring to FIGS. 1 to 40.

Embodiment 1

An embodiment 1 in accordance with the present invention will be described below referring to FIG. 1 to FIG. 8. The components having the same configurations and functions as those of the above-mentioned conventional examples are designated by the same numerals and their explanations are omitted.

Figure 1:
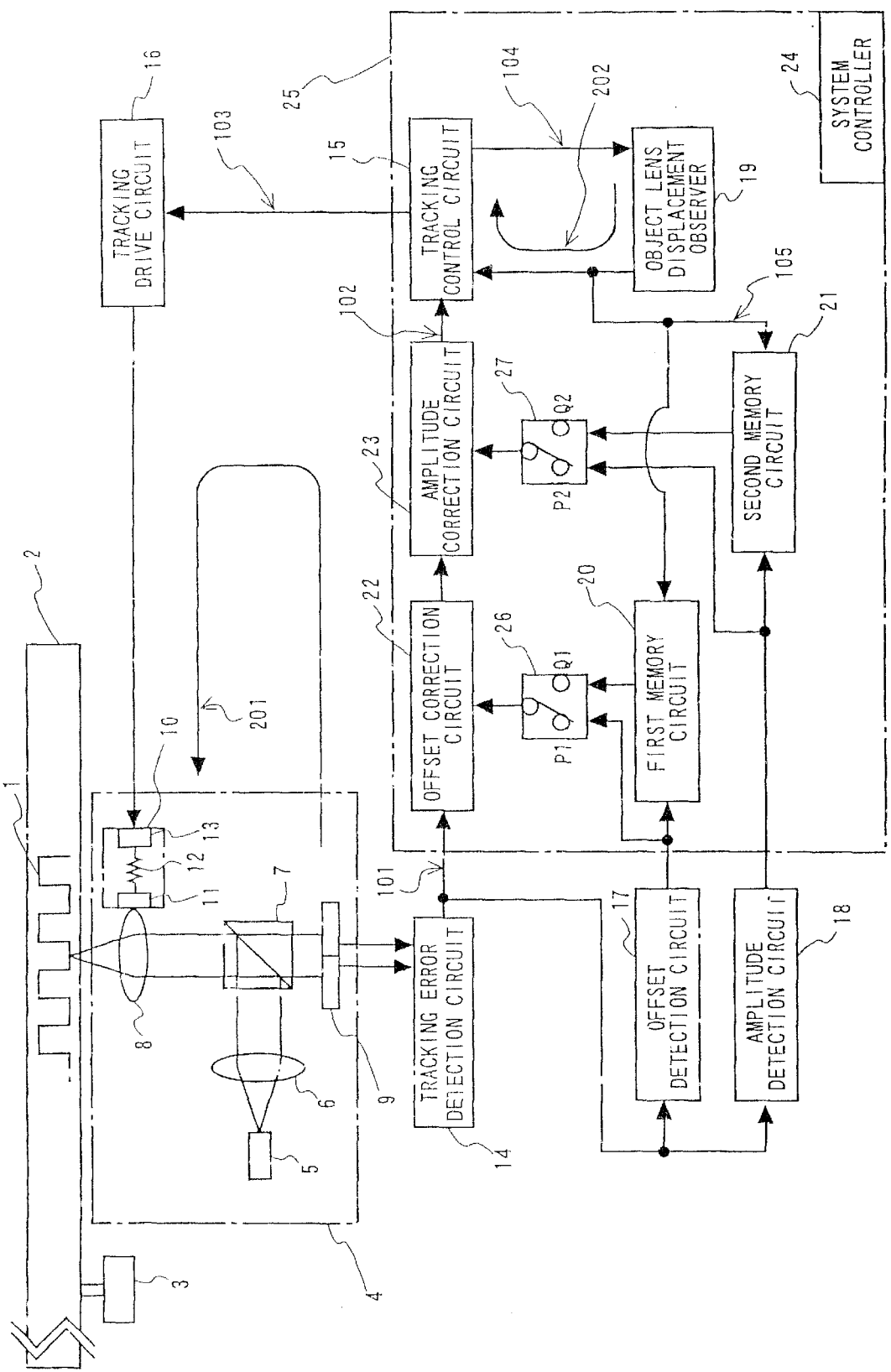
FIG. 1 is a block diagram showing the configuration of an optical information recording and reproducing apparatus in accordance with embodiment 1 of the present invention.

FIG. 1 is a block diagram showing the configuration of an optical information recording and reproducing apparatus in accordance with the present embodiment. In FIG. 1, a tracking control loop 201 is formed of a circuit control loop having an optical pickup 4, a tracking error detection circuit 14, a system control block 25 detailed later and a tracking drive circuit 16. The output terminal of the tracking error detection circuit 14 is connected to the input terminals of the system control block 25, the offset detection circuit 17 and the amplitude detection circuit 18, and applies a tracking error signal generated on the basis of the difference between the outputs of the two PD sections of a 2-part split PD (photodetector). The offset detection circuit 17 detects the center value of the amplitude of a tracking error signal 101, and detects the difference between the center value and a predetermined reference value as an offset amount. The amplitude detection circuit 18 detects the amplitude value of the tracking error signal 101 at the time when an object lens 8 crosses the information tracks 1 of a disk 2.

The system control block 25 has a tracking control circuit 15, an object lens displacement observer 19, a first memory circuit 20, a second memory circuit 21, an offset correction circuit 22, an amplitude correction. circuit 23, a system controller 24, a switch 26 and a switch 27. In the system control block 25, the output terminal of the tracking error detection circuit 14 is connected to an input terminal of the offset correction circuit 22, and the output terminal of the offset correction circuit 22 is connected to the input terminal of the amplitude correction circuit 23. The output terminal of the amplitude correction circuit 23 is connected to an input terminal of the tracking control circuit 15. The output terminal of the tracking control circuit 15 is connected to the input terminal of the tracking drive circuit 16. The output terminal of the offset detection circuit 17 is connected to an input terminal of the first memory circuit 20, and the output terminal of the amplitude detection circuit 18 is connected to an input terminal of the second memory terminal 21. The output terminal of the offset detection circuit 17 and the output terminal of the first memory circuit 20 are connected to the other input terminal of the offset correction circuit 22 via the switching-type switch 26. In addition, the output terminal of the amplitude detection circuit 18 and the output terminal of the second memory circuit 21 are connected to the other input terminal of the offset correction circuit 23 via the switching -type switch 27.

The input and output terminals of the object lens displacement observer 19 are connected to the other group of input and output terminals of the tracking control circuit 15 respectively thereby to form a tracking correction control loop 202 described in detail later. The output terminal of the object lens displacement observer 19 is also connected to the other input terminals of the first and second memory circuits 20 and 21. Each circuit in the system control block 25 is connected to the system controller 24, and control signals are input from the system controller 24; however, the wires for the connections are not shown to simplify the drawing.

The important points of the embodiment 1 of the present invention are listed as described below.

(1) In a correction mode, the tracking correction control loop 202 is operated instead of the ordinary tracking control loop 201 as described in detail later.

(2) In the tracking correction control loop 202, the operation of the optical pickup 4 is simulated by the object lens displacement observer 19 to estimate the positional displacement amount of the object lens 8.

(3) At the same time, the offset amount and amplitude value of the tracking error signal 101 are learnt by the offset detection circuit 17 and the amplitude detection circuit 18.

(4) In an ordinary mode described later, the tracking error signal is corrected by using the offset amount and amplitude value corresponding to the positional displacement estimation amount of the object lens 8 on the basis of the learnt detection result.

The object lens displacement observer 19 estimates the displacement amount of the center of the object lens 8 from the center of the light beam on the basis of the tracking correction signal 104 output from the tracking control circuit 15. The first memory circuit 20 is a memory circuit for storing the object lens displacement amount 105 estimated by the object lens displacement observer 19 and the offset amount of the tracking error signal 101 detected by the offset detection circuit 17 as a pair. The second memory circuit 21 is a memory circuit for storing the object lens displacement amount 105 estimated by the object lens displacement observer 19 and the amplitude value of the tracking error signal 101 detected by the amplitude detection circuit 18 as a pair. The memory circuits 20 and 21 are formed of digital circuits, not shown, or memories in the system controller 24. In storing, analog values are converted into digital values by an A/D converter built in the above-mentioned digital circuits or the system controller 24.

The switch 26 is a switching means for switching the input of the offset correction circuit 22 to the offset amount detected by the offset detection circuit 17 or the offset amount output from the first memory circuit 20 depending on a command from the system controller 24. The switch 27 is a switching means for switching the input signal of the amplitude correction circuit 23 to the amplitude amount detected by the amplitude detection circuit 18 or the amplitude amount output from the second memory circuit 21 depending on a command from the system controller 24. The switches 26 and 27 are digital circuits each having a hold function to store an immediately preceding output value and to keep outputting the same value, and are controlled by software inside the system controller 24.

The offset correction circuit 22 corrects the offset amount read from the first memory circuit 20 or the offset detection circuit 17 via the switch 26 by adding or subtracting 1 to or from the tracking error signal 101. The amplitude correction circuit 23 corrects the amplitude of the offset-corrected tracking error signal output from the offset correction circuit 22 by using the amplitude value read from the second memory circuit 21 or the amplitude detection circuit 18 via the switch 27, and outputs an offset tracking error signal 102. The tracking control circuit 15 outputs a tracking drive signal 103 to the tracking drive circuit 16 on the basis of the correction tracking error signal 102 or the object lens displacement amount 105 estimated by the object lens displacement observer 19. The system controller 24 is a calculation circuit and formed of a CPU and the like for controlling the operation conditions of the respective circuits inside the system control block 25 and for carrying out calculation in accordance with the externally-input operation mode of the optical information recording and reproducing apparatus of the present embodiment.

Regarding the operation of the optical information recording and reproducing apparatus of the embodiment 1 of the present invention configured as described above, the correction mode, the ordinary mode and the initialization mode of the tracking error signal correction operation will be described below respectively.

The correction mode is a mode wherein the offset correction amount and the amplitude correction amount are learnt beforehand. The normal mode is a mode wherein the tracking control loop 201 is corrected on the basis of the result of learning in the correction mode. The initialization mode is a mode wherein the control signals inside the tracking control loop 201 are initialized before the mode shifts to the normal mode.

Figure 2:
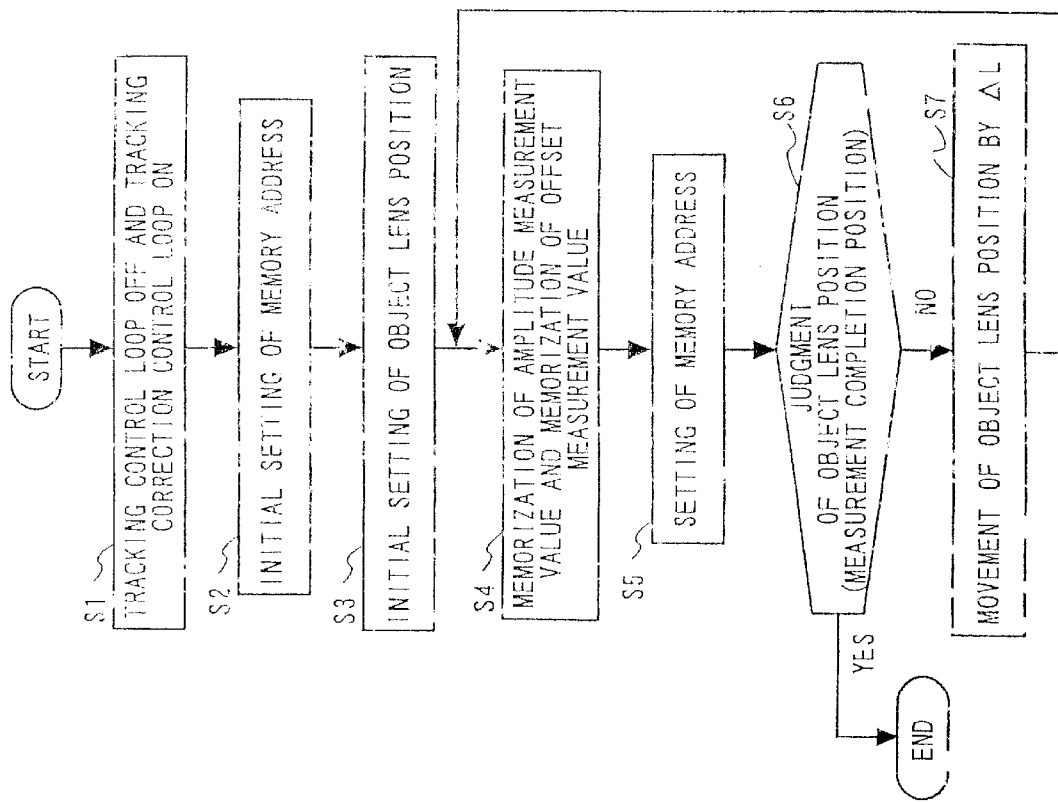
FIG. 2(a) is a flowchart showing the correction-mode operation of the optical information recording and reproducing apparatus in accordance with the embodiment 1 of the present invention, and (b) and (c) are tables showing the contents of the memory circuits of the optical information recording and reproducing apparatus in accordance with the embodiment 1 of the present invention.
Figure 3:
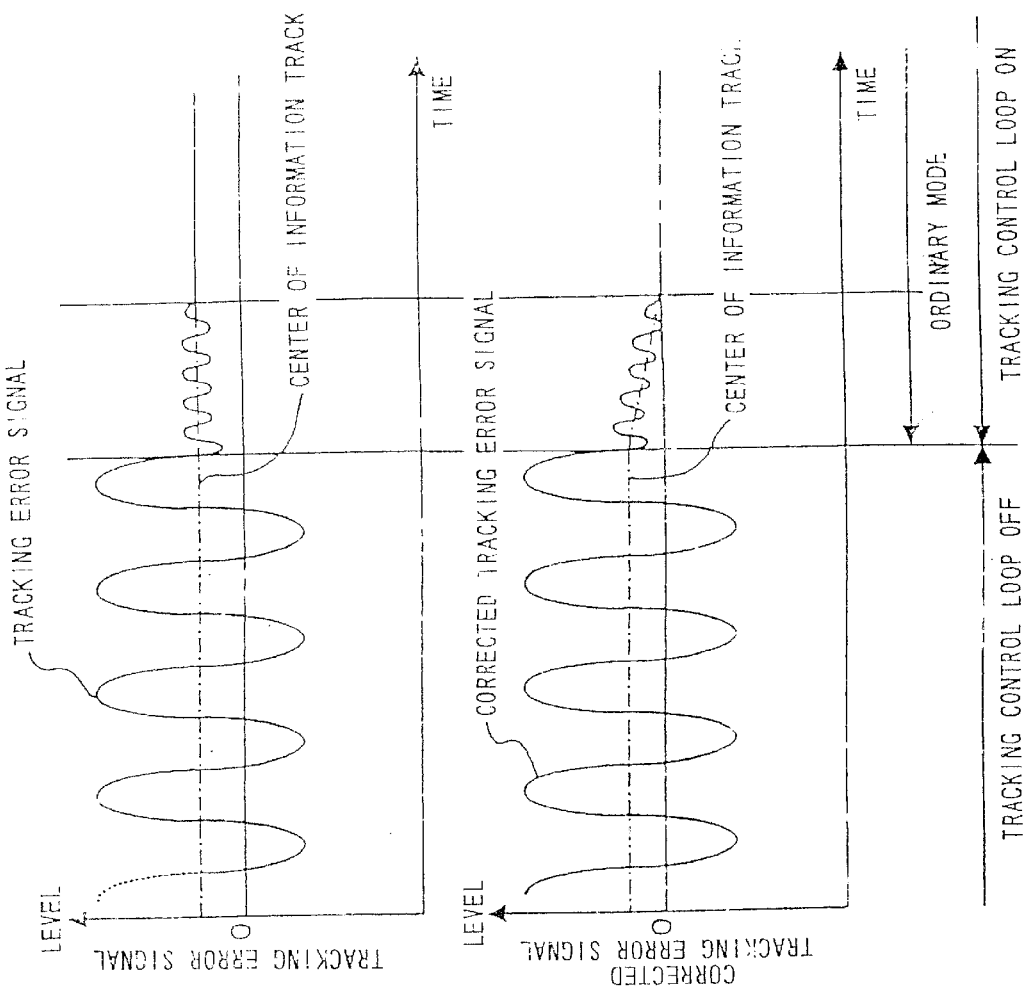
FIG. 3(a) is a flowchart showing the ordinary-mode operation of the optical information recording and reproducing apparatus in accordance with the embodiment 1 of the present invention, and (b) is a graph showing the change in the level of the. tracking error signal at the time when a tracking control loop in accordance with the embodiment 1 of the present invention is switched from OFF to ON in the embodiment 1 of the present invention.
Figure 3:
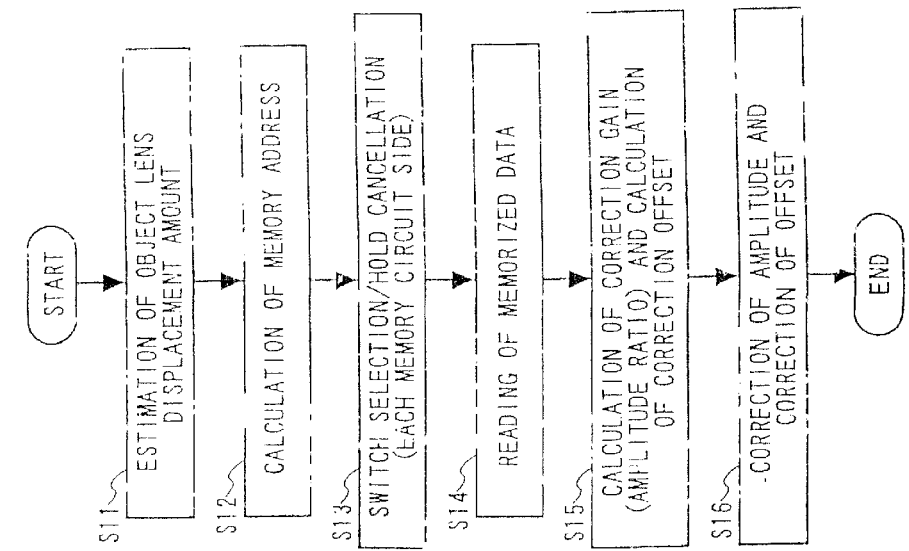
Figure 4:
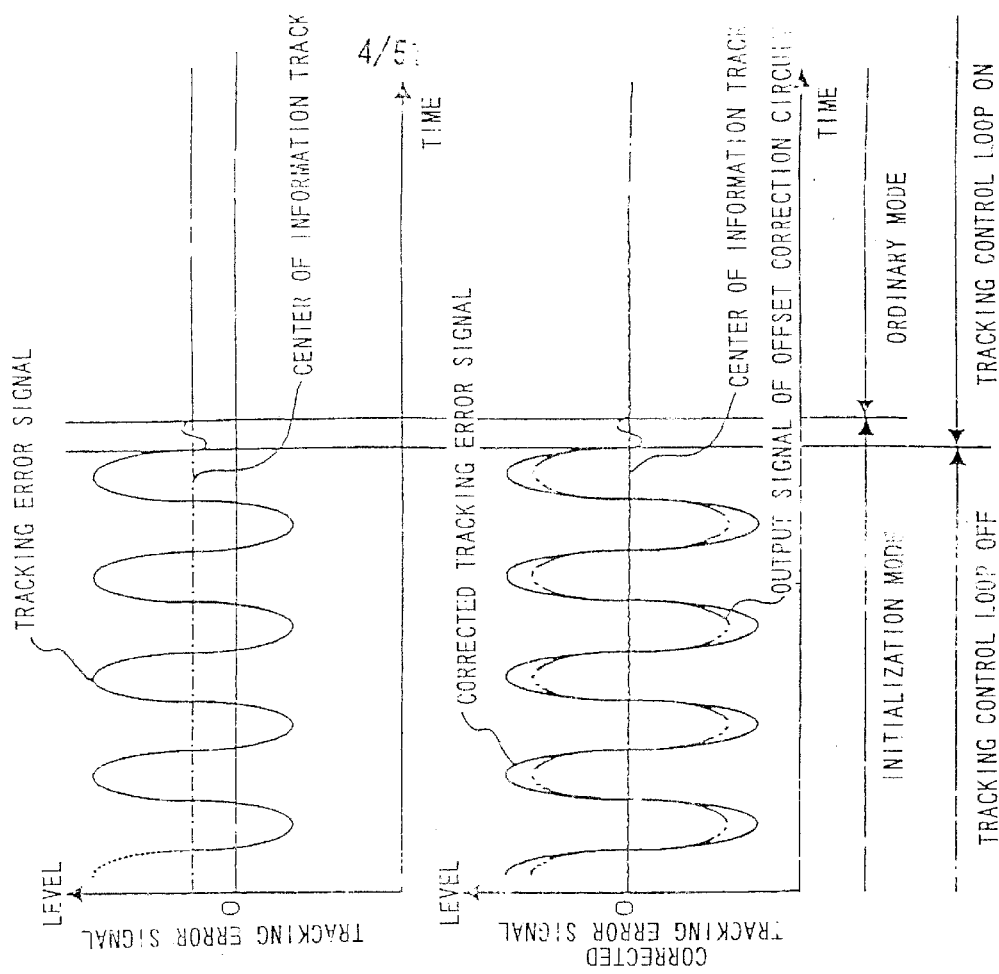
Figure 4:
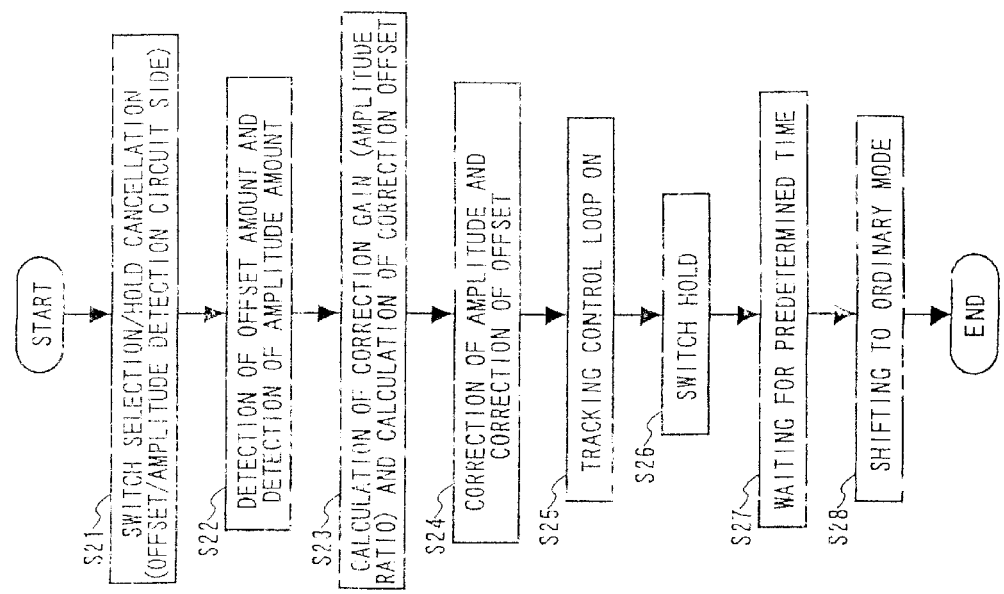

First, the correction mode will be described. FIG. 2(*a*) is a flowchart representing the operation in the correction mode of the present embodiment. Usually, the correction mode is carried out when the apparatus is started first and when the disk is replaced. When the mode is shifted to the correction mode, the tracking control loop 201 is turned OFF (the operation of the tracking control loop 201 is stopped), and the tracking correction control loop 202 is turned ON (the tracking correction control loop 202 is operated) (step S1). Then, the memory addresses of the first memory circuit 20 and the second memory circuit 21 are initialized. This initialization is carried out by setting the memory address at N(N is an integer not less than 0) for example (step S2). Next, the initial position of the object lens 8 is set. This initial position is set at one end of the movable range of the object lens 8 for example. The tracking drive signal 103 is output from the tracking control circuit 15 to the tracking drive circuit 16 to drive the tracking actuator 10 and to move the object lens 8 to its initial position (step S3). At this time, the object lens displacement amount 105 estimated by the object lens displacement observer 19 and the offset amount detected by the offset detection circuit 17 are stored in the first memory circuit 20. Furthermore, the object lens displacement amount 105 estimated by the object lens displacement observer 19 and the amplitude amount detected by the amplitude detection circuit 18 are stored in the second memory circuit 21 (step S4). To each of the memory addresses of the first and second memory circuit 20 and 21, +2 is added (step S5). Then, a judgment is made as to whether the displacement of the object lens 8 has extended from one end to the other end (step S6). If the position of the object lens 8 has not extended from one end to the other end, the position of the object lens 8 is moved by ΔL (step S7), the sequence returns to step S4, and the same processes are repeated. If the position of the object lens 8 has extended from one end to the other end, this correction mode ends. By carrying out the above-mentioned processes, the offset amount and the amplitude value of the tracking error signal 101 corresponding to a certain object lens displacement amount can be stored in the first memory circuit 20 and the second memory circuit 21 respectively as shown in FIG. 2(b) and FIG. 2(c).

Next, the ordinary mode will be described. FIG. 3(a) is a flowchart showing the operation in the ordinary mode in the present embodiment. The ordinary mode is carried out after a standby mode described later, and the tracking control loop 201 has been turned ON.

In the ordinary mode, the object lens displacement observer 19 first estimates the object lens displacement amount 105, and this amount is stored in the first and second memory circuits 20 and 21 (step S11). Next, the memory addresses of the first memory circuit 20 and the second memory circuit 21 in which the estimated object lens displacement amount 105 is stored are calculated (step S12). The hold states of the switch 26 and the switch 27 are canceled, and switched to the sides of their corresponding memory circuits, that is, the sides of the Q1 and Q2 respectively (step S13). The offset amount and the amplitude value are read from the first and second memory circuit 20 and 21 respectively (step S14). An offset addition amount and an amplitude gain are calculated by the system controller 24 so that the value of the correction tracking error signal 102 becomes equal to the value of the tracking error signal 101 obtained in the case when the displacement amount of the object lens 8 is zero (step S15). The offset addition amount obtained in this way is added by the offset correction circuit 22, and the amplitude gain is multiplied by the amplitude correction circuit 23 to correct the tracking error signal (step S16). The tracking control loop 201 outputs a drive command from the tracking control circuit 15 to the tracking drive circuit 16 so that the correction tracking error signal 102 becomes zero. The tracking drive circuit 16 flows a current to the coil 11 to generate an electromagnetic force thereby to move the object lens 8.

FIG. 3(b) is a waveform graphs showing the changes of the tracking error signal 101 and the correction tracking error situation 102 with respect to the time when the tracking control loop 201 is switched from OFF to ON in a state wherein the object lens has caused a displacement in the present embodiment. When the tracking control loop 201 is in the OFF state, the tracking error signal 101 is output in a sine waveform as shown in FIG. 3(b). Since the operation of the tracking control circuit 15 is stopped, the values of the tracking drive signal 103 and the tracking correction signal 104 become unstable. The object lens displacement amount 105 estimated by the object lens displacement observer 19 also becomes unstable. Therefore, corrections by the offset correction circuit 22 and the amplitude correction circuit 23 cannot be carried out, and the correction tracking error signal 102 becomes equal to the tracking error signal 101. As shown in the two-dot chain line, the center value of the amplitude of the signal increases from the zero level, whereby an offset occurs with respect to the center position of the information track. If the mode is shifted to the ordinary mode at the same time when the tracking control loop 201 becomes ON, the control loop becomes unstable transiently owing to the offset of the correction tracking error signal 201; this causes a problem of making recording and reproduction impossible until the control loop becomes stable. To solve this problem, the process in the initialization mode is carried out when the tracking control loop 201 is switched from ON to OFF. The initialization mode will be described below.

FIG. 4(a) is a flowchart showing the operation in the initialization mode in the present embodiment.

When the mode is shifted to the initialization mode, the switch 26 is switched to the output side (P1) of the offset detection circuit 17, and the switch 27 is switched to the output side (P2) of the amplitude detection circuit 18(step S21). The offset correction circuit 22 detects the offset amount of the tracking error signal 101 of the output of the offset detection circuit 17. The amplitude correction circuit 23 detects the amplitude value of the output of the amplitude detection circuit 18(step S22). Then, the offset addition amount and the amplitude gain are calculated by the system controller 24 so that the value of the correction tracking error signal 102 becomes equal to the tracking error signal 101 in the case when the object lens displacement amount is zero (step S23). The off set addition amount obtained in this way is added at the offset correction circuit 22, and the amplitude gain is multiplied at the amplitude correction circuit 23 to correct the tracking error signal (step S24).

Next, the tracking control loop 201 is turned ON, and tracking control is started so that the correction tracking error signal 102 becomes zero (step S25). However, when the tracking control loop 201 is in the ON state, control is carried out so that the tracking error signal 101 becomes zero; therefore, it is difficult to detect the offset amount and the amplitude value. Hence, the switch 26 and the switch 27 are set in the hold state at the same time when the tracking control loop becomes ON (step S26) to prevent the malfunction of the tracking control loop 201 owing to improper detection of the offset amount and the amplitude value. After the passage of a predetermined time (step S27), the system controller 24 switches the operation mode to the ordinary mode (step S28). In other words, the hold states of the switch 26 and the switch 27 are canceled, and the switches 26, 27 are turned to their sides of the memory circuits 20 and 21 respectively, and the offset is corrected by the object lens displacement amount 105 detected by the object lens displacement observer 19.

FIG. 4(b) is a graph showing the changes of the tracking error signal 101 and the correction tracking error signal 102 with respect to time when the tracking control loop 201 is switched from OFF to ON in a state wherein the object lens 8 has caused a positional displacement. Incidentally, the waveform indicated in the two-dot chain line is the output signal from the offset correction circuit 22. As shown in FIG. 4(b), in the standby mode and in the state that the tracking control loop 201 is OFF, the tracking error signal 101 is output in a sine waveform. The offset detection circuit 17 and the amplitude detection circuit 18 detect the center value and the amplitude of the tracking error signal having the sine waveform as an offset amount and an amplitude value respectively. The tracking error signal 101 is corrected depending on the offset amount and the amplitude value detected as described above. The center value of the tracking error signal 102 corrected by the offset correction circuit 22, that is, the center position of the information track, can be made coincident with the zero level as indicated in the two-dot chain line of FIG. 4(b). Furthermore, the amplitude of the correction tracking error signal 102 output from the amplitude correction circuit 23 can be made equal to that in the case when the object lens 8 does not cause any displacement. In other words, by carrying out control so that the correction tracking error signal 102 becomes zero, the object lens 8 can be made to follow the center of the information track 1.

In the ordinary mode, the variations in the offset amount and the amplitude value of the tracking error signal 101 are corrected depending on the positional displacement of the object lens 8, whereby it is possible to make the zero level of the correction tracking error signal 102 agree with the center position of the information track as indicated in the solid line of FIG. 4(b). Furthermore, the detection gain of the tracking error signal for determining the amplitude value can also be made equal to that obtained in the case when no object lens displacement occurs. In other words, even if the object lens 8 causes a positional displacement, it is possible to obtain tracking control performance equivalent to that obtained when the positional displacement is zero.

Figure 5:
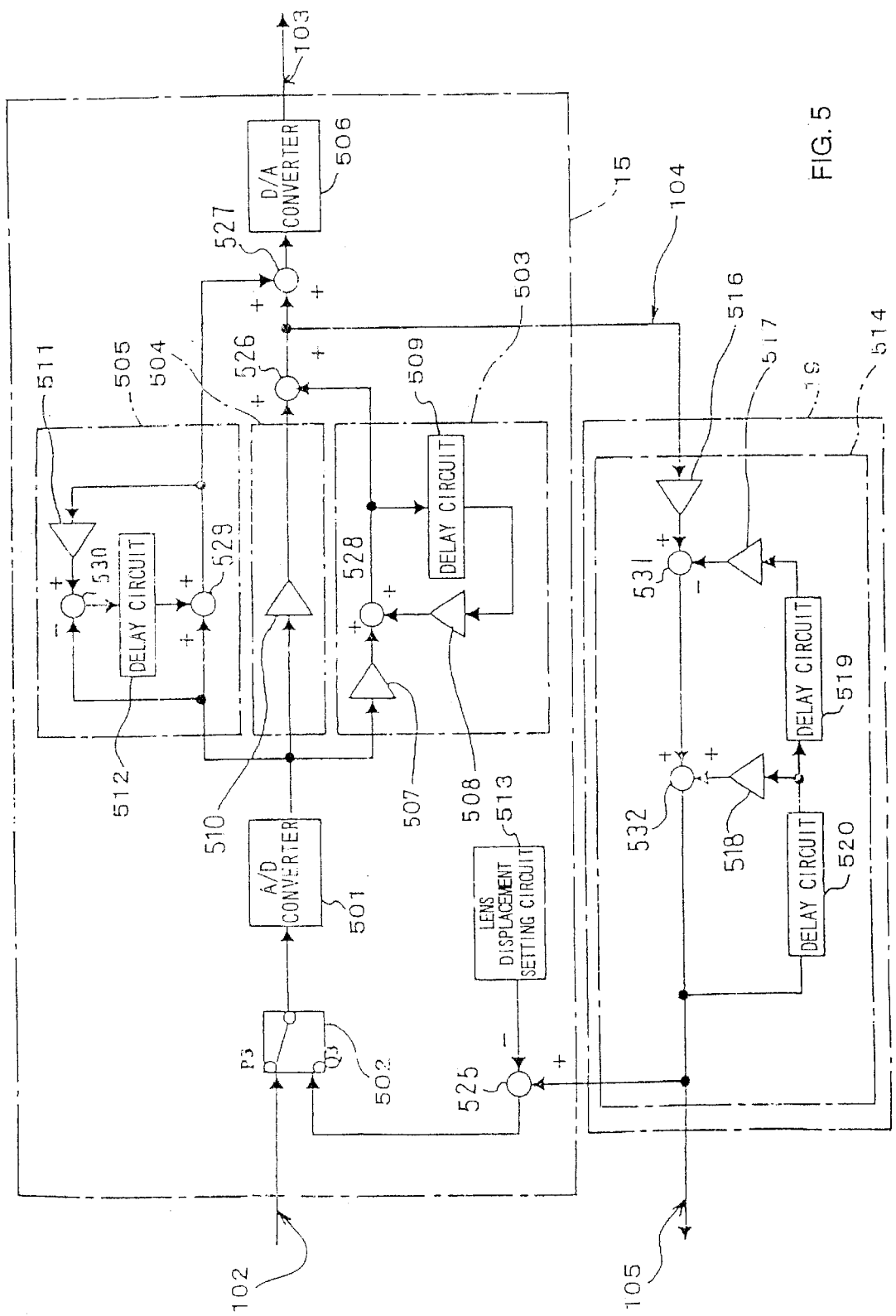
FIG. 5 is a block diagram showing the configurations of a tracking control circuit and an object lens displacement observer in accordance with the embodiment 1 of the present invention.
Figure 7:
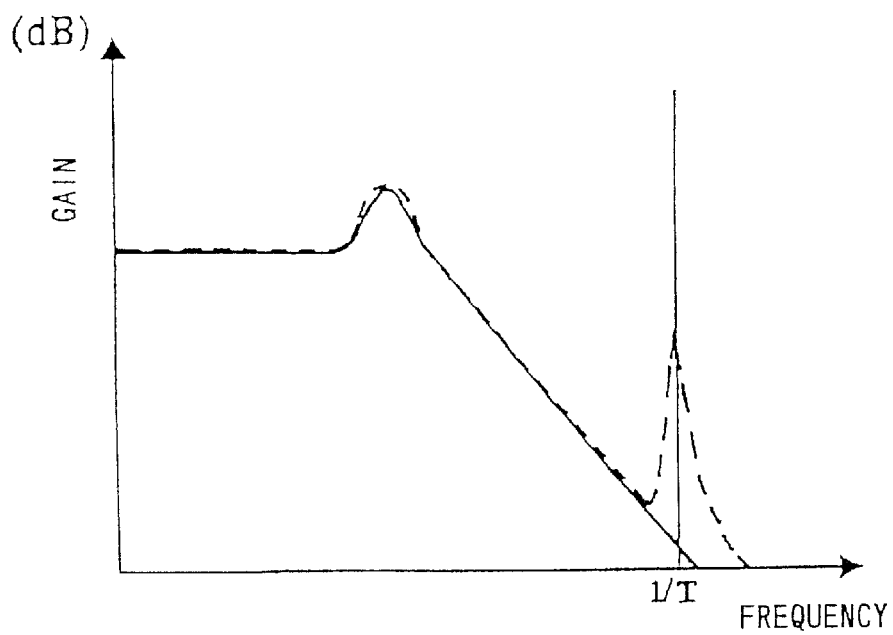
FIGS. 7(a) and (b) are the transfer characteristic graphs of an equivalent filter in accordance with the embodiment 1 of the present invention.
Figure 7:
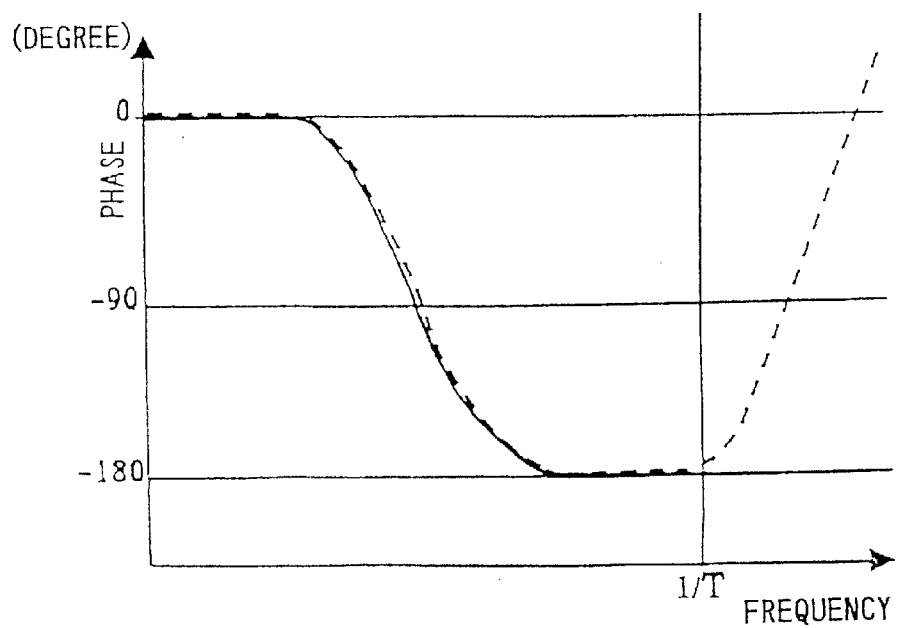
Figure 8:
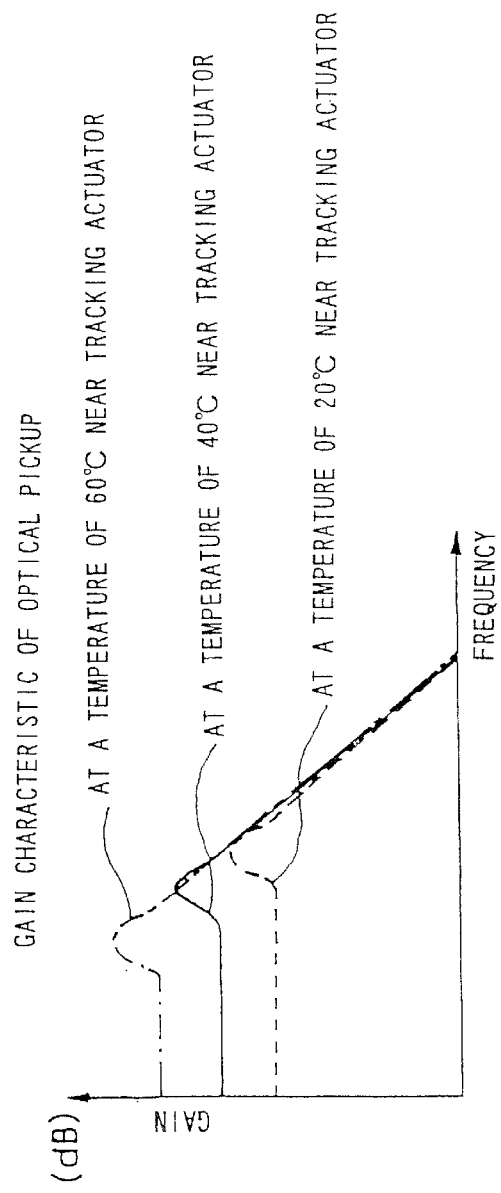
FIGS. 8(a) and (b) are the transfer characteristic graphs of an optical pickup in accordance with the embodiment 1 of the present invention.
Figure 8:
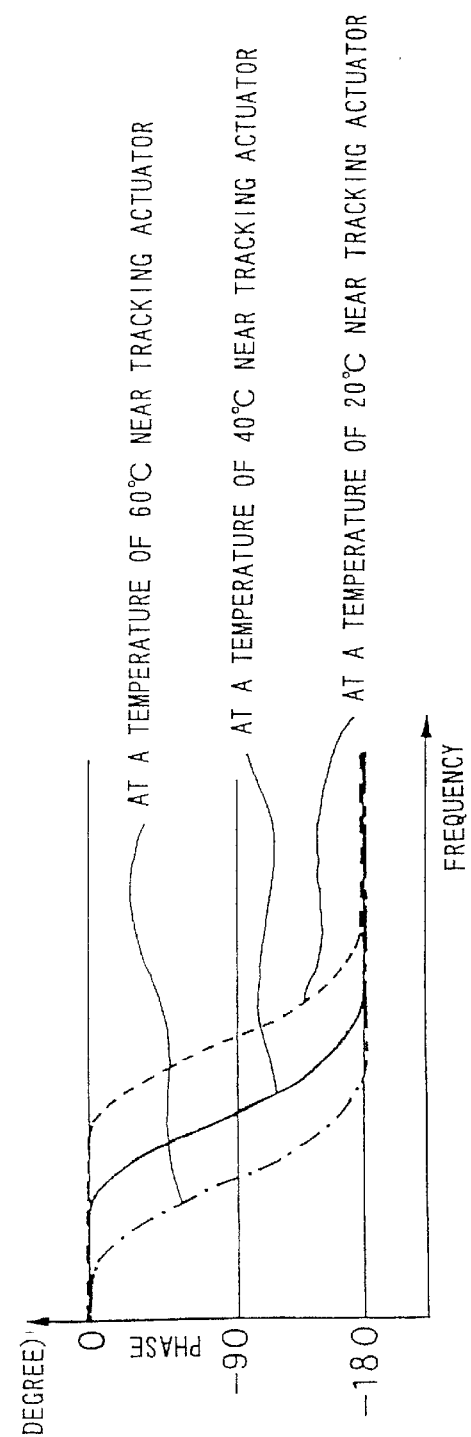

Next, the detailed operations of the tracking control circuit 15 and the object lens displacement observer 19 will be described. FIG. 5 is a block diagram showing the concrete configurations of the tracking control circuit 15 and the object lens displacement observer 19 in accordance with the present embodiment. As shown in FIG. 5, the tracking control circuit 15 comprises an A/D converter 501, a switch 502, an integration calculation circuit 503, a proportional calculation circuit 504, a differentiation calculation circuit 505, a D/A converter 506 and a lens displacement setting circuit 513.

The correction tracking error signal is input to one switching contact P3 of the switch 502, and the output of an adder 525 is input to the other switching contact Q3. The common contact of the switch 502 is connected to the input terminal of the A/D converter 501. The output terminal of the A/D converter is connected to the input terminals of the integration calculation circuit 503, the proportional calculation circuit 504 andthe differentiation calculation circuit 505. The output terminals of the integration calculation circuit 503 and the proportional calculation circuit 504 are connected to the two input terminals of an adder 526, and the output terminal of the adder 526 is connected to the input terminals of an adder 527 and the object lens displacement observer 18. The output terminal of the differentiation calculation circuit 505 is connected to the other input of the adder 527, and the output terminal of the adder 527 is connected to the input terminal of the D/A converter 506. The tracking drive signal 103 is output from the output terminal of the D/A converter 506. The output terminal of the object lens displacement observer 19 and the output terminal of the lens displacement setting circuit 513 are connected to the two input terminals of the adder 525 respectively.

The integration calculation circuit 503 has a multiplier 507 of gain GA and a multiplier 508 of gain GB and a delay circuit 509. The proportional calculation circuit 504 has a multiplier 510 of gain GC. The differentiation calculation circuit 505 has a multiplier 511 of gain GD and a delay circuit 512. The object lens displacement observer 19 comprises an equivalent filter 514 having a multiplier 516 of gain GE, a multiplier 517 of gain GF, a multiplier 518 of gain GG and delay circuits 519 and 520.

Next, the detailed operations of the tracking control circuit 15 will be described in the operation modes of the above-mentioned tracking error signal correction, that is, the initialization mode, ordinary mode, correction mode and standby mode by using FIG. 5.

First, the operations in the initialization mode and the ordinary mode will be described. In the initialization mode, when the tracking control loop 201 is OFF, the tracking control circuit 15 is in an operation stop state. In the standby mode, when the tracking control loop 201 is ON, and when the mode is the ordinary mode, the switch 502 is switched to the switch contact P3, and the correction tracking error signal 102 is input to the A/D converter 501, whereby the analog signal is converted into a digital signal. The digital correction tracking error signal 102 is input to the integration calculation circuit 503, the proportional calculation circuit 504 and the differentiation calculation circuit 505.

The values of the gains GA, GB, GC and GD of the multipliers 507, 508, 510 and 511 provided in the integration calculation circuit 503, the proportional calculation circuit 504 and the differentiation calculation circuit 505 are set by the system controller 24 shown in FIG. 1. The multipliers 507, 508, 510 and 511 and adder-subtracters 528, 529 and 530 operate at a predetermined sampling period T. The delay circuits 509 and 512 delay the digital signals input thereto by the period T. By setting the gains GA, GB, GC and GD at predetermined values respectively and by adding the outputs of the integration calculation circuit 503, the proportional calculation circuit 504 and the differentiation calculation circuit 505, it is possible to attain a function as a compensation filter for obtaining the low-frequency gain and phase allowance of the control system.

The frequency transfer characteristic of this compensation filter is shown in FIG. 6. FIG. 6(a) shows the gain characteristic of a phase compensation filter, and FIG. 6 (b) shows the phase characteristic of the phase compensation filter. In both of FIGS. 6(a) and (b), the abscissa represents frequency in logarithm, gain is represented in dB, and phase is represented in degree. It is characterized that the gain intersection (the frequency at which the gain becomes zero) of the tracking control system is generally about 1 kHz, and that the phase advances at about 1 kHz. The output of this compensation filter is input to the D/A converter 506 and converted into an analog signal, and the signal is output as the tracking drive signal 103.

Next, the operation in the correction mode will be described by using FIG. 5. In the correction mode, the switch 502 is switched to the switch contact Q3, unlike the cases of the initialization mode and the ordinary mode. As a result, a difference signal between the signal indicating the object lens displacement amount estimated by the object lens displacement observer 19 and the signal of the lens displacement setting circuit is input to the A/D converter 501 via the switch 502 (sic 502). The output of the A/D converter 501 is input to the integration calculation circuit 503, the proportional calculation circuit 504 and the differentiation calculation circuit 505 constituting the compensation filter. With this configuration, the signals indicating the positional displacement amounts of the object lens 8 to be set at step S3 and step S7 of the flowchart shown in FIG. 2(a) are output from the lens displacement setting circuit 513, whereby the object lens 8 can be moved to the predetermined position.

Next, the detailed operation of the object lens displacement observer 19 will be described by using FIG. 5 in each of the above-mentioned tracking error signal correction operation modes. First, the operations in the initialization mode and the ordinary mode will be described. In the initialization mode, when the tracking control loop 201 is OFF, the operation of the object lens displacement observer 19 is in a stop state. In other cases, the values of the gains GE, GF and GG of the multipliers 516, 517 and 518 provided in the equivalent filter 514 are set by the system controller 24 shown in FIG. 1. The multipliers 516, 517 and 518 and adder-subtracters 531 and 532 shown in the figure operate at the sampling period T, and the delay circuits 519 and 520 delay the digital signals input thereto by the period T and then output them.

In the optical pickup 4 shown in FIG. 1, the coil 11 provided with the object lens 8 is bonded to one end of the spring 12, and the other end of the spring 12 is bonded to the magnet 13. Since the bonded sections at the bases of both ends of the spring 12 have viscosity, the frequency transfer characteristic G (s) of the displacement of the object lens 8 with respect to the tracking drive signal 103 becomes a secondary system represented by expression (1).

$$G(s) = GH \times Kt/(m \times s_2 + D \times s + Ke) \quad (1)$$

In expression (1), GH is the gain of the tracking drive circuit 16 shown in FIG. 1, Kt is a driving force constant, m is the weight of the movable section including the object lens 8 and the coil 11, D is a viscosity coefficient, and Ke is a spring constant. Hereafter, the frequency transfer characteristic G (s) of the displacement of the object lens 8 with respect to the drive command to the tracking actuator 10 is represented as the transfer characteristic of the optical pickup.

By setting the gains GE, GF and GG of the multipliers 516, 517 and 518 inside the equivalent filter 514 at predetermined values, the frequency transfer characteristic of the equivalent filter 514 can be made equal to the frequency transfer characteristic represented by the expression (1). The transfer characteristic can be approximated by obtaining the values of the gains GE, GF and GG from three relational expressions shown in expression (2) for example.

$$GE = GH \times Kt/(m/T2 + D/T + Ke) \; GF = m/T2/(m/T2 + D/T + Ke) \; GG = (2 \times m/T2 + D/T)/(m/T2 + D/T + Ke) \quad (2)$$

In the expression (2), the coefficients GH, Kt, m, D and Ke are the same as those of the expression (1), and the same coefficient values as those of the expression (1) are substituted. In addition, T designates a sampling period. The three relational expressions in the expression (2) are obtained by bilinear conversion shown in expression (3) used as one of conversion formulas for obtaining digital filters having nearly equal frequency transfer characteristics from transfer characteristic expressions represented in analog forms. (Reference literature: Refer to "Digital signal processing and control" written by Hidenori Kimura and issued by Shokodo Publishing.)

$$s = (1 - z^{-1})/T \quad (3)$$

When the expression (3) is substituted in the expression (1), expression (4) is obtained.

$$Gt(z) = GH \times Kt/\{(m/T^2) \times z^{-2} + (2 \times m/T^2 + D/T) \times z^{-1} + m/T^2 + D/T + Ke\} \quad (4)$$

In the expression (4), the same coefficient values as those of the expression (1) are substituted for the coefficients GH, Kt, m, D and Ke. The characteristics of the equivalent filter 514 shown in FIG. 5 (sic FIG. 6) are represented by this expression (4).

FIGS. 7(a) and (b) are graphs showing the transfer characteristics of this equivalent filter 514 and the transfer characteristics of the optical pickup. FIG. 7(a) shows the gain characteristic, and FIG. 7(b) shows the phase characteristic. The abscissa represents frequency in logarithm. Gain is represented in dB value. In FIGS. 7(a) and (b), solid lines represent the transfer characteristics of the optical pickup, and dotted lines represent the transfer characteristics of the equivalent filter 514. As shown in FIGS. 7(a) and (b), the transfer characteristics of the optical pickup 4 become nearly equal to the transfer characteristics of the equivalent filter 514 in both of the gain and phase at low frequencies. However, since the equivalent filter 517 is a digital filter operating at a constant sampling time T, folding back occurs in the vicinity of the sampling frequency (1/T), and a difference occurs in the transfer characteristic. Thus, the addition signal of the output of the proportional calculation circuit 504 and the output of the integration calculation circuit 503 of the tracking control circuit 15 are input to the equivalent filter 517. Then, the object lens displacement observer 19 is set so that the transfer characteristic of the optical pickup 4 (in other words, the ratio of the command value input to the optical pickup 4 and the displacement amount of the optical pickup (object lens)) becomes nearly equal to the transfer characteristic of the object lens displacement observer 19 (in other words, the ratio of the input signal to the object lens displacement observer 19 to the output signal). If a signal nearly equal to the input signal of the optical pickup 4 is input to the object lens displacement observer 19, the output of the object lens displacement observer 19 becomes nearly equal to the displacement amount of the optical pickup (object lens). Therefore, the object lens displacement amount is estimated by using only the signal components obtained by removing the high frequency components included in the tracking drive signal 103. Since the sampling frequency (1/T) is sufficiently higher than the rotation frequency of the disk 2 in general, the object lens displacement due to the eccentricity of the disk 2 can be estimated almost completely by the configuration of the present embodiment.

In the present embodiment, the transfer characteristic of the optical pickup 4 is represented by a secondary transfer function expression to obtain the characteristic of the equivalent filter 514 by bilinear conversion. However, the number of the degrees of the transfer characteristic of the optical pickup 4 and the conversion system to the digital filter are not limited to those of the present embodiment. By setting the number of degrees to 3 or more and by using a conversion system having higher approximation accuracy, the estimation accuracy of the object lens displacement can be raised. Furthermore, although the displacement of the object lens is estimated by using the equivalent filter 514 in the present embodiment, a similar effect can be obtained even when a position sensor for optically detecting the position of the object lens 8 is used. Moreover, the tracking drive signal 103 of an input signal to the object lens displacement observer 19 uses the sum signal of the proportional calculation circuit 504 and the integration. calculation circuit 503 inside the tracking control circuit 15. Since the output of the integration calculation circuit 503 includes the object lens displacement amount, the object lens displacement amount can be estimated by using only the output of the integration calculation circuit 503, and a similar effect can be obtained.

In the embodiment 1, the object lens displacement amount is estimated on the basis of the tracking correction signal 104 used as an internal signal of the tracking control circuit 15 by using the equivalent filter 514. FIGS. 8(a) and (b) are graphs showing the transfer characteristics of the optical pickup 4 at the time when the temperature in the vicinity of the tracking actuator 10 has changed. FIG. 8(a) shows the gain characteristic in dB values, and FIG. 8(b) shows the phase characteristic. The abscissas of both of FIGS. 8(a) and (b) represent frequencies in logarithm. As shown in FIGS. 8(a) and (b), if the temperature in the vicinity of the tracking actuator 10 changes, the DC gain at a primary resonance frequency changes. The primary resonance frequency is the frequency of the resonance point determined by the weight m, viscosity coefficient D and spring constant Ke of the movable section including the object lens 8 and the coil 11 described above, and the central frequency is calculated by expression (5). The gain of the primary resonance frequency is calculated by expression (6). The gain (DC gain) at the time when the drive signal has a DC component only is calculated by expression (7).

$$\sqrt{Ke/m}/2\times\pi \tag{5}$$

$$\sqrt{m\times Ke}/D \tag{6}$$

$$GH \times Kt/Ke \tag{7}$$

In the expressions (5) to (7), GH represents the gain of the tracking drive circuit 16, and Kt represents a driving force constant. m represents the weight of the movable section including the object lens 8 and the coil 11, D represents a viscosity coefficient, and Ke represents a spring constant. If the environmental temperature of the tracking actuator 10 changes, the characteristics of the spring mainly constituting the tracking actuator 10 and the bonded sections at both ends of the spring change. In other words, the spring constant Ke and the viscosity coefficient D in the expressions (5) to (7) change, and the frequency transfer characteristic of the optical pickup changes. If a difference from the frequency transfer function of the equivalent filter 514 calculated in accordance with the expression (2) is caused by this change, and if an error occurs in the estimation of the object lens displacement amount, the control system becomes unstable.

Embodiment 2

An optical information recording and reproducing apparatus in accordance with an embodiment 2 of the present invention will be described referring to FIGS. 9 and 12. The components having the same configurations and functions as those of the embodiment 1 are designated by the same numerals and their overlapping explanations are omitted. The important points of the embodiment 2 are described below.

(1) In a learning mode described later, a tracking learning loop 203 is operated instead of the ordinary tracking control loop 201.

(2) In the tracking learning control loop 203, the frequency transfer characteristic of the optical pickup is learnt by an optical pickup transfer characteristic detection circuit 31, and the gains of the multipliers inside the equivalent filter 514 are calculated.

(3) On the basis of the result of this learning, in a correction mode described later, the frequency transfer characteristic of the equivalent filter 514 is corrected.

Figure 9:
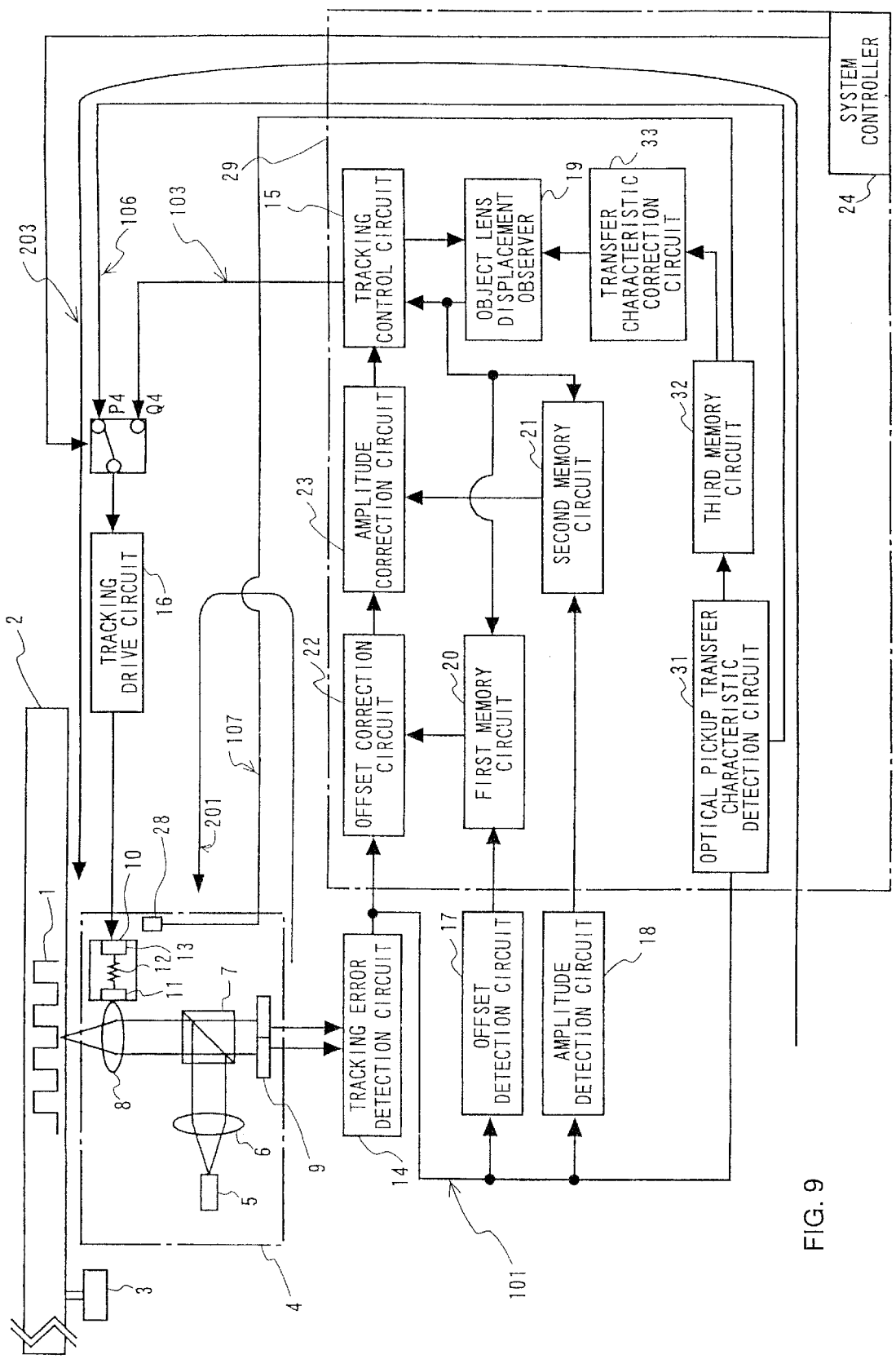
FIG. 9 is a block diagram showing the configuration of an optical information recording and reproducing apparatus in accordance with embodiment 2 of the present invention.

FIG. 9 is a block diagram showing the configuration of the optical information recording and reproducing apparatus in accordance with the embodiment 2. In FIG. 9, the tracking learning control loop 203 is formed of a circuit loop comprising an optical pickup 4, a tracking error detection circuit 14, an optical pickup transfer characteristic detection circuit 31, a switch 30 and a tracking drive circuit 16. A temperature detection sensor 28 used as a temperature detection means detects the temperature in the vicinity of the tracking actuator 10 of the optical pickup 4 and outputs actuator temperature data 107.

The switch 30 is a switching means for switching the drive signal for the tracking drive circuit 16 to the tracking drive signal 103 or a tracking learning signal 106 output from the optical pickup transfer characteristic detection circuit 31 in accordance with a command from the system controller 24. A system control block 29 comprises a tracking control circuit 15, an object lens displacement observer 19, a first memory circuit 20, a second memory circuit 21, an offset correction circuit 22, an amplitude correction circuit 23, the system controller 24, the optical pickup transfer characteristic detection circuit 31, a third memory circuit 32 and a transfer characteristic correction circuit 33. Each circuit in the system control block 29 is connected to the system controller 24, and control signals are input from the system controller 24; however, the wires for the connections are not shown to simplify the drawing.

The optical pickup transfer characteristic detection circuit 31 outputs the tracking learning signal 106 to the tracking drive circuit 16 via the switch 30. The optical pickup transfer characteristic detection circuit 31 is a calculation circuit which detects the optical pickup transfer characteristic based on the tracking error signal 101 at that time, and calculates the values of the gains GE (Sic), GF and GG of the multipliers 517 and 518 of the equivalent filter 514 in the object lens displacement observer 19 shown in FIG. 10. The third memory circuit 32 comprises a memory circuit and the like for storing the temperature in the vicinity of the tracking actuator 10 detected by the temperature detection sensor 28 and the values of the gains GE, GF and GG of the multipliers calculated by the optical pickup transfer characteristic detection circuit 31 as a group. The third memory circuit 32 comprises a digital circuit or a memory built in the system controller 24; in storing, analog amounts are converted into digital values by an A/D converter built in the system controller 24. The transfer characteristic correction circuit 33 is configured to read the values of the gain GE, GF and GG of the multipliers from the third memory circuit 32 and to set the read gains in the multipliers built in the equivalent filter 514.

Figure 10:
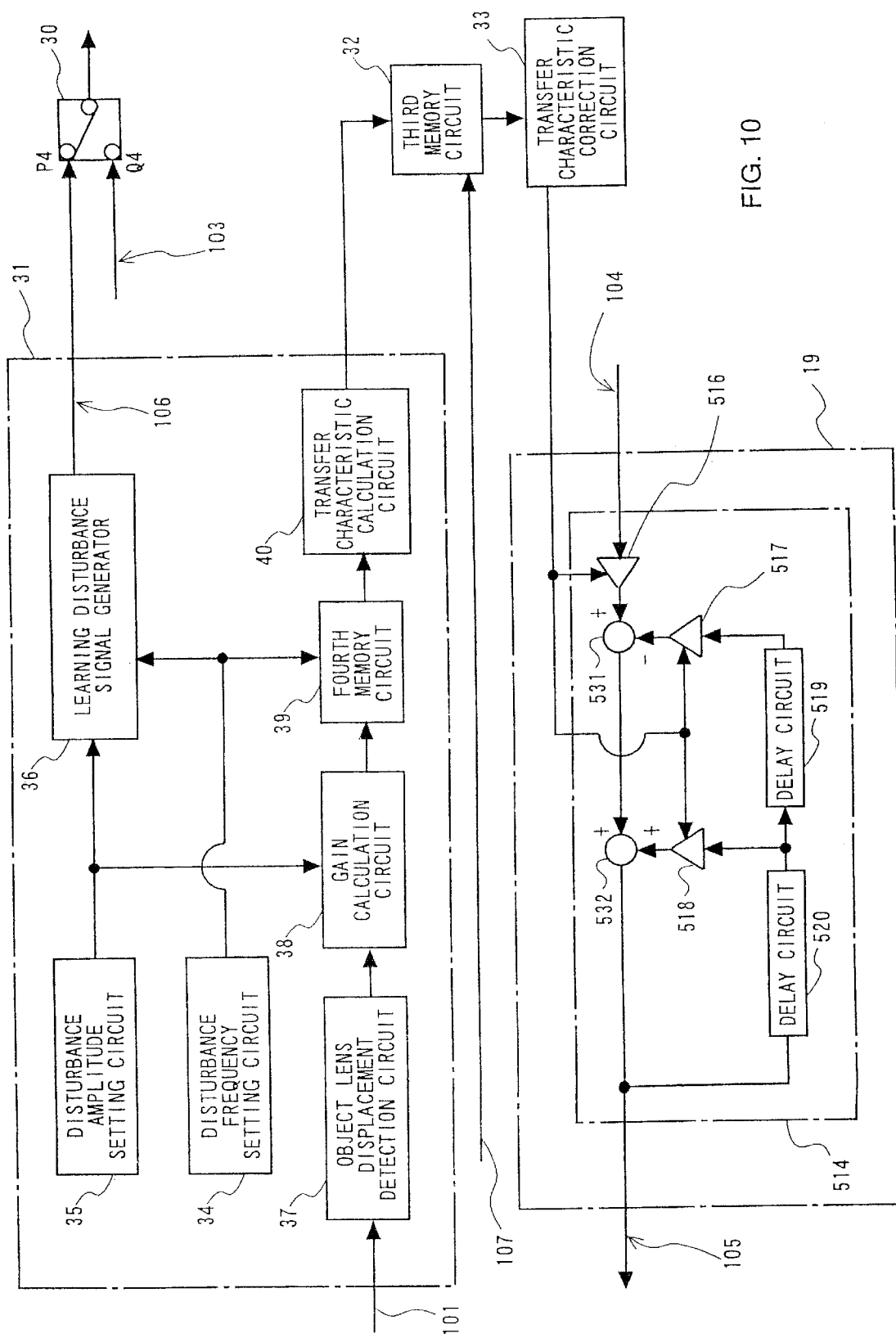
FIG. 10 is a block diagram showing the configurations of an optical pickup transfer characteristic detection circuit and an object lens displacement observer in accordance with the embodiment 2 of the present invention.

FIG. 10 is a block diagram showing an example of a concrete circuit configuration of the optical pickup transfer characteristic detection circuit 31 and an example of a concrete circuit configuration of the object lens displacement observer 19 in accordance with the embodiment 2. As shown in FIG. 10, the object lens displacement observer 19 has the equivalent filter 514. The equivalent filter 514 has a multiplier 516 of a gain GE, a multiplier 517 of a gain GF, a multiplier 518 of a gain GG and delay circuits 519 and 520. The values of the gains GE, GF and GG of the multipliers can be changed by the transfer characteristic correction circuit 33. The multiplier 518 and the adder-subtracters 531 and 532 operate at a predetermined sampling period T, and the delay circuits 519 and 520 delay input digital signals by the period T and output.

The optical pickup transfer characteristic detection circuit 31 has a disturbance frequency setting circuit 34, a disturbance amplitude setting circuit 35, a learning disturbance signal generator 36, an object lens displacement detection circuit 37, a gain calculation circuit 38, a fourth memory circuit 39 and a transfer characteristic calculation circuit 40. The learning disturbance signal generator 36 is a signal generator for outputting the sine-wave tracking learning signal 106; its frequency is set by the disturbance frequency setting circuit 34, and its amplitude is set by the disturbance amplitude setting circuit 35. The object lens displacement detection circuit 37 is formed of a digital circuit and the like for counting the number of tracks crossed by the object lens 8 on the basis of the tracking error signal 101.

The gain calculation circuit 38 is formed of a calculation circuit for calculating the transfer gain of the optical pickup 4 on the basis of the movement distance of the object lens 8 detected by the object lens displacement detection circuit 37 (sic 37) and the value of the tracking learning signal 106. The fourth memory circuit 39 is formed of a memory circuit and the like for storing the transfer gain of the optical pickup calculated by the gain calculation circuit 38 and the frequency of the tracking learning signal 106 as a pair. In addition, the fourth memory circuit 39 is formed of a digital circuit or a memory in the system controller 24; in storing, analog amounts are converted into digital values by the A/D converter built in the system controller 24. The transfer characteristic calculation circuit 40 has a calculation circuit, such as a CPU, for calculating the values of the gains GE, GF and GG of the multipliers 516, 517 and 518 of the equivalent filter 514 built in the object lens displacement observer 19 on the basis of the relationship between the gain and frequency of the optical pickup 4 stored in the fourth memory circuit 39.

Regarding the operations of the optical information recording and reproducing apparatus in accordance with the embodiment 2 of the present invention configured as described above, description is made as to the operation modes for the frequency transfer characteristic correction of the object lens displacement observer 19, that is, the learning mode and the correction mode.

The operations of the respective circuits built in the system control block 29 of the present embodiment shown in FIG. 9 will be described below in each operation mode referring to FIG. 11.

First, the learning mode will be described. FIG. 11 is a flowchart showing the operations of the respective circuits included in the system control block 29 and the switch 30 in the learning mode in the present embodiment. When the mode is shifted to the learning mode, the tracking control loop 201 is turned OFF, and the tracking learning control loop 203 is turned ON. In other words, the switch 30 is turned to its P4 side thereby to connect the tracking drive circuit 16 to the output terminal of the optical pickup transfer characteristic detection circuit 31 (step S41). Next, the memory address of the third memory circuit 32 (sic 32) is initialized. This initialization is carried out by setting its memory address at N (N is an integer not less than 0) for example (step S42). An initial value is set in the disturbance frequency setting circuit 34, and a predetermined amplitude value is set in the disturbance amplitude setting circuit 35. The sine-wave tracking learning signal 106 is output from the disturbance signal generator 36 (step S43). When the temperature in the vicinity of the tracking actuator 10 is 40° C. the initial value of the frequency of the tracking learning signal 106 is ⅟₁₀ of the primary resonance frequency of the transfer characteristic of the optical pickup, for example. The amplitude is a value for displacing the movable range of the object lens 8 by ½.

The tracking learning signal 106 drives the tracking actuator 10 via the switch 30 and the tracking drive circuit 16 thereby to displace the object lens 8 at the same frequency as that of the tracking learning signal 106. The object lens displacement detection circuit 37 obtains the displacement amount of the object lens 8 by counting the number of the zero cross points of the tracking error signal 101, that is, the number of tracks crossed by the object lens 8, and by multiplying this number by a track pitch (the distance between tracks) (step S44).

Next, the gain calculation circuit 38 obtains the gain of the optical pickup 8 by dividing the movement amount detected by the object lens displacement detection circuit 37 by the amplitude of the tracking learning signal 106, that is, the amplitude set in the disturbance amplitude setting circuit 35 (step S45). The value of this gain and the frequency of the tracking learning signal 106, that is, the frequency set in the disturbance frequency setting circuit 34, are stored in the fourth memory circuit 39 as a pair (step S46). Then, a judgment is made as to whether the frequency setting value indicated by the disturbance frequency setting circuit 34 has reached a predetermined frequency or not. This frequency is for example a value 10 times as high as the primary resonance frequency of the transfer characteristic of the optical pickup 4 at the time when the temperature in the vicinity of the tracking actuator 10 is 40° C. (Step S47). If the frequency has not been reached, the frequency of the disturbance frequency setting circuit 34 is set higher by Δf (step S48), the memory address is set at N+2 (step S49), the sequence returns to step S44, and the same processes are repeated. If the frequency has been reached, the frequency and the value of the gain of the optical pickup 4 corresponding to the frequency are recorded as a pair in the fourth memory circuit 39 as shown in FIG. 11(b). Furthermore, the maximum of the gain and the frequency at that time are obtained as the primary resonance gain by the transfer characteristic calculation circuit 40, and the spring constant Ke and the viscosity coefficient D are obtained in accordance with the expressions (5) and (6) (step S49). However, since the values of the variables other than the spring constant Ke and the viscosity coefficient D in the expressions (5) and (6) do not vary depending on temperature, the same coefficient values as those of the expression (1) are used.

By using the spring constant Ke and the viscosity coefficient D obtained as described above, the gains GE, GF and GG of the corresponding multipliers 516, 517 and 518 built in the equivalent filter 514 are calculated in accordance with the expression (2) (step S50). However, the same coefficient values as those of the expression (1) are substituted for the coefficients GH, Kt and m other than Ke and D. Then, the values of the gains GE, GF and GG and the actuator temperature data 107 detected by the temperature detection sensor 28 are stored in the third memory circuit 32 (step S51).

The sequential processes from step S41 to step S51 are repeated while the temperature in the vicinity of the tracking actuator 10 is changed from 20° C. to 60° C. in 1° C. increments for example. By additionally writing the obtained data sequentially from the memory address N of the third memory circuit 32, the values of the gains GE, GF and GG of the multipliers inside the equivalent filter 514 at a certain temperature can be recorded as a group in the third memory circuit 32 as shown in FIG. 11(c). In the learning mode, the operations of the equivalent filter correction circuit 33 and the object lens displacement observer 19 are in stationary states.

Next, the correction mode will be described. FIG. 12 is flowchart showing the operations of the respective circuits included in the system control block 29 in the correction mode in the present embodiment. When the mode is shifted to the correction mode, the tracking control loop 201 is turned ON, and the tracking learning control loop 203 is turned OFF in FIG. 9. In other words, the switch 30 is switched to Q4 thereby to connect the output terminal of the tracking control (sic control) circuit 15 to the input terminal of the tracking drive (sic drive) circuit 16 (sic 16). Then, the operation of the optical pickup transfer characteristic detection circuit 31 is stopped (step S61). Next, the temperature in the vicinity of the tracking actuator 10 is detected by the temperature detection sensor 28 (step S62), and the memory address of the third memory circuit 32 in which the actuator temperature data 107 is stored is obtained (step S63). The values of the gains GE, GF and GG stored together with the actuator temperature data 107 as a group are read from the third memory circuit 32 (step S64). The values of the gains GE, GF and GG of the multipliers 516, 517 and 518 built in the equivalent filter 514 are renewed by the equivalent filter characteristic correction circuit 33(step S65). Then, the operation of the object lens displacement observer 19 starts.

The frequency transfer characteristic of the optical pickup 4 at the temperature in the vicinity of the tracking actuator 10 is learnt beforehand as described below, and the gains of the multipliers 516, 517 and 518 built in the equivalent filter 514 are switched optimally depending on the temperature change. Hence, even if the transfer characteristic of the optical pickup 4 varies depending on the temperature, the frequency transfer characteristic of the equivalent filter 514 can be made equal to the transfer characteristic of the optical pickup 4. As a result, the estimation accuracy of the object lens displacement observer 19 is prevented from lowering, whereby stable tracking error signal correction is made possible. Furthermore, by carrying out the learning mode at each start or at each disk replacement, the frequency transfer characteristic of the equivalent filter 514 can be conformed to the transfer characteristic of the optical pickup 4 even if the transfer characteristic of the optical pickup 4 changes with the passage of time or differs because of the differences inherent in the individual pickups. Therefore, the estimation accuracy can be prevented from lowering, and stable tracking control performance can be attained.

Embodiment 3

Figure 13:
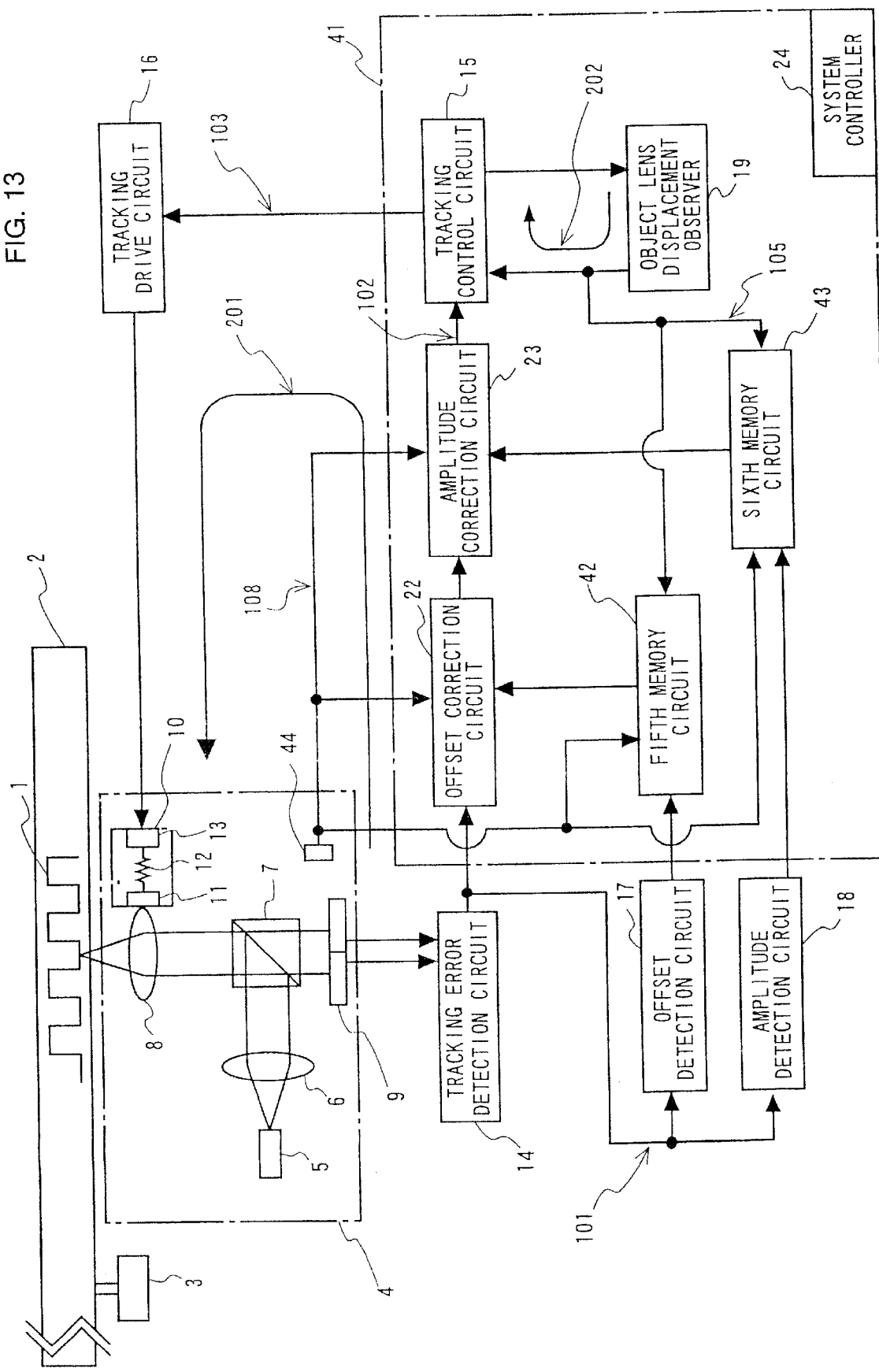
FIG. 13 is a block diagram showing the configuration of an optical information recording and reproducing apparatus in accordance with embodiment 3 of the present invention.

An embodiment 3 in accordance with the present invention will be described below referring to FIGS. 13 to 16. The components having the same configurations and functions as those of the embodiment 1 of the present invention are designated by the same numerals and their explanations are omitted. FIG. 13 is a block diagram showing the configuration of an optical information recording and reproducing apparatus in accordance with the embodiment 3.

In FIG. 13, a tilt sensor 44 is a sensor for detecting the tilt of the disk 2 and detects a tilt angle 108 indicating the tilt of the face of the disk 2 with respect to the light beam in a direction perpendicular to the information tracks. In the tilt sensor 44, the light of a semiconductor laser for example is applied to the face of the disk 2 at a predetermined angle, and the reflected light thereof is detected by a two-part split PD. If the face of the disk 2 is tilted, the input of the two-part split PD changes, whereby the tilt can be detected. The optical pickup 4 is made that angle with respect to the face of the disk can be set at any values by a tilt actuator, not shown, a device for tilting the optical pickup 4. A system control block 41 has a tracking control circuit 15, an object lens displacement observer 19, a fifth memory circuit 42, a fourth memory circuit 41, an offset correction circuit 22, an amplitude correction circuit 23 and a system controller 24. The respective circuits built in the system control block 41 are connected to the system controller 24 (sic 24), and control signals are input from the system controller 25 (sic 24); however, the wires for the connections are not shown to simplify the drawing.

The fifth memory circuit 42 is a memory for storing an object lens displacement amount 105 estimated by the object lens displacement observer 19, the tilt angle 108 detected by the tilt sensor 44 and the offset value of the tracking error detected by the offset detection circuit 17 as one group. A sixth memory circuit 43 is a memory for storing the object lens displacement amount 105 estimated by the object lens displacement observer 19, the tilt angle 108 detected by the tilt sensor 44 and the amplitude value of the tracking error detected by the amplitude detection circuit 18 as one group. The memory circuits 42 and 43 are formed of digital circuits or memories built in the system controller 24; and analog values are converted into digital values by an A/D converter built in the system controller 24 at the time of storing. The system controller 24 is a calculation circuit formed of a CPU and the like for controlling the operation states of the respective circuits inside the system control block 41 and for carrying out calculation processing depending on the externally-input operation modes of the optical information recording and reproducing apparatus of the present embodiment.

The operation of the optical information recording and reproducing apparatus of the embodiment 3 of the present invention configured described above will be described with respect to the correction mode and the ordinary mode, that is, the operation modes for the tracking error signal correction. The correction mode is a mode wherein the offset correction amount and the amplitude correction amount are learnt beforehand. The normal mode is a mode wherein the tracking control loop 201 is corrected on the basis of the result of the learning in the correction mode.

Figure 14:
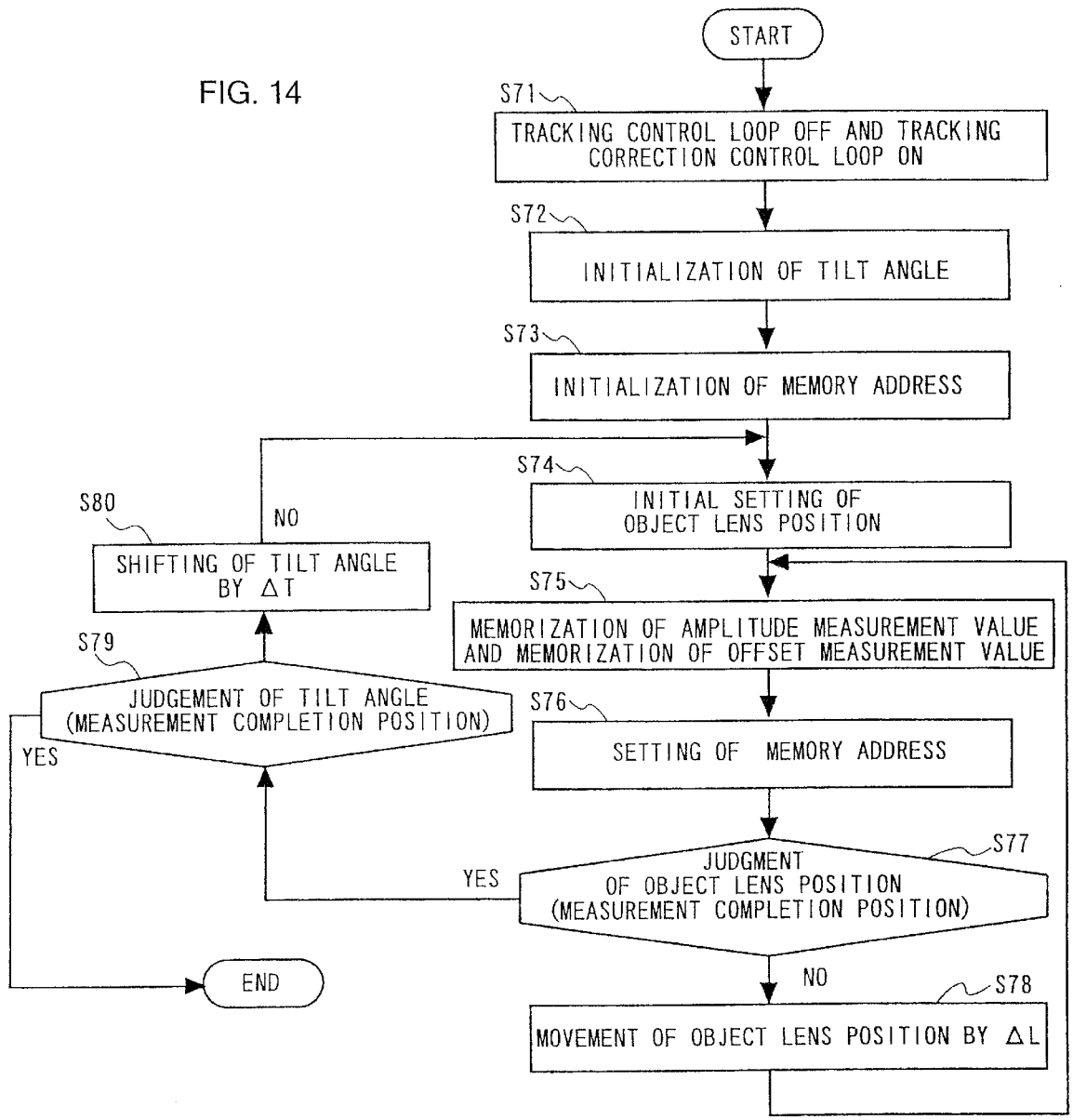
FIG. 14 is a flowchart showing the ordinary-mode operation of the optical information recording and reproducing apparatus kin accordance with the embodiment 3 of the present invention.

First, the correction mode will be described. FIG. 14 is a flowchart representing the operations of the respective circuits included in the system control block 41 in the correction mode of the present embodiment. Usually, the correction mode is carried out when the apparatus is started first and when the disk is replaced. When the mode is shifted to the correction mode, the tracking control loop 201 is turned OFF, and the tracking correction control loop 202 is turned ON (step S71). Then, the initial angle of the tilt angle 108 is set. This initial angle is set for example at one end of the movable range of the tilt actuator not shown. The tilt actuator is driven up to this angle, and the tilt of the optical pickup 4 or the disk 2 is controlled (step S72).

Next, the memory addresses of the fifth memory circuit 42 and the sixth memory circuit 43 are initialized. This initialization is carried out by setting the memory address at N (N is an integer not less than 0) for example (step S73). Next, the initial position of the object lens 8 is set. This initial position is set at one end of the movable range of the object lens 8 for example, and a tracking drive signal 103 is output to the tracking drive circuit 16 by the tracking control circuit 15 to carry out movement up to the position. As a result, the tracking actuator 10 is driven to move the object lens 8(step S74). At this time, the object lens displacement amount 105 estimated by the object lens displacement observer 19, the tilt angle 108 detected by the tilt sensor 44 and the offset amount of the tracking error detected by the offset detection circuit 17 are stored as a group in the fifth memory circuit 42. The object lens displacement amount 105 estimated by the object lens displacement observer 19, the tilt angle 108 detected by the tilt sensor 44 and the amplitude amount of the tracking error detected by the amplitude detection circuit 18 are stored as a group in the sixth memory circuit 43(step S75). To each of the memory addresses, +3 is added to set the memory addresses (step S76). Then, a judgment is made as to whether the displacement of the object lens 8 has extended from one end of the movable range of the object lens to the other end (step S77). If the object lens 8 has not extended from the one end to the other end, the position of the object lens 8 (sic 8) is moved by a minute distance ΔL (step S78 (sic S78)), the sequence returns to step S74, and the processes from step 75 to step 77 are repeated. If the object lens 8 has extended from the one end to the other end, a judgment is made as to whether the tilt angle has extended from one end of the movable range to the other end (step S79). If the tilt angle has not extended from the one end to the other end, the tilt angle is increased by a minute angle ΔT (step S80), the sequence returns to step S75, and the same processes are repeated. If the tilt angle has extended to the other end of the movable range, the correction mode ends. As shown in FIGS. 15(*a*) and (*b*) respectively, by carrying out the above-mentioned processes, the object lens displacement amount and the offset amount of the tracking error signal corresponding to the tilt angle can be recorded as one group in the fifth memory circuit 42. In addition, the object lens displacement amount and the amplitude value corresponding to the tilt angle can be recorded as one group in the sixth memory circuit 43.

Figure 16:
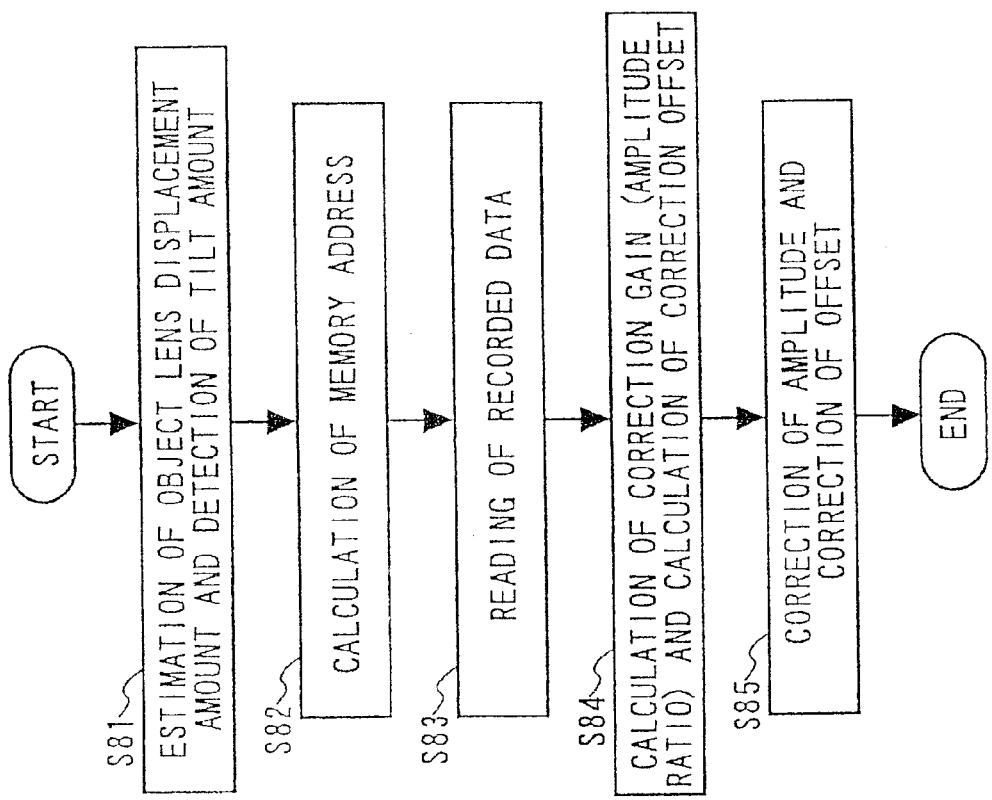
FIG. 16 is a flowchart showing the correction-mode operation of the optical information recording and reproducing apparatus in accordance with the embodiment 3 of the present invention.

Next, the ordinary mode will be described. FIG. 16 is a flowchart showing the operation in the ordinary mode in the present embodiment. The ordinary mode is carried out after the tracking control loop 201 is turned ON. In the ordinary mode, the object lens displacement observer 19 first estimates the object lens displacement amount 105, and the tilt sensor 44 detects the tilt angle (step S81). Then, the memory addresses of the fifth memory circuit 42 and the sixth memory circuit 43 in which the estimated object lens displacement amount and the offset amount and the amplitude value at the tilt angle are stored are specified (step S82), and the offset amount and the amplitude amount are read from the memory circuits 42 and 43 respectively (step S83). Then, an offset addition amount and an amplitude gain are calculated by the system controller 24 so that the value of the correction tracking error signal 102 is equal to the value of the tracking error signal 101 obtained in the case when the displacement amount of the object lens is zero and the tilt angle is zero (step S84).

The offset addition amount obtained in this way is added by the offset correction circuit 22, and the amplitude gain is multiplied by the amplitude correction circuit 23 to correct the tracking error signal (step S85). A drive command is output from the tracking control circuit 15 to the tracking drive circuit 16 so that the correction tracking error signal 102 becomes zero. By the drive command, a current is flown to the coil 11 thereby to generate an electromagnetic force and to move the object lens 8. As described above, the tracking error signal is corrected on the basis of the object lens displacement amount and the tilt angle. As a result, even if an object lens displacement and a tilt occur, it is possible to obtain tracking control performance similar to that in the case when the object lens displacement and the tilt are zero.

By adding the initial mode described in the embodiment 1 to the embodiment 3, it is possible to improve the stability at the time when the tracking control loop is shifted from OFF to ON. In addition, by learning the characteristic of the equivalent filter described in the embodiment 2 and by carrying out correction based on temperature, it is also possible to improve the stability with respect to the temperature. Furthermore, if a minute distance ΔL and a minute angle ΔT, that is, intervals between data samples in the correction mode, are reduced, correction accuracy can be raised; however, the amount of memory for storing the data samples increases, and this becomes disadvantageous in cost. Hence, by reducing the number of samples, for example by obtaining a weighted mean between the data samples, and by obtaining the amplitude amount and offset amount to be corrected, it is also possible to attain stable tracking control performance similar to that of the present embodiment.

Embodiment 4

Figure 18:
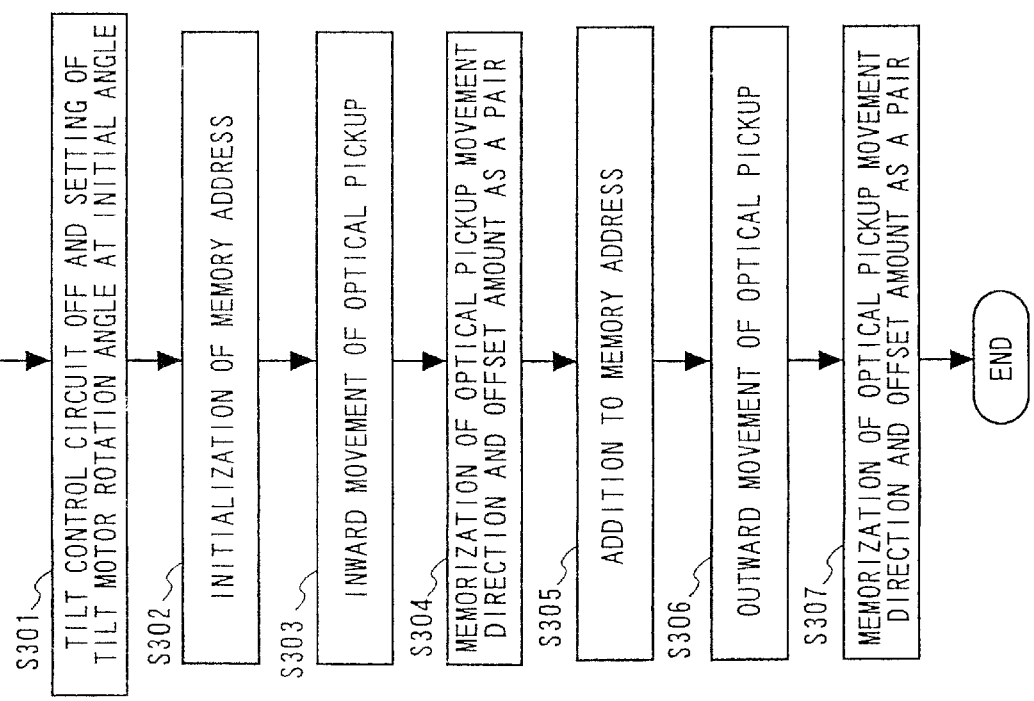
FIG. 18(a) is a flowchart showing the correction-mode operation of the optical information recording and reproducing apparatus in accordance with the embodiment 4 of the present invention, and (b) is a table showing the stored contents of the memory circuit of the optical information recording and reproducing apparatus in accordance with the embodiment 4 of the present invention.
Figure 19:
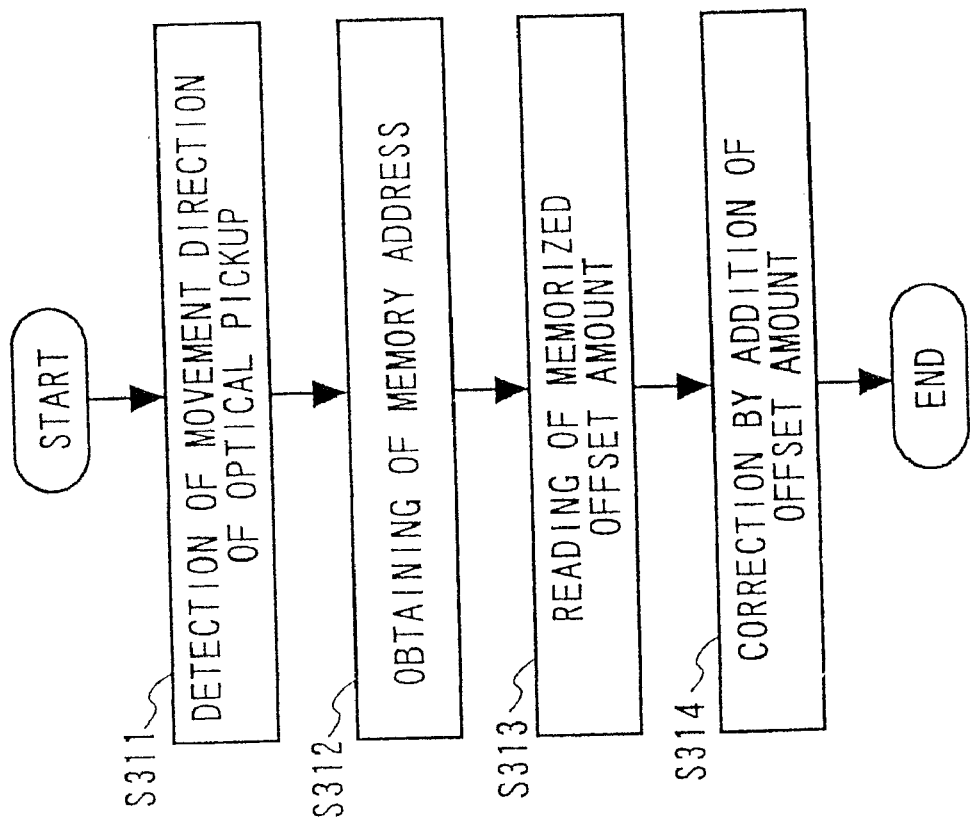
FIG. 19 is a flowchart showing the ordinary-mode operation of the optical information recording and reproducing apparatus in accordance with the embodiment 4 of the present invention.

An embodiment 4 in accordance with the present invention will be described referring to FIGS. 17 to 19.

Figure 17:
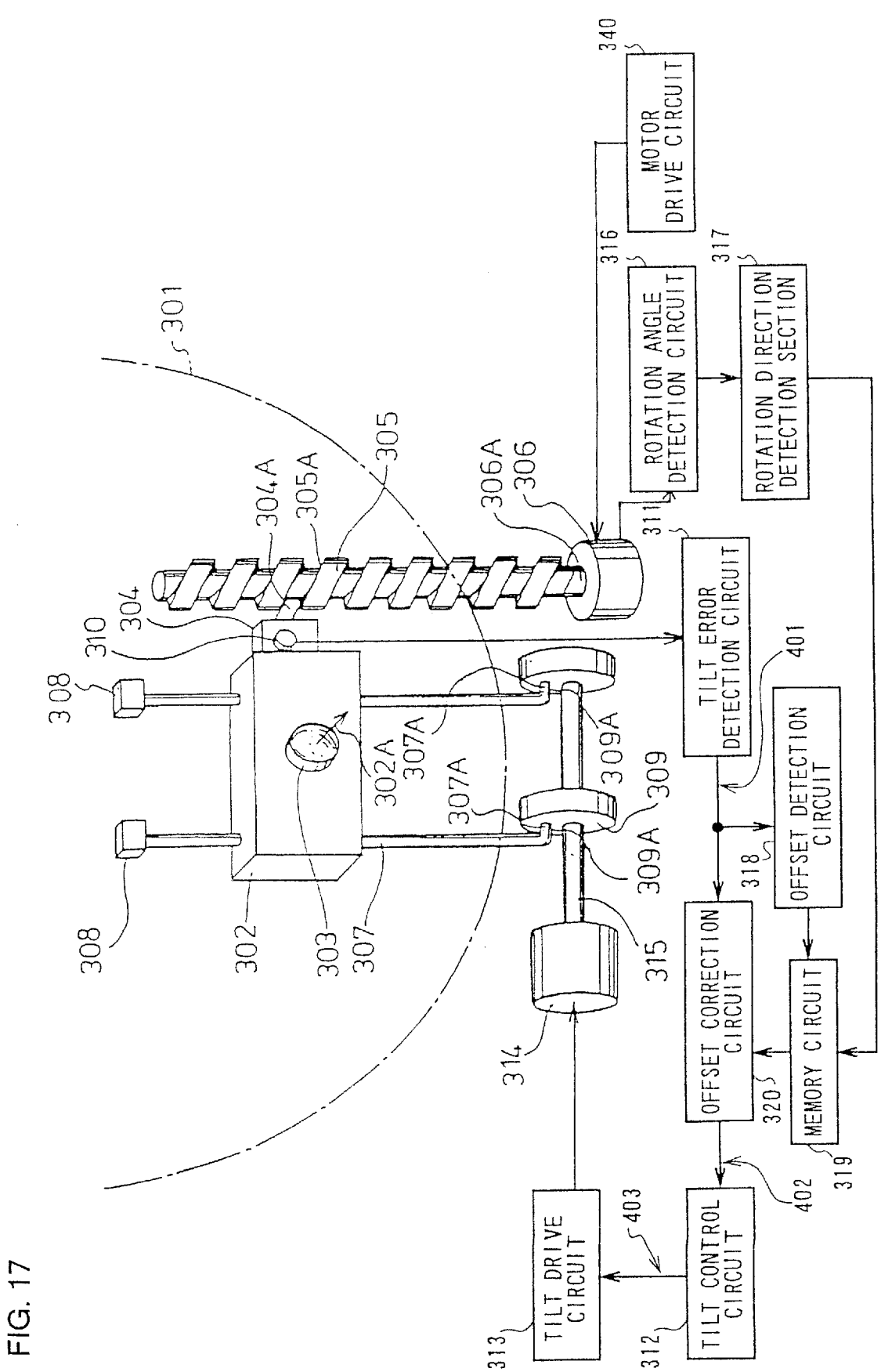
FIG. 17 is a block diagram showing the configuration of an optical information recording and reproducing apparatus in accordance with embodiment 4 of the present invention.

FIG. 17 is a block diagram showing the configuration of an optical information recording and reproducing apparatus (hereafter simply referred to as an "apparatus") in accordance with the embodiment 4. In FIG. 17, a disk 301 is disposed above (upward from the paper face) a mechanism section including an optical pickup 302 and a lead screw 305; for ease in understanding, the above-mentioned mechanism section is indicated in solid lines, and the disk 301 is indicated in a one-dot chain line. Two lead shafts 307 for movably supporting the optical pickup 302 is disposed in the radial direction of the disk 301. With this configuration, the optical pickup 302 can be tilted in a direction perpendicular to the information tracks of the disk 301. One end of each of the two lead shafts 307 is supported by a lead shaft holder 308 corresponding thereto. At the other end of each of the lead shafts 307, an insertion part 307A formed in the shape of L is provided. The insertion part 307A is inserted into the hole 309A of a tilt cam 309. The tilt cam 309 is an eccentric cam and installed on a tilt shaft 315 eccentrically. In the vicinity of the lead shaft 307, a lead screw 305 is provided. The projection 304A of the lead rack 304 installed on the side face of the optical pickup 302 is inserted in the groove 305A of the lead screw 305. The pickup movement motor 306 driven by a motor drive circuit 340 is installed at one end of the lead screw 305. The lead screw 305 is rotated by the rotation of the pickup movement motor 306, whereby the optical pickup 302 moves along the lead shafts 307.

Figure 46:
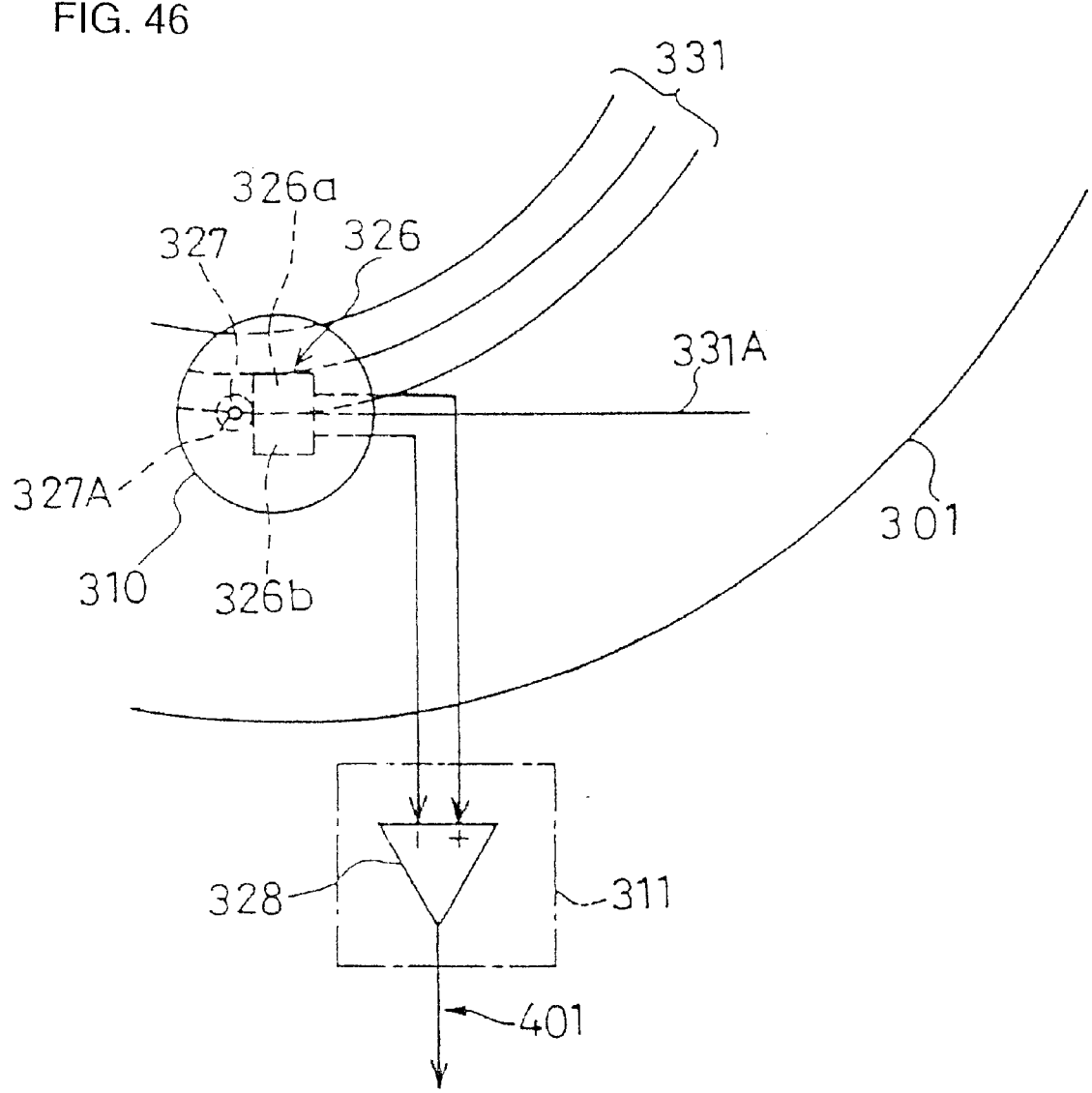
FIG. 46 is a block diagram showing the configurations of the tilt sensor and the tilt error detection circuit of the conventional optical information recording and reproducing apparatus.

The tilt shaft 315 is rotated by a tilt motor 314 installed at one end thereof. By the rotation of the tilt shaft 315, the lead shafts 307 rotate around the lead shaft holders 308, whereby the angle between the face of the disk 301 and the lead shafts 307 changes. A rotation angle detection circuit 316 detects the rotation angle of the pickup movement motor 306, and a rotation direction detection section 317 also detects the rotation direction thereof thereby to detect the moving direction of the optical pickup 302. The detection of the rotation angle and the detection of the rotation direction can be carried out for example by using a known rotation detector wherein a magnetized plate on which permanent magnets are disposed at equal pitches is installed on the rotation shaft of the pickup movement motor 306, and magnetic detectors, such as Hall devices, are provided in the vicinity of the magnetized plate at half intervals of the above-mentioned pitches. A tilt sensor 310 is provided on the lead rack 304 to detect the tilt of the optical pickup 302 with respect to the face of the disk 301. Since the tilt sensor 310 is for example the same as the known sensor shown in FIG. 46 and described in detail in the prior art, its overlapping explanation is omitted. The output of the tilt sensor 310 is input to a tilt error detection circuit 311, and a tilt error signal 401 is output. The tilt error signal 401 is input to an offset detection circuit 318 and an offset correction circuit 320. The offset detection circuit 318 detects the center value of the tilt error signal 401 as an offset amount. The output of the offset detection circuit 318 is input to a memory circuit 319.

In a correction mode detailed later, the memory circuit 319 stores the movement direction of the optical pickup 302 detected by the rotation direction detection section 317 and the offset amount of the tilt error signal 401 detected by the offset detection circuit 318 as a pair. The memory circuit 319 has a DRAM memory and the like used as a digital circuit; at the time of storing, analog amounts are converted into digital values by an A/D converter inside the memory circuit 319. The output of the memory circuit 319 is input to the offset correction circuit 320.

In an ordinary mode detailed later, the offset correction circuit 320 reads a previously stored offset amount from the memory circuit 319, and the amount is added to or subtracted from the level of the tilt error signal 401 thereby to correct the offset. A tilt error signal having the corrected offset is output as a corrected tilt error signal 402. A tilt control circuit 312 receives the corrected tilt error signal 402 and outputs a tilt drive command signal 403 to a tilt drive circuit 313. The tilt drive circuit 313 drives the tilt motor 314 corresponding to the tilt drive command signal 403.

Hereafter, description is made as to the operations in the correction mode and the ordinary mode of the operations of the optical information recording and reproducing apparatus in accordance with the embodiment 4 in detail.

The correction mode is an operation wherein an offset correction amount is obtained beforehand to correct the offset caused by errors during the production of the mechanism section including the optical pickup 302 and the lead screw 305, and the operation is carried out when this apparatus is produced. The ordinary mode is an operation wherein the tilt error signal 401 is corrected on the basis of the result obtained in the correction mode, and the operation is carried out when this apparatus is in an ordinary operation state.

First, the correction mode will be described referring to FIGS. 17 and 18. FIG. 18(a) is a flowchart showing the operation in the correction mode in the present embodiment. Usually, the operation in the correction mode is carried out when the apparatus is assembled and adjusted. In the correction mode, the operation of the tilt control circuit 312 is stopped (hereafter referred to as OFF), and the rotation angle of the tilt cam 309 is set at an initial angle. The initial angle is the rotation angle of the tilt cam 309 at which the light of the optical pickup 302 perpendicularly enters the disk 301 when the disk 301 is not tilted (step S301). Next, the memory address of the memory circuit 319 is initialized. This initialization is carried out by setting the memory address at N (N is an integer not less than 0) for example (step S302). By rotating the pickup movement motor 306, the optical pickup 302 is moved in the inner circumferential direction of the disk 301 and stopped at a predetermined position (step S303). As shown in FIG. 18(b), the "movement direction (0)" indicating the movement of the optical pickup 302 in the inner circumferential direction detected by the rotation direction detection section 317 and the "offset amount (1)" detected by the offset detection circuit 318 are stored as a pair at the memory addresses N and N+1 of the memory circuit 319 (step S304). To the memory address, +2 is added (step S305). By rotating the pickup movement motor 306, the optical pickup 302 is moved in the outer circumferential direction of the disk 301 and stopped at a predetermined position (step S306). At this time, the "movement direction (1)" indicating the movement of the optical. pickup 302 in the outer circumferential direction detected by the rotation direction detection section 317 and the "offset amount (1)" detected by the offset detection circuit 318 are stored as a pair at the memory addresses N+2 and N+3 of the memory circuit 319 (step S307), and the operation in the correction mode ends. By carrying out the processes of the above-mentioned correction mode, the offset amounts of the tilt error signal 401 corresponding to the two movement directions (0) and (1) of the optical pickup 302 respectively are stored in the memory circuit 319 as shown in FIG. 18(b).

Next, the ordinary mode will be described referring to FIGS. 17 and 19. FIG. 19 is a flowchart showing the operation in the ordinary mode in the present embodiment. The operation in the ordinary mode is an operation performed in an ordinary operation state while the electric power source of the optical information recording and reproducing apparatus is turned on and then off, during which the tilt control circuit 312 is set in its operation state, and tilt control is carried out as necessary.

In the ordinary mode, the rotation direction detection section 317 first detects the movement direction of the optical pickup 302 (step S31). The memory address of the memory circuit 319, in which the same movement direction as the movement direction of the optical pickup 302 detected at step S311 is stored, is obtained (step S312). The stored offset amount is read from the obtained memory address (step S313). At the offset correction circuit 320, the read offset amount is added to the tilt error signal 401 detected by the tilt error detection circuit 311 to correct the tilt error signal (step S314). The tilt control circuit 312 outputs a drive command to the tilt drive circuit 313 so that the level of this corrected tilt error signal 402 becomes zero, whereby the tilt motor 314 is rotated to rotate the tilt cams 309 installed on the tilt shaft 315. By the rotation of the tilt cams 309, the lead shafts 307 are rotated with the lead shaft holders 308 used as fulcrums to tilt the optical pickup 302, and control is carried out so that the light beam 302A emitted from the optical pickup 302 is applied perpendicularly to the face of the disk 301 at all times.

In the embodiment 4, the offset amount of the tilt error signal 401 depending on the movement direction of the optical pickup 302 is examined and stored beforehand in the correction mode; and in the ordinary mode, the tilt error signal 401 is corrected on the basis of the above-mentioned stored offset amount depending on the movement direction of the optical pickup 302 detected by the rotation direction detection section 317. As a result, a tilt control error depending on the movement direction of the optical pickup 302 is corrected; even if the disk 301 is tilted, the tilt of the optical pickup 302 can be controlled so that the light beam output from the optical pickup 302 is applied perpendicularly to the disc 301 at all times. The known rotation detector formed of a Hall device 322 is used for the rotation angle detection circuit 316 and the rotation direction detection section 317 in the present embodiment; however, by using a stepping motor for the pickup movement motor 306, a signal indicating the number of the rotation steps and the rotation direction of the motor may be supplied as a drive command. In this case, the rotation direction can be detected from the drive command signal.

Embodiment 5

Figure 20:
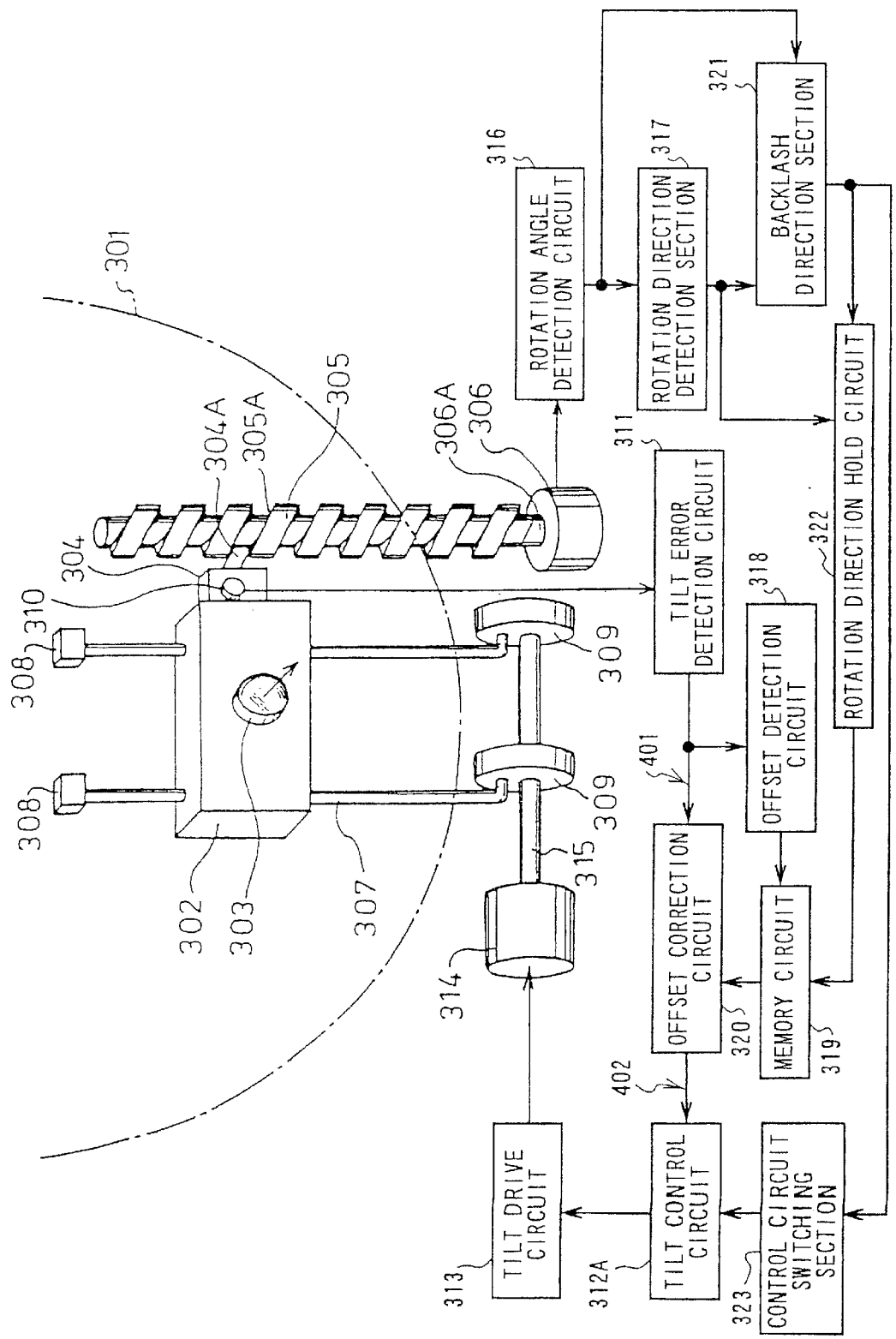
FIG. 20 is a block diagram showing the configuration of an optical information recording and reproducing apparatus in accordance with embodiment 5 of the present invention.

An embodiment 5 in accordance with the present invention will be described referring to FIGS. 20 to 23. In FIG. 20, there is a gap, that is, a backlash, between the groove section 305A of the lead screw 305 and the projection 304A of the lead rack 304 in general. If the backlash is eliminated, the friction between the projection 304A and the groove section 305A increases, thereby causing problems of making the movement of an optical pickup 302 difficult and requiring a large torque during the movement. When the rotation direction of the pickup movement motor 306 is reversed, the movement direction of the optical pickup 302 is not reversed immediately due to this backlash. Therefore, if the change in the movement direction of the optical pickup 302 is determined depending on the change in the rotation direction of the pickup movement motor 306 just as in the case of the embodiment 4, a time difference occurs between the change of the rotation direction of the pickup movement motor 306 and the change of the movement direction of the optical pickup 302, thereby making proper tilt amount correction impossible. Therefore, the control in the ordinary mode by the tilt control circuit 312 may become unstable.

The embodiment 5 of the present invention is an optical information recording and reproducing apparatus in which this problem has been solved. In the embodiment 5, the presence or absence of a backlash is determined by the detection result of the rotation angle detection circuit 316 and the rotation direction detection section 317. If a backlash is present, the detection result indicating the reversion of the pickup movement direction is not output until the effect of the backlash disappear; the detection result is output when the effect of the backlash has disappeared. If the effect of the backlash is present, the gain of the tilt control circuit 312 is switched to a predetermined value; when the effect of the backlash has disappeared, the gain of the tilt control circuit 312 is returned to its initial setting value.

The embodiment 5 of the present invention will be described below in detail referring to FIGS. 20 and 23.

FIG. 20 is a block diagram showing the configuration of an optical information recording and reproducing apparatus in accordance with the embodiment 5. The same components as those of the embodiment 4 are designated by the same numerals and their overlapping explanations are omitted. In FIG. 20, signals indicating the rotation angle of the pickup movement motor 306 detected by the rotation angle detection circuit 316 and indicating the rotation direction of the pickup movement motor 306 detected by the rotation direction detection section 317 respectively are input to a backlash detection section 321, and these signals are used to detect the presence or absence of a backlash between the lead screw 305 and the lead rack 304. In other words, if the rotation angle does not change when the rotation direction changes, it is found that a backlash is present. The output of the rotation direction detection section 317 is also input to a rotation direction hold circuit 322. The output of the backlash detection section 321 is input to the rotation direction hold circuit 322 and a control circuit switching section 323. Depending on the presence or absence of the backlash detected by the backlash detection section 321, the rotation direction hold circuit 322 holds the signal indicating the detection direction detected by the rotation detection section 317 (the previous detection signal is held and used as the output) or performs a through process (the signal detected this time is used as the output), and inputs the signal to the memory circuit 319. The output of the memory circuit 319 is input to the offset correction circuit 320. The control circuit switching section 323 switches the inner gain of the tilt control circuit 312A depending on the presence or absence of the backlash detected by the backlash detection section 321. The other configurations are the same as those of the embodiment 4.

Figure 21:
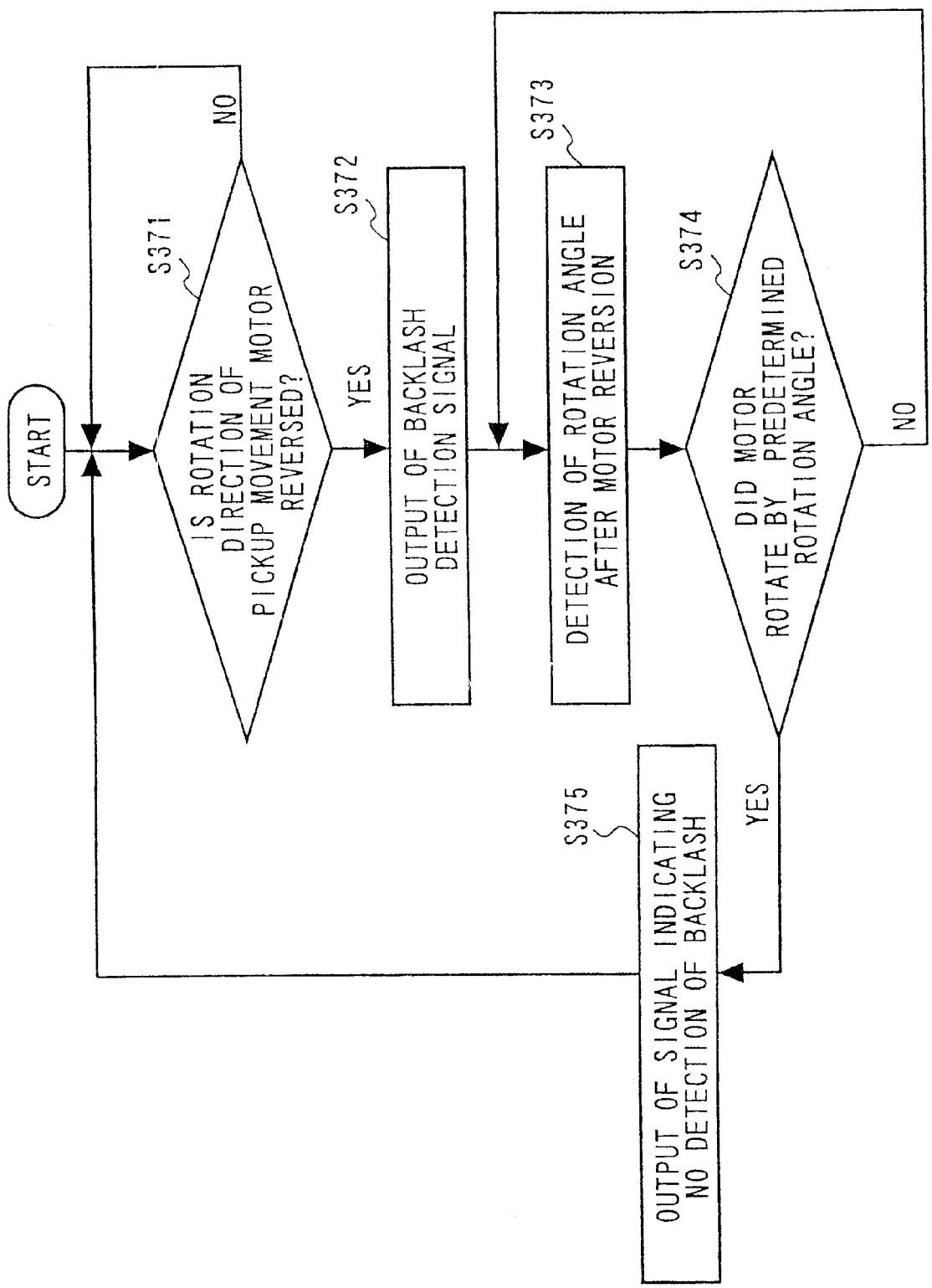
FIG. 21 is a flowchart showing the operation of a backlash detection section in accordance with the embodiment 5 of the present invention.

Next, the detailed operation of the backlash detection section 321 will be described. FIG. 21 is a flowchart showing the operation of the backlash detection section 321 in accordance with the present embodiment. The backlash detection section 321 receives the signal indicating the rotation direction detected by the rotation direction detection section 317 and determines whether the rotation direction of the pickup movement motor 306 has reversed or not (step S371). If not reversed, the sequence returns to step S371. If reversed, a signal for backlash detection is output to the rotation direction hold circuit 322 and the control circuit switching section 323(step S372). The backlash detection section 321 receives the rotation angle signal detected by the rotation angle detection circuit 316, detects the rotation angle after the reversion (step S373) and determines whether the rotation angle of the pickup movement motor 306 after the reversion has reached a predetermined rotation angle (a rotation angle corresponding to the backlash between the lead screw 305 and the lead rack 304 having been measured beforehand for example) (step S374). If the rotation angle of the pickup movement motor 306 after the reversion has reached the predetermined rotation angle, the backlash detection section 321 outputs a signal indicating that there is no backlash to the direction hold circuit 322 and the control circuit switching section 323(step S375), and the processing sequence returns to step S371. If the rotation angle has not reached the predetermined rotation angle, the sequence returns to step S373 (sic 373), and the backlash detection section 321 keeps outputting the signal indicating that there is a backlash.

Figure 22:
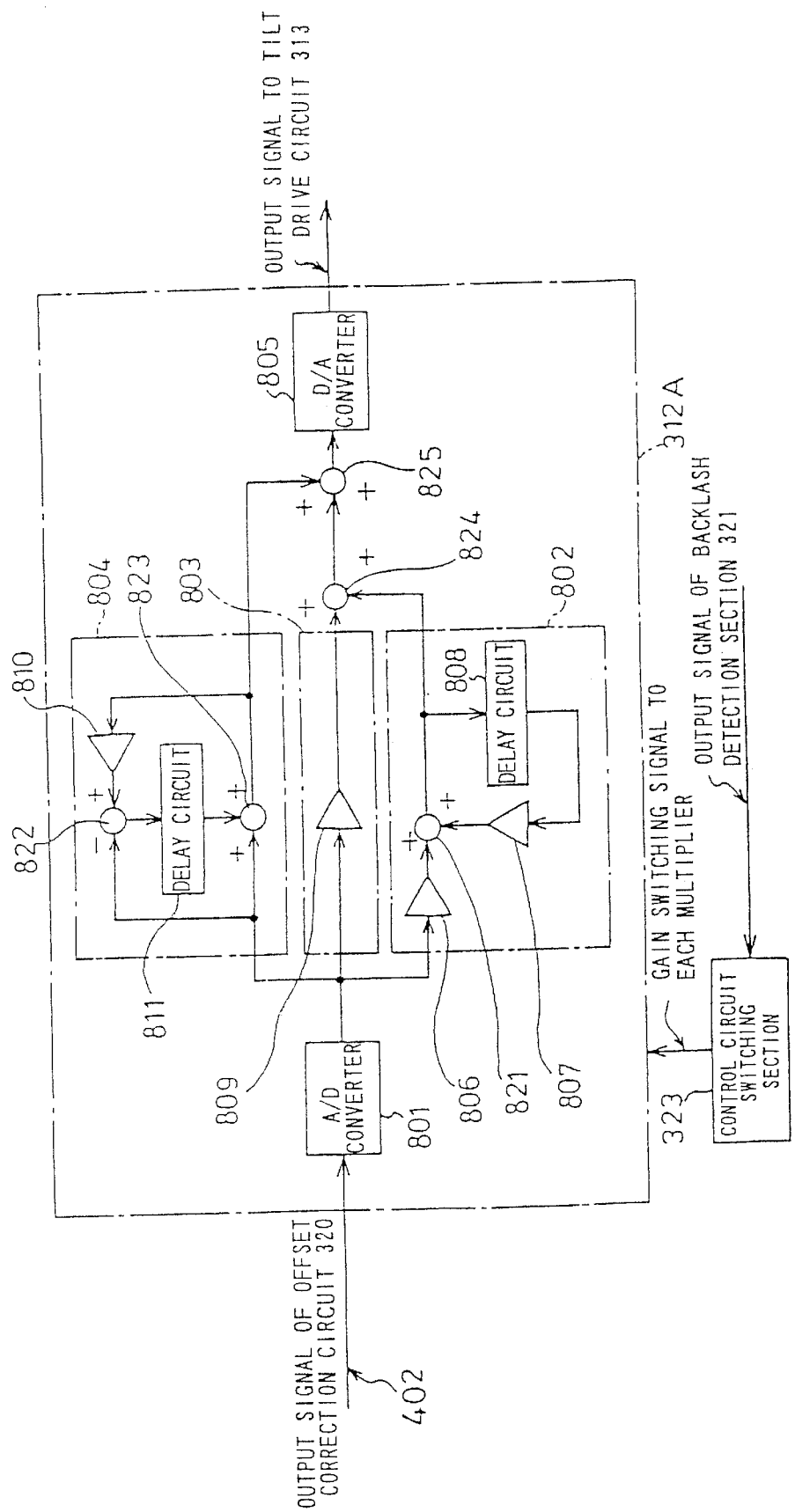
FIG. 22 is a block diagram showing the concrete configuration of a tilt control circuit in accordance with the embodiment 5 of the present invention.

Next, the detailed configuration of the tilt control circuit 312A will be described. FIG. 22 is a block diagram showing a concrete configuration of the tilt control circuit 312A in accordance with the present embodiment. In FIG. 22, the tilt control circuit 312A comprises an A/D converter 801, an integration calculation circuit 802, a proportional calculation circuit 803, a differentiation calculation circuit 804 and a D/A converter 805. The integration calculation circuit 802 has a multiplier 806 of gain GA, a multiplier 807 of gain GB, an adder 821 and a delay circuit 808. The proportional calculation circuit 803 has a multiplier 809 of gain GC. The differentiation calculation circuit 804 has a multiplier 810 of gain GD, adders 822 and 823 and a delay circuit 811. The gains of the multipliers 806, 807, 809 and 810 can be set as desired.

The operations of the tilt control circuit 312A and the control circuit switching section 323 will be described by using FIG. 22. If a backlash is present on the basis of the determination as to the presence or absence of the backlash by the backlash detection section 321, the control circuit switching section 323 sets the gains of the multipliers 806, 807, 809 and 810 of the tilt control circuit 312A at a predetermined value. This predetermined value is zero for example. By setting the gains at zero, the output of the tilt control circuit 312A can be made equivalent to that in the operation stop state, whereby it is prevented that the control becomes unstable because of the improper correction of the offset due to the backlash. If there is no backlash, the gains of the multipliers 806, 807, 809 and 810 built in the tilt control circuit 312A are returned to an initial value other than zero. Then, a corrected tilt error signal 402 corrected by the office correction circuit 320 is input to the A/D converter 801, an analog signal is converted into a digital signal and input to the integration calculation circuit 802, the proportional calculation circuit 803 and the differentiation calculation circuit 804.

The values of the respective gains GA, GB, GC and GD of the multipliers 806, 807, 809 and 810 are set by the control circuit switching section 323. The multiplication by the multipliers 806, 807, 809 and 810 and the additions and subtractions by the adders 821, 822, 823, 824 and 825 are carried out at a predetermined sampling period T. The delay circuits 808 and 811 delay their input digital signals by the sampling period T and then output them. By setting the respective gains GA, GB, GC and GD of the multipliers 806, 807, 809 and 810 at the predetermined initial value and by adding the outputs of the integration calculation circuit 802, the proportional calculation circuit 803 and the differentiation calculation circuit 804 by using the adders 824 and 825, it is possible to attain the function of a compensation filter for obtaining the low-frequency gain and phase allowance of the control system. The frequency transfer characteristic of the compensation filter is shown in FIG. 23. FIG. 23(a) shows the gain characteristic of the phase compensation filter, and (b) shows the phase characteristic thereof. The abscissas of the FIGS. 23(a) and (b) represent frequency in logarithm. It is characterized that the gain intersection of the tilt control system is generally at about 1 Hz, and the phase advances most at about 1 Hz. The output of this compensation filter is input to the D/A converter 805, converted into an analog signal, and applied to the tilt drive circuit 313.

As described above, depending on the detection results of the rotation angle detection circuit 316 and the rotation direction detection section 317, the presence or absence of the backlash is judged, the gain of the tilt control circuit 312A is switched, and the movement direction of the optical pickup 302 is determined. As a result, it is prevented that an error occurs in the offset correction amount of the tilt error signal 401 owing to a backlash and the tilt control becomes unstable. If the disk 301 is tilted, the tilt of the optical pickup 302 is controlled by the tilt control circuit 312A (sic 312A) so that the light beam from the optical pickup 302 is perpendicularly applied to the disk 301 at all times.

Embodiment 6

An embodiment 6 in accordance with the present invention will be described below referring to FIGS. 24 to 27. The same components as those of the embodiment 4 are designated by the same numerals and their explanations are omitted.

Figure 24:
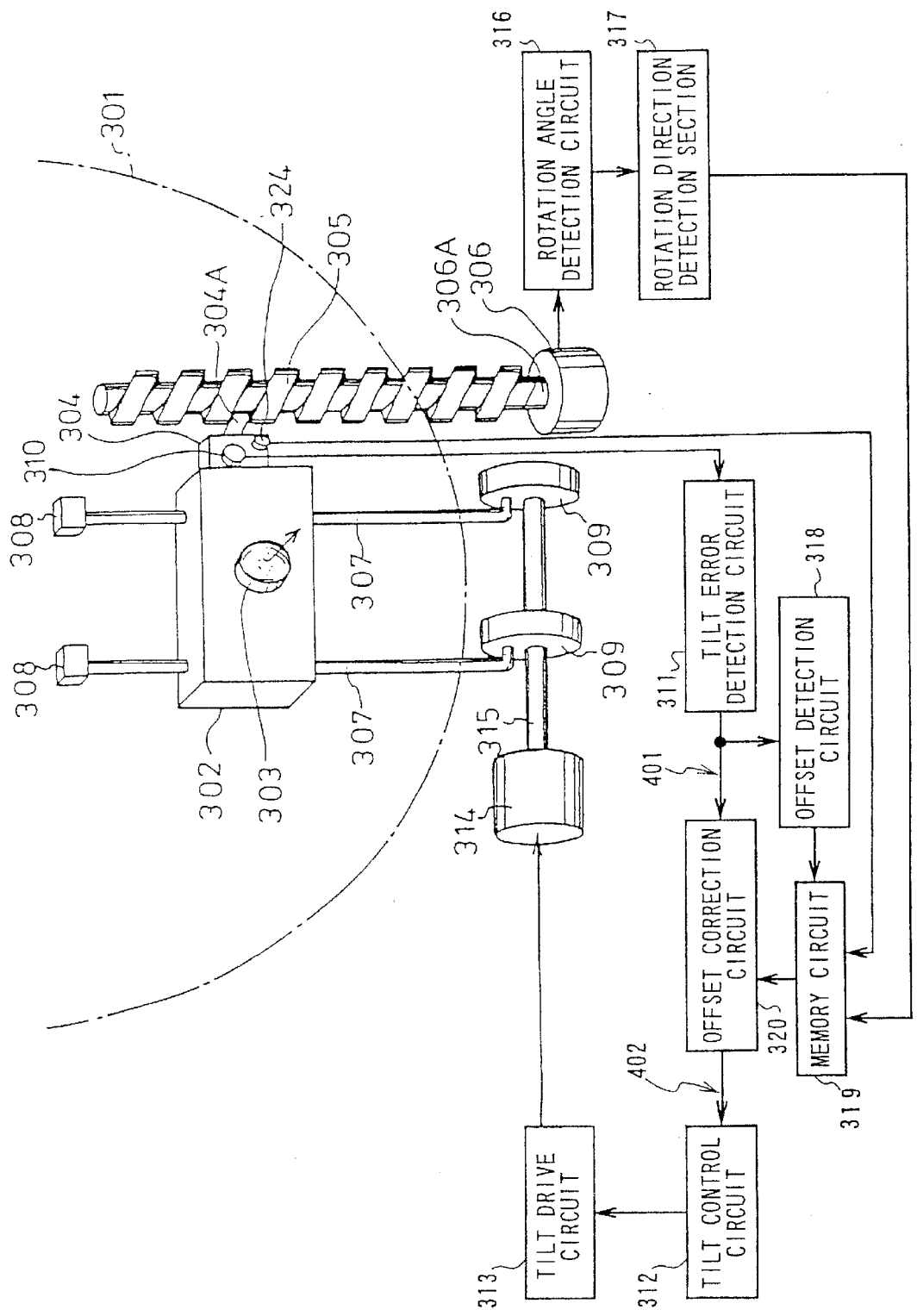
FIG. 24 is a block diagram showing the configuration of an optical information recording and reproducing apparatus in accordance with embodiment 6 of the present invention.

FIG. 24 is a block diagram showing the configuration of an optical information recording and reproducing apparatus in accordance with the present embodiment. In FIG. 24, a temperature sensor 324 used as a temperature detection section is provided in the vicinity of a tilt sensor 310 to detect the ambient temperature of the tilt sensor 310. The detection output of the temperature sensor 324 is input to the memory circuit 319. As shown in FIG. 26, the memory circuit 319 stores the movement direction of the optical pickup 302 detected by the rotation direction detection section 317, the offset amount of the tilt error signal. 401 detected by the offset detection circuit 318 and the temperature detected by the temperature sensor as a group. The memory circuit 319 comprises a digital circuit, a DRAM and the like; in storing, analog amounts are converted into digital values by an A/D converter provided inside the memory circuit 319 and then stored. The other configurations are the same as those of the embodiment 4.

The operations of the optical information recording and reproducing apparatus in accordance with the embodiment 6 will be described in the correction mode and the ordinary mode for tilt error signal correction.

The meanings of the correction mode and the ordinary mode are the same as those described in the embodiment 4.

Figure 25:
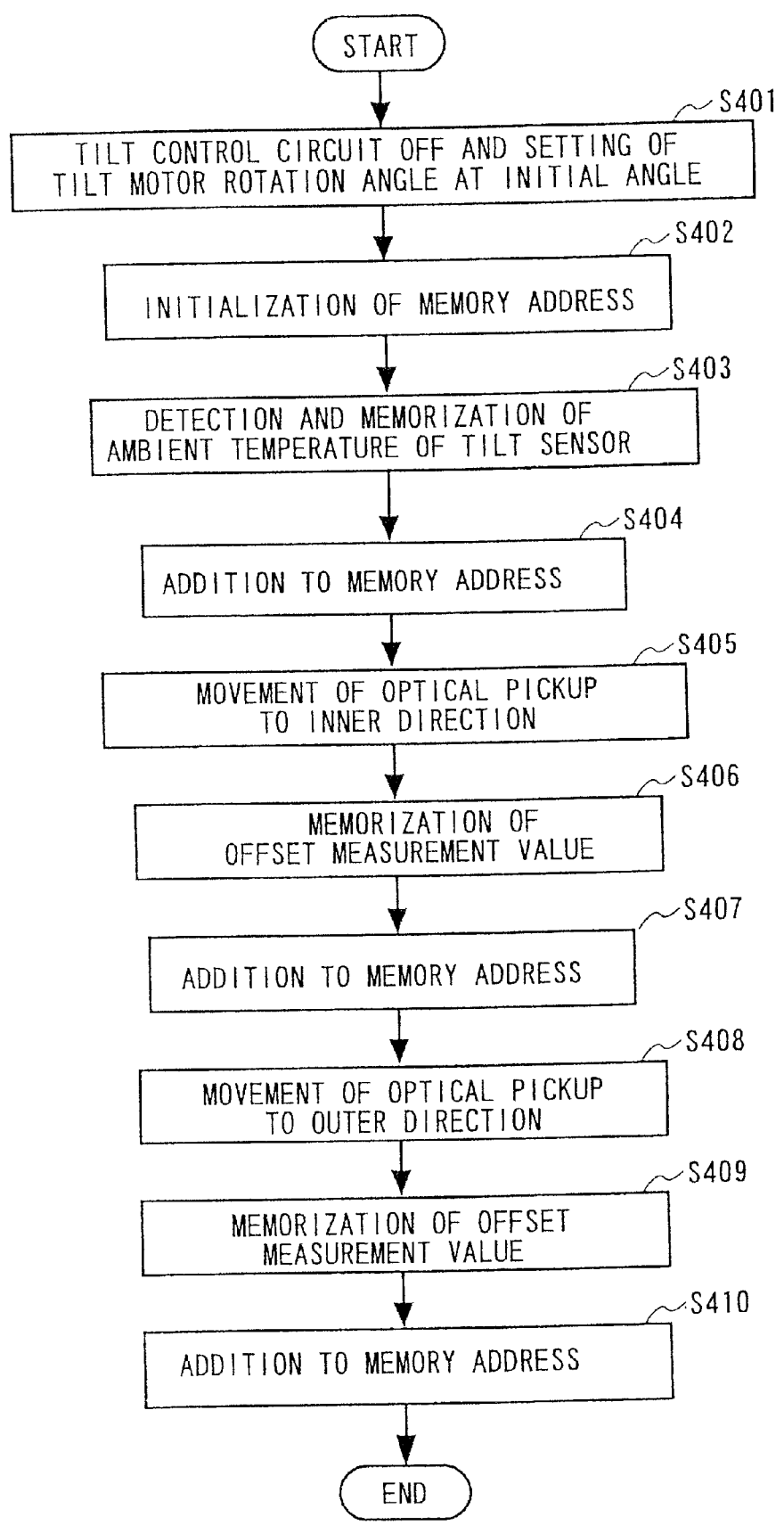
FIG. 25 is a flowchart showing the correction-mode operation of the optical information recording and reproducing apparatus in accordance with the embodiment 6 of the present invention.

First, the operation in the correction mode will be described referring to FIGS. 24, 25 and 26. FIG. 25 is a flowchart showing the operation in the correction mode in the present embodiment. FIG. 26 is a table showing the memory contents of the memory circuit 319. The operation in the correction mode is carried out when the optical information recording and reproducing apparatus is adjusted while the entire apparatus is put in a constant temperature bath. In the correction mode, a tilt control circuit 312 is turned OFF, and the rotation angle of a tilt cam 309 is set at an initial angle. This initial angle is the rotation angle of the tilt cam 309 at which the light of the optical pickup 302 perpendicularly irradiates the disk 301 (step S401). Next, the memory address of the memory circuit 319 is initialized. This initialization is carried out by setting the memory address at N (N is an integer not less than 0) for example (step S402). The ambient temperature of the tilt sensor 310 is detected by the temperature sensor 324 and stored in the memory circuit 319 (step S403), and +1 is added to the memory address (step S404). By rotating the pickup movement motor 306, the optical pickup 302 is moved in the inner direction of the disk 301 (step S405). At this time, the offset amount detected by the offset detection circuit 318 is stored as an inner circumferential direction offset in the memory circuit 319 (step S406), and +1 is added to the memory address (step S407). By rotating the pickup movement motor 306, the optical pickup 302 is moved in the outer circumferential direction of the disk 301 (step S408). At this time, the offset amount detected by the offset detection circuit 318 is stored as an outer circumferential direction offset in the memory circuit 319 (step S409), and +1 is added to the memory address (step S410). The sequential processes from step S403 to step S410 are repeated while the ambient temperature of the tilt sensor 310 is changed from 20° C. to 60° C. in 1° C. increments, and the temperature, the inner circumferential direction offset amount and the outer circumferential direction offset amount are stored as a group in the memory circuit 319.

Figure 27:
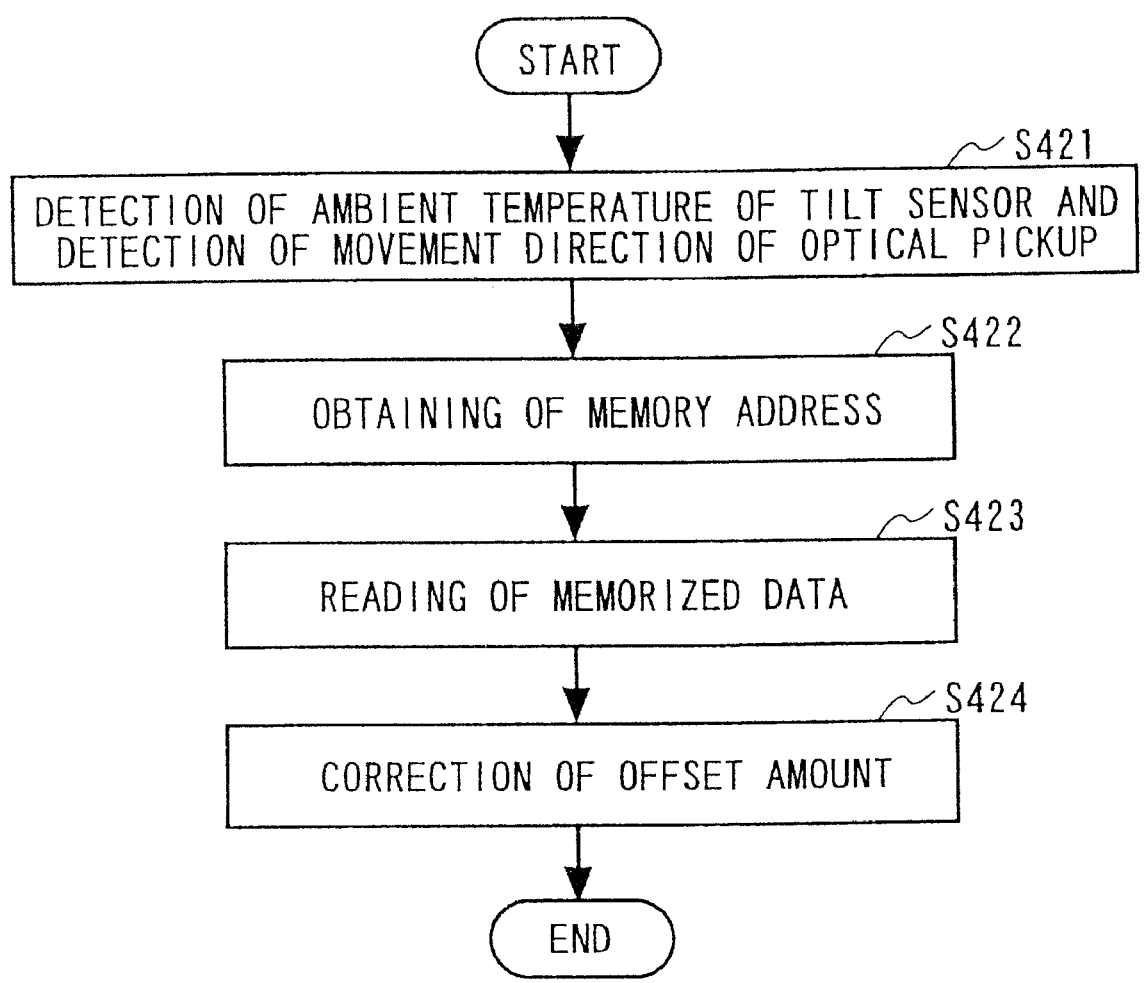
FIG. 27 is a flowchart showing the ordinary-mode operation of the optical information recording and reproducing apparatus in accordance with the embodiment 6 of the present invention.

Next, the operation in the ordinary mode will be described referring to FIGS. 24 and 27. FIG. 27 is a flowchart showing the operation in the ordinary mode in the present invention. In the ordinary mode, the tilt control circuit 312 is made ON.

The temperature sensor 324 detects the ambient temperature of the tilt sensor 310, and the detection data is input to the memory circuit 319. The rotation direction detection section 317 detects the movement direction of the optical pickup 302, and the detection data is input to the memory circuit 319 (step S421). From the plural groups of data of the ambient temperature of the tilt sensor 310, the inner direction offset and the outer circumferential direction offset depending on the movement direction of the optical pickup 302 stored in the correction mode, the memory addresses of the memory circuit 319 are searched, in which the group of data coincident with the above-mentioned temperature detection data and the movement direction datais stored (step S422). The inner direction offset amount or the outer circumferential direction offset amount is read from the obtained memory addresses in the memory circuit 319 depending on the movement direction (step S423). The inner direction offset amount or the outer circumferential direction offset amount having been read is added to the tilt error signal 401 by the offset correction circuit 320, and the tilt error signal 401 is corrected; the corrected tilt error signal 401 is applied to the tilt control circuit 312 (step S424). The tilt control circuit 312 outputs a drive command to the tilt drive circuit 313 so that the level of the corrected tilt error signal 402 becomes zero. The tilt drive circuit 313 drives the tilt motor 314 depending on the drive command and rotates the tilt cams 309 via the tilt shaft 315. The lead shafts 307 rotate with the lead shafts holders 308 used as fulcrums and tilt the optical pickup 302 having the lead rack 304 and the tilt sensor 310. As a result, the offset of the tilt sensor 310 owing to the change in the ambient temperature of the apparatus is compensated. As the result of the compensation of the offset, when the disk 301 is tilted, the tilt of the optical pickup 302 can be controlled so that the light beam from the optical pickup 302 is applied perpendicularly to the disk 301 at all times.

Embodiment 7

Figure 29:
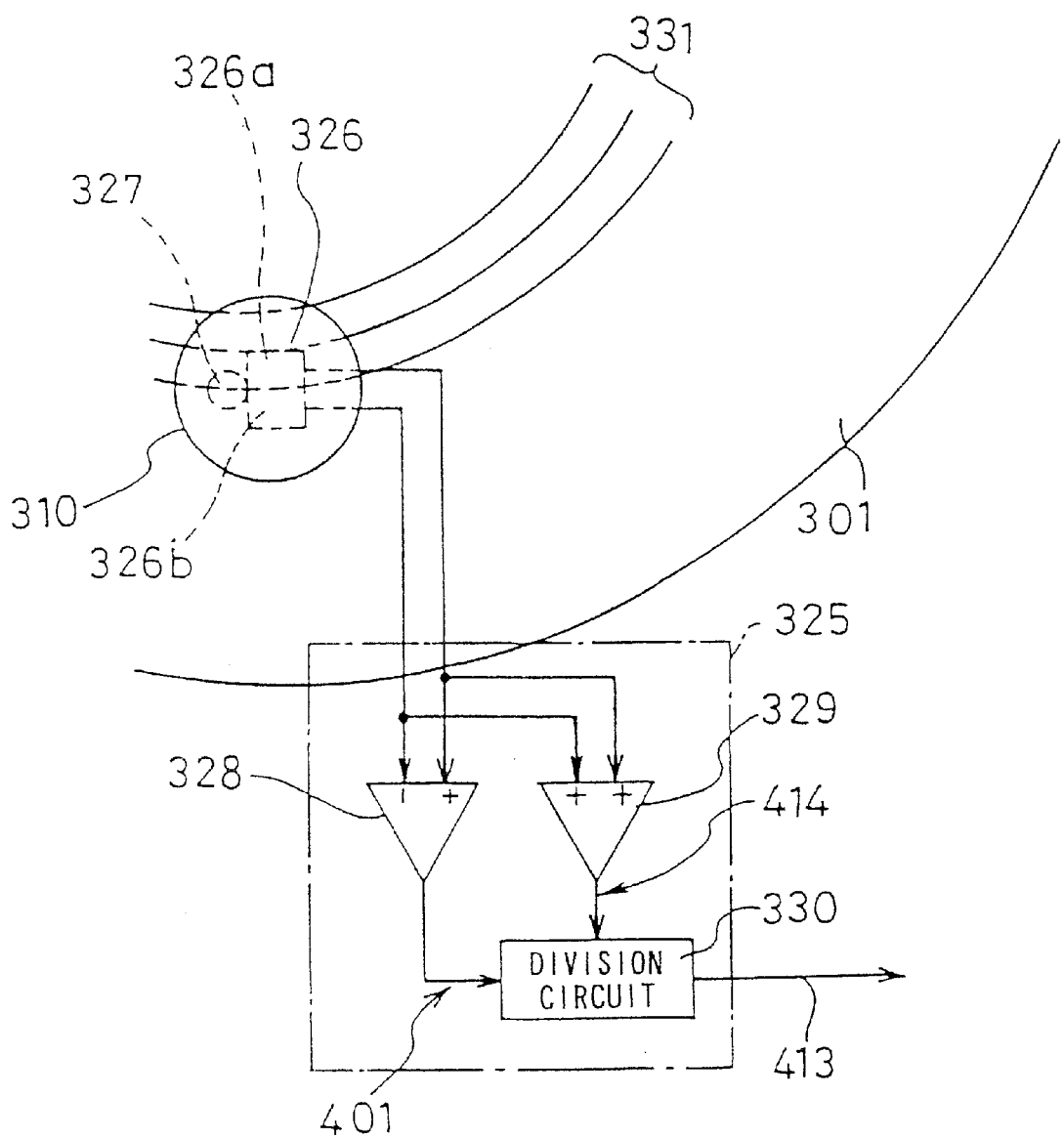
FIG. 29 is a block diagram showing the configurations of a tilt sensor and a normalized tilt error detection circuit in accordance with the embodiment 7 of the present invention.
Figure 30:
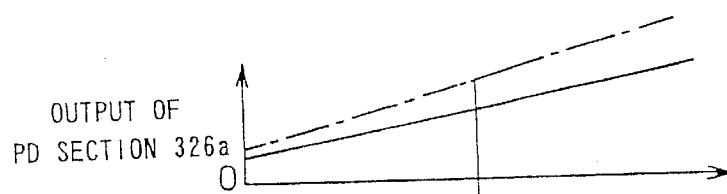
FIGS. 30(a) to (e) are graphs showing the relationship between the tilt angle of a disk and the output signals of a normalized tilt error detection circuit in accordance with the embodiment 7 of the present invention.
Figure 30:
Figure 30:
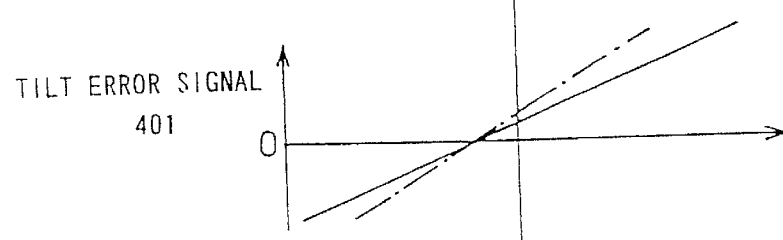
Figure 30:
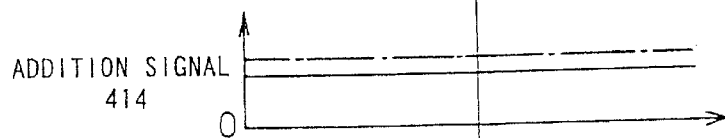
Figure 30:
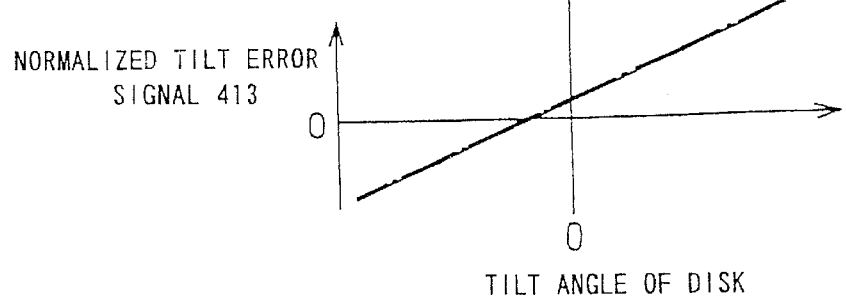

An embodiment 7 in accordance with the present invention will be described referring to FIGS. 28 to 30. The same components as those of the embodiment 4 are designated by the same numerals and their overlapping explanations are omitted.

Figure 28:
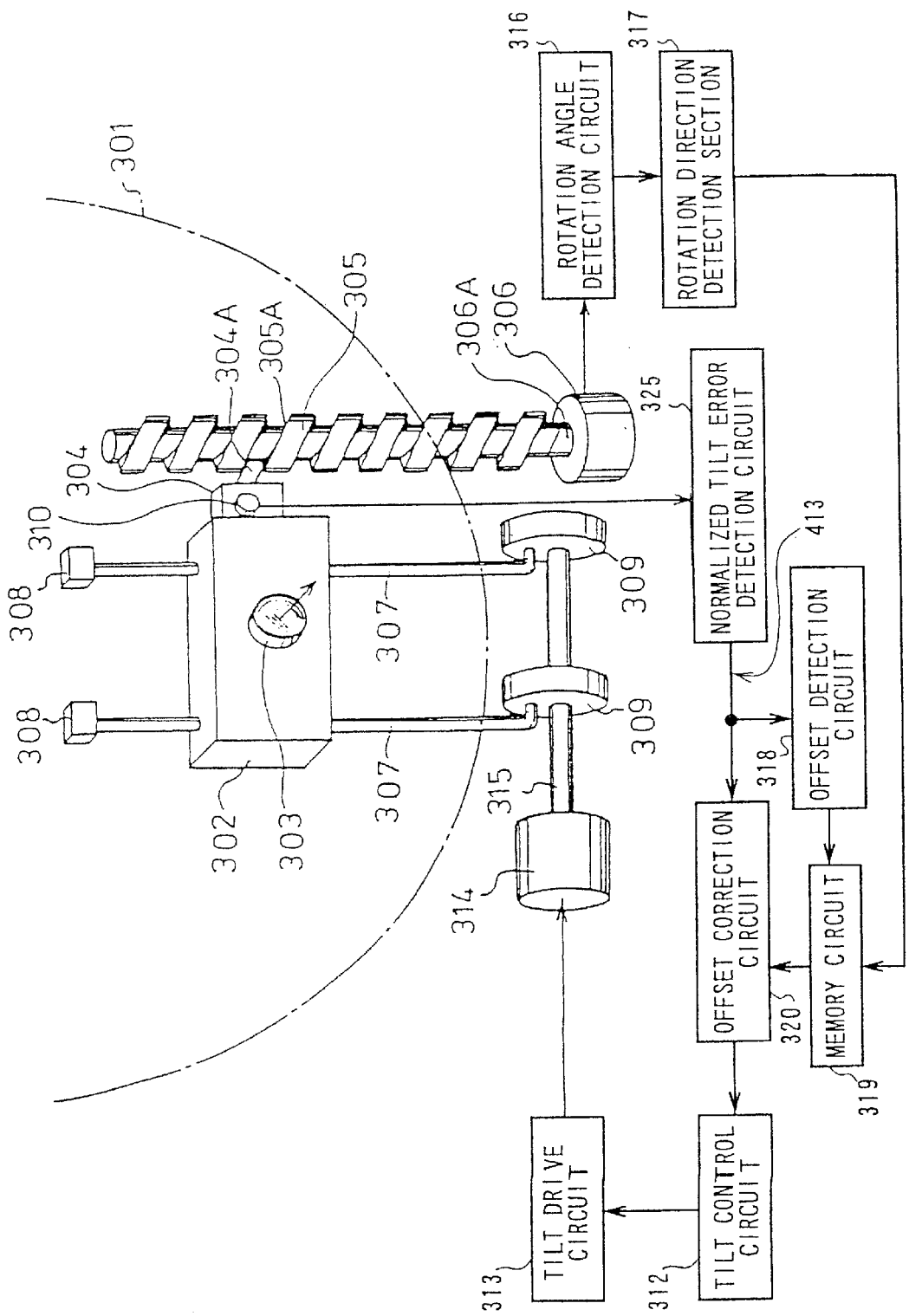
FIG. 28 is a block diagram showing the configuration of an optical information recording and reproducing apparatus in accordance with embodiment 7 of the present invention.

FIG. 28 is a block diagram showing the configuration of an optical information recording and reproducing apparatus in accordance with the present embodiment. In FIG. 28, the output of the tilt sensor 310 is input to a normalized tilt error detection circuit 325. The normalized tilt error detection circuit 325 inputs a normalized tilt error signal 413 detailed later to the offset detection circuit 318 and the offset correction circuit 320. The normalized tilt error detection circuit 325 outputs the normalized tilt error signal 413 detected by the tilt sensor 310 depending on the tilt angle of the disk face with respect to the optical axis of the light beam. The present embodiment differs from the embodiment 4 in that the normalized tilt error detection circuit 325 is provided instead of the tilt error detection circuit 311 and that the normalized tilt error signal 413 is applied to the offset detection circuit 318 and the offset correction circuit 320. The other configurations are substantially the same as those of the embodiment 4.

The detailed operation of the normalized tilt error detection circuit 325 will be described below. FIG. 29 is a block diagram showing the configurations of the tilt sensor 310 and the normalized tilt error detection circuit 325. In FIG. 29, the tilt sensor 310 is the same as the conventional one shown in FIG. 46 and has a two-part split PD 326 and a light source 327. The two-part split PD 326 is split into two parts in the direction of the tangents of the information tracks 331 recorded concentrically or helically on the disk 301. The two split sections are designated by a PD section 326a and a PD section 326b respectively. The optical axis of the light beam from the light source 327 is made perpendicular to the direction of the tangents of the information tracks 331 on the disk 301 and parallel with the optical axis of the light beam of the optical pickup 302. When the disk 301 is not tilted, the positional relationship between the two-part split PD 326 and the light source 327 is set so that the reflected light of the light beam of the light source 327 from the disk 301 irradicates the central section of the two-part split PD 326. The normalized tilt error detection circuit 325 has a subtraction circuit 328 for obtaining the difference between the output levels of the PD sections 326a and 326b of the tow-part split PD 326 and for outputting the difference as a tilt error signal 401 and an addition circuit 329 for obtaining the sum of the output levels of the PD sections 326a and 326b of the tow-part split PD 326 and for outputting the sum as an addition signal 414. The normalized tilt error detection circuit 325 further has a division circuit 330 for dividing the tilt error signal 401 by the addition signal 414 and for outputting the result of the division as the normalized tilt error signal 413.

The operation of the normalized tilt error detection circuit 325 will be described by using the graphs of FIGS. 30(a) to (e). In the respective graphs of FIG. 30, the solid lines represent values at the time when the reflectivity of the face of the disk 301 (hereafter referred to as face reflectivity) is 30%, and the one-dot chain lines represent values at the time when the face reflectivity is 59%. As shown in FIGS. 30(a) and (b), if the face reflectivity is large, the detection output levels of the PD sections 326a and 326b increase, and a level change with respect to the tilt angle of the disk 301 also increases. Therefore, the change of the tilt error signal 401 with respect to the tilt angle of the disk 301 also increases as shown in FIG. 30(c). The offset amount of the tilt error signal 401 also becomes large when the tilt angle of the disk 301 is zero. In addition, if the face reflectivity is high, as shown in FIG. 30(d), the level of the addition signal 414 obtained by adding the outputs of the PD sections 326a and 326b also increases. The face reflectivity of the disk 301 differs depending on the manufacturer of the disk 301 and also differs depending on the production method and material. When plural disks having different face reflectivities are used in a single apparatus, the offset amount changes depending on the disk 301 to be used. In the embodiment 7, the tilt error signal 401 is normalized by dividing the tilt error signal 401 by the addition signal 414. Therefore, it is possible to eliminate the offset of the tilt error signal 401 caused by the difference in the reflectivity of the disk 301. The graph of the normalized tilt error signal 413 is shown in FIG. 30(e). In the graph of the normalized tilt error signal 413 in FIG. 30(e), the solid line coincides with the one-dot chain line, thereby showing that the change in the tilt error signal 401 owing to the difference in the face reflectivity is eliminated.

In the present embodiment, the offset of the normalized tilt error signal 413 is stored, the movement direction of the optical pickup is detected by the rotation direction detection section 317, and the normalized tilt error signal 413 is corrected on the basis of the stored offset. This prevents the change of the tilt error offset owing to the change of the face reflectivity of the disk 301 and also prevents the tilt control error depending on the movement direction of the optical pickup 302. When the disk 301 is tilted, the tilt of the optical pickup 302 is controlled so that the light beam from the optical pickup 302 is perpendicularly applied to the disk 301 at all times, whereby the stability of the apparatus can be improved greatly. In the embodiment of the present invention, it is explained that the offset of the tilt error signal is caused by the combination of the pickup movement direction and the ambient temperature of the tilt sensor; however, even if either one is used to cancel the offset, the stability of the apparatus can be improved.

Embodiment 8

Figure 31:
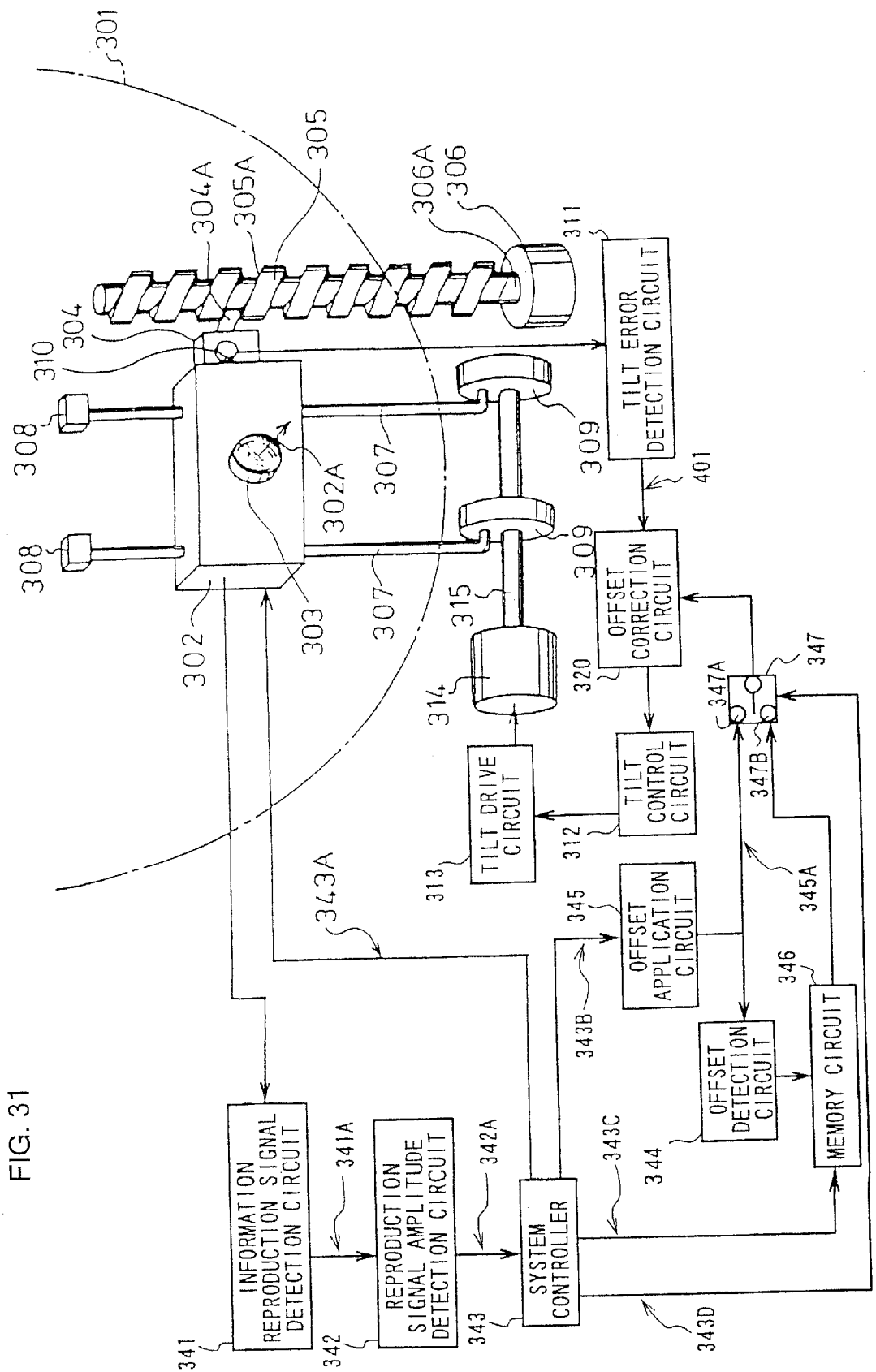
FIG. 31 is a block diagram showing the configuration of an optical information recording and reproducing apparatus in accordance with embodiment 8 of the present invention.

An embodiment 8 in accordance with the present invention will be described referring to FIGS. 31 to 33 and FIG. 51. The same components as those of the above-mentioned embodiments are designated by the same numerals and their overlapping explanations are omitted. FIG. 31 is a block diagram showing the configuration of an optical information recording and reproducing apparatus in accordance with the present embodiment. In the figure, the output terminal of the optical pickup 302 is connected to the input terminal of an information reproduction signal detection circuit 341, and an analog RF signal 341A based on the reflected light from the data pits formed on the disk 301 is output. The RF signal is a signal, the level of which changes depending on the presence or absence of a pit at the position on the disk face irradiated with the light beam of the optical pickup 302, and an amplitude RFA changes depending on the shape and formation position of the pit and the positional relationship between the pit and the light beam as shown in FIGS. 51(d) and (g). The RF signal 341A indicating the amplitude RAF is input to a reproduction signal amplitude detection circuit 342, an amplitude RAF of the RF signal 341A is detected, and an RF amplitude signal 342A is output. The RF amplitude signal 342A is input to a system controller 343. The system controller 343 outputs a recording/reproducing switching signal 343A to the optical pickup 302 depending on respective operation modes detailed later. The optical pickup 302 carries out recording or reproducing operation depending on the recording/reproducing switching signal 343A. Thesystem controller 343 sets an offset amount 343B in an offset application circuit 345 and outputs an offset amount signal 345A. The offset amount signal 345A is input to an offset detection circuit 344, and an offset value is output. The offset value is stored in a memory circuit 346. The offset amount signal 345A is applied to the contact 347A of a selection switch 347. The output terminal of the memory circuit 346 is connected to the contact 347B of the selection switch 347. An offset correction circuit 320 which is a control target value change section adds or subtracts the offset amount signal output from the memory circuit 346 or the offset application circuit 345 to or from the level of the tilt error signal 401. As a result, the control target value of the tilt control circuit 412 is changed by the offset amount corresponding to the offset amount signal. The other output terminals 343C and 343D of the system controller 343 are applied to the memory circuit 346 and the selection switch 347 respectively to control these. The system controller 343 is formed of a microcomputer and digital circuits. The memory circuit 346 is formed of an A/D converter and digital circuits including DRAM.

The basic operation in the present embodiment will be described below.

In the correction mode, sample data is recorded on a predetermined track on the disk 301. At this time, the offset amount signal 345A is output from the offset application circuit 345 and applied to the tilt drive circuit 313 via the selection switch 347, the offset correction circuit 320 and the tilt control circuit 312. At this time, the tilt angle is changed stepwise, and the same sample data is recorded on each different track at each tilt angle.

The recorded sample data is detected on each track and compared mutually to specify a track wherein the amplitude RFA of the RF signal 341A is the largest. The level of the tilt error signal corresponding to the tilt angle at the time of recording on this track is stored in the memory circuit 346 as a recording-time offset amount.

In the ordinary mode, the recording-time offset amount stored in the memory circuit is added to or subtracted from the tilt error signal 401 by the offset correction circuit 320 to correct the tilt angle.

Next, the operation of the present embodiment, divided into a correction mode and an ordinary mode, will be described in detail.

Figure 32:
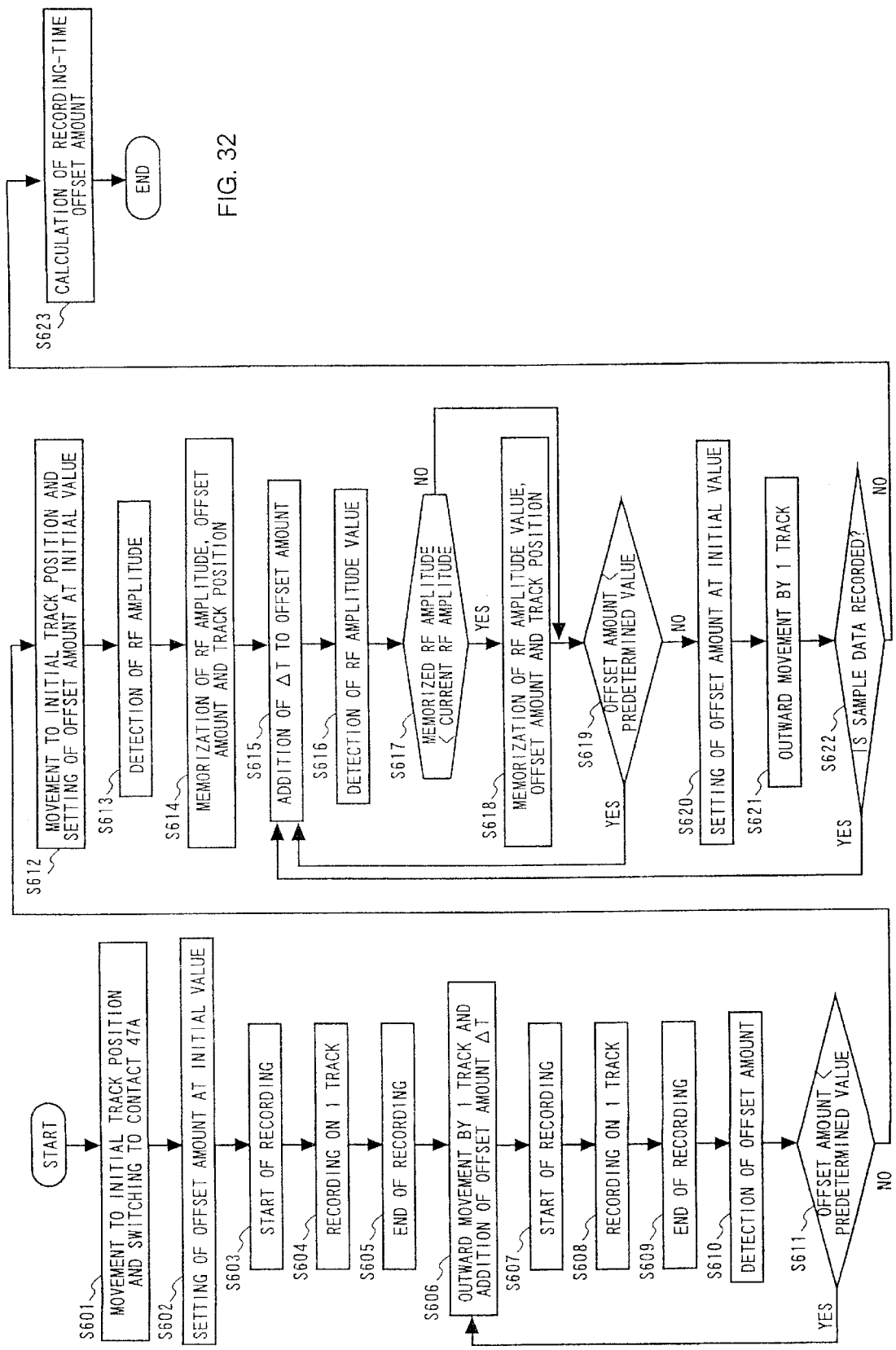
FIG. 32 is a flowchart showing the correction-mode operation of the optical information recording and reproducing apparatus in accordance with the embodiment 8 of the present invention.

First, the correction mode will be described referring to the flowchart shown in FIG. 32. The optical pickup 302 of FIG. 31 is moved to the position of the initial track of the disk 301. The initial track (hereafter referred to as a first track) is the innermost track of the disk 301, located in an area not used to record general data. The selection switch 347 is switched to the contact 347A (at step S601 in the flowchart of FIG. 32). The system controller 343 sets the initial value of the offset amount output from the offset application circuit 345 (step S602 of the same flowchart). This initial value is the minimum of the tilt error signal 401 output from the tilt error detection circuit 311 when tilt cams 309 are rotated. Next, the system controller 344 outputs the recording and reproducing switching signal 343A for directing the optical pickup 302 to record the sample data. At step S603, the optical pickup 302 starts recording the sample data. At step S604, recording is performed on one track, and the recording ends at step 605. At step S606, the optical pickup 302 is moved in the outer circumferential direction of the disk 301 by one track. This track is referred to as a second track. At the offset correction circuit 320, a predetermined minute offset amount ΔT is added. At step S607, the recording of the sample data on the second track starts; at step S608, the recording on the second track is performed; and at step S609, the recording ends.

At step S610, the offset amount set in the offset application circuit 345 is detected by the offset detection circuit 344. At step S611, the offset amount is compared with a predetermined value; if the offset value has not reached the predetermined value, the sequence returns to step S606, the optical pickup 302 is moved to a third track disposed further outward, and the processes from step S606 to step S611 are performed.

The predetermined value of the offset amount is for example the maximum value of the tilt error signal 401 at the time when the tilt cams 309 are rotated.

When the offset amount becomes the predetermined value or more at step S611, the processing sequence advances to step S612. At step S612, the optical pickup 302 shown in FIG. 31 is moved to the first track, and the offset amount is set at the initial value. The optical pickup 302 is switched to reproduction by the system controller 343, the recorded sample data is reproduced, and an RF amplitude value indicating the amplitude RFA of the output is detected (step S613). The detected RF amplitude value, offset amount and track position are stored in the memory circuit 346 as a group (step S614). The system controller 343 adds ΔT to the current offset amount (step S615). The rerecorded sample data is reproduced, and the RF amplitude value is detected (step S616). The RF amplitude value stored in the memory circuit 346 is read and compared with the current RF amplitude value (step S617); if the stored RF amplitude value is smaller, the current RF amplitude value, offset amount and track position are stored in the memory circuit 346 (step S618). If the stored RF amplitude value is not less than the current RF amplitude value, the sequence advances to step S619. The offset amount output from the offset application circuit 345 is detected by the offset detection circuit 344; if the offset amount has not reached the predetermined value, the sequence returns to step S615, and the offset amount ΔT is added to the offset amount output from the offset application circuit 345 by the system controller 343. If the offset amount is not less than the predetermined value, the sequence advances to step S620, and the offset amount is initialized. Next, at step S621, the optical pickup 302 is moved in the outer circumferential direction by one track. At step S622, a determination is made as to whether the track after the movement is the track on which the sample data is recorded. If the sample data is recorded, the sequence returns to step S615; if the sample data is not recorded, at step S623, from the track position stored in the memory circuit 346, a recording-time offset amount at the time when the track is recorded is calculated, and the recording-time offset amount is stored in the memory circuit 346, and the operation in the correction mode ends. By the operation in the above-mentioned correction mode, the maximum value of the amplitude RFA of the RF signal, the recording-time offset amount and the reproduction-time offset amount at which the amplitude RFA of the RF signal is a maximum are stored in the memory circuit 346.

In the above-mentioned correction mode, by changing the offset amount, the tilt angle of the optical pickup 302 changes accordingly. As the tilt angle changes, the intensity distribution of the light beam of the optical pickup 302 shown in FIG. 51(a) or (b) changes. In the case that the intensity distribution of the light beam is not symmetrical with respect to the optical axis OC as shown in FIG. 51(b), if the tilt angle is set at the predetermined value, the optical axis is tilted just like the optical axis OC-1 indicated in a one-dot chain line. The sample data is recorded on plural tracks while the offset amount is changed stepwise, and the recorded sample data is reproduced. By obtaining the offset amount at which the amplitude value of the reproduced signal is a maximum from among the reproduced sample data, the predetermined value of the above-mentioned tilt angle can be obtained. The level of the tilt error signal 401 corresponding to the above-mentioned "the predetermined value of the tilt angle" is referred to as the "recording-time offset amount." In addition, the offset amount at which the amplitude value 342A of the reproduced signal is a maximum is referred to as the "reproduction-time offset amount." The offset correction circuit 320 carries out correction by using the recording-time offset amount during recording and the reproduction-time offset amount during reproduction, whereby the intensity distribution of the light beam changes as indicated in a dotted line and becomes symmetrical with respect to the untilted original optical axis OC. Therefore, the recorded pits become symmetrical with respect to the center line TC of the track as shown in FIG. 51(c). The above-mentioned effect is obtained similarly even if the optical sensitivity of the area A of the disk 301 in FIG. 51(a) differs from that of the area B.

Figure 33:
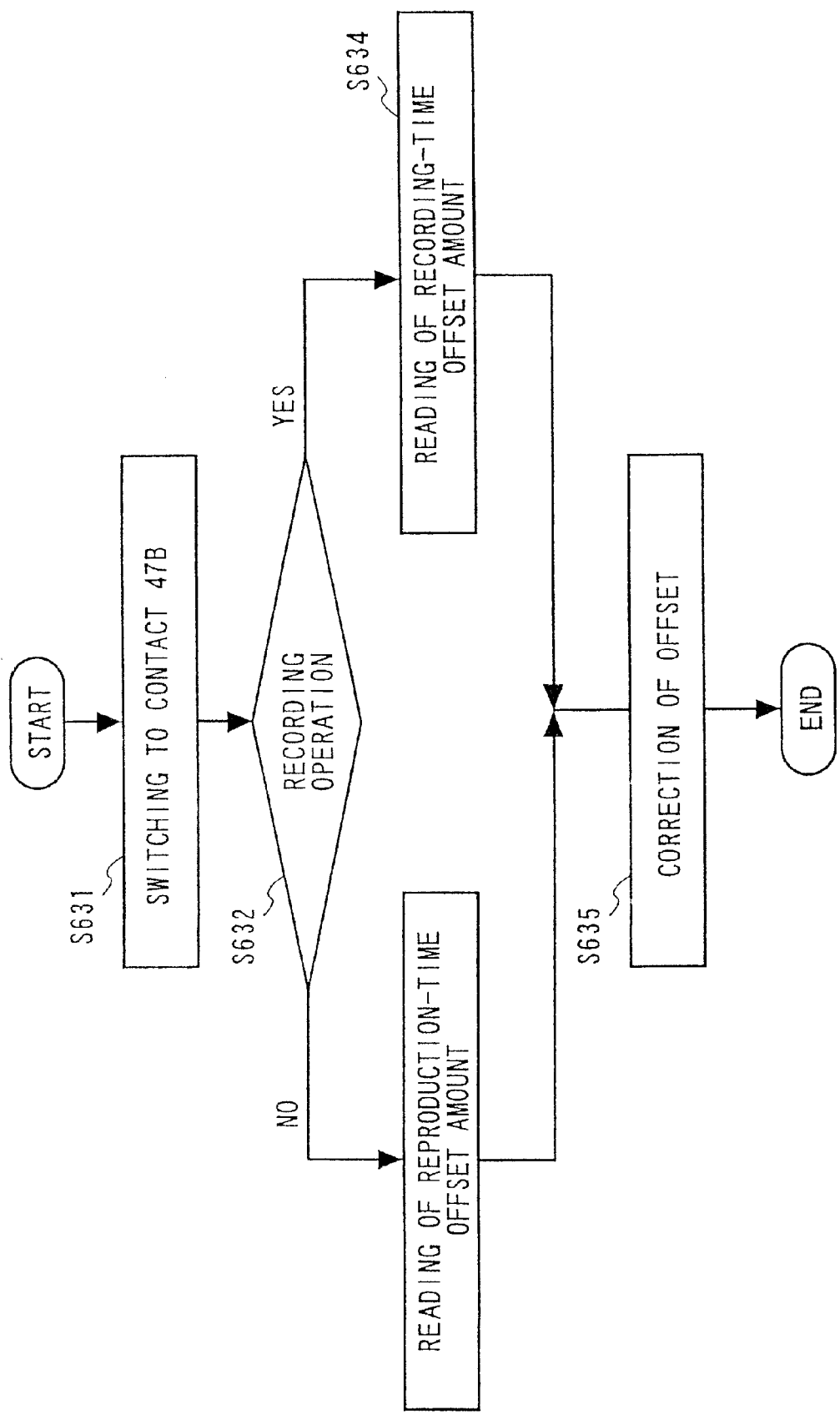
FIG. 33 is a flowchart showing the ordinary-mode operation of the optical information recording and reproducing apparatus in accordance with the embodiment 8 of the present invention.

Next, the operation in the ordinary mode will be described. FIG. 33 is a flowchart showing the operation in the ordinary mode. At step S631, the system controller 343 switches the switch 347 to its contact 341B. At step S632, the system controller 343 determines whether recording or reproduction is performed; when reproduction is performed, the recording and reproducing switching signal 343A for directing the optical pickup 302 to perform reproduction is output, and the sequence advances to step S633. At step S633, the reproduction-time offset amount is read from the memory circuit 346; at step S635, the offset amount is applied to the offset correction circuit 320 via the selection switch 347 to correct the offset. When it is judged that recording is performed at step S632, the system controller 343 outputs the recording and reproducing switching signal 343A for directing the optical pickup 302 to perform recording, and the sequence advances to step S634. The recording-time offset amount is read from the memory circuit 346 at step S364; at step S635, the offset amount is applied to the offset correction circuit 320 via the selection switch 347 to correct the offset. By the operation in the above-mentioned ordinary mode, pits being symmetrical with respect to the center line TC of the track are formed as shown in FIG. 51(c). In addition, the amplitude RFA of the RF signal 341A is a maximum as shown in FIG. 51(d) during reproduction.

In the present embodiment, an-example wherein each item of sample data is recorded on one track when recording is performed while the offset amount is changed by ΔT sequentially is taken and explained. However, the number of tracks on which each item of sample data is recorded is not limited to one, but plural track may be used for recording. As a result, it is possible to obtain the optimal "recording-time offset amount" and "reproduction-time offset amount," whereby control with higher accuracy is made possible.

Embodiment 9

Figure 34:
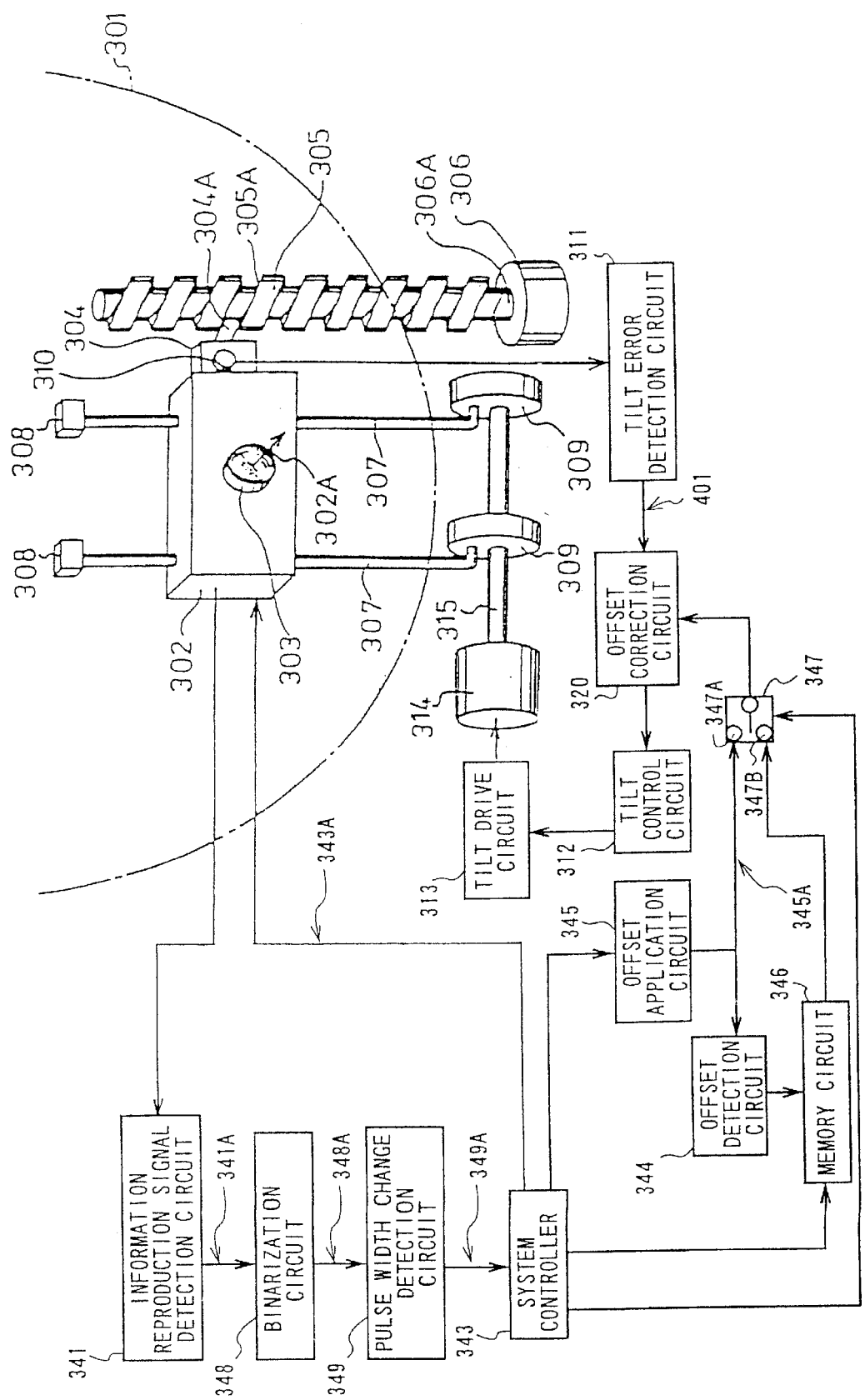
FIG. 34 is a block diagram showing the configuration of an optical information recording and reproducing apparatus in accordance with embodiment 9 of the present invention.

An embodiment 9 in accordance with the present invention will be described referring to FIGS. 31, 32, 34, 35 and 51. The same components as those of the above-mentioned embodiments are designated by the same numerals and their overlapping explanations are omitted. FIG. 34 is a block diagram showing the configuration of an optical information recording and reproducing apparatus in accordance with the present embodiment. In the figure, a binarization circuit 348 outputs a Hi voltage when the RF signal is not less than a predetermined level and outputs a Low voltage when the RF signal is less than the predetermined level as a binary RF signal 348A. In the binary RF signal 348A, the time widths (hereafter referred to as pulse widths) of the Hi and Low regions change depending on the pit length at a position on the disk face irradiated with the light beam of the optical pickup 302. When sample data having pit lengths and pit spaces being equal to each other is recorded, the difference between the time widths in the Hi and Low regions of the reproduced signal is referred to as a "pulse width change amount." The RF binary signal 348A is input to a pulse width change detection circuit 349; this circuit detects the pulse width change amount of the RF binary signal 348A and outputs a pulse change signal 349A. The pulse change signal 349A is input to the system controller 343. The system controller 343 outputs the recording/reproducing switching signal 343A to the optical pickup 302 depending on various operation modes detailed later.

The basic operation of the present embodiment will be describe below.

In the correction mode, sample data is recorded on a predetermined track of the disk 301 shown in FIG. 31. At this time, the offset amount signal 345A is output from the offset application circuit 345 and applied to the tilt drive circuit 313 via the selection switch 347, the offset correction circuit 320 and the tilt amount control circuit 312. At this time, just as in the case of the above-mentioned embodiment 8, while the tilt angle is changed stepwise, the same sample data is recorded on different tracks corresponding to respective tilt angles.

The recorded sample data is detected on each track and compared mutually to specify the track wherein the pulse width change amount of the RF binary signal 348A is the minimum. The level of the tilt error signal corresponding to the tilt angle at the time of recording on this track is used as a recording-time offset amount and stored in the memory circuit 346.

In the ordinary mode, the recording-time offset amount stored in the memory circuit is added to or subtracted from the tilt error signal 401 by the offset correction circuit 320 to correct the tilt angle.

Next, the operation in the correction mode of the present embodiment will be described in detail.

Figure 35:
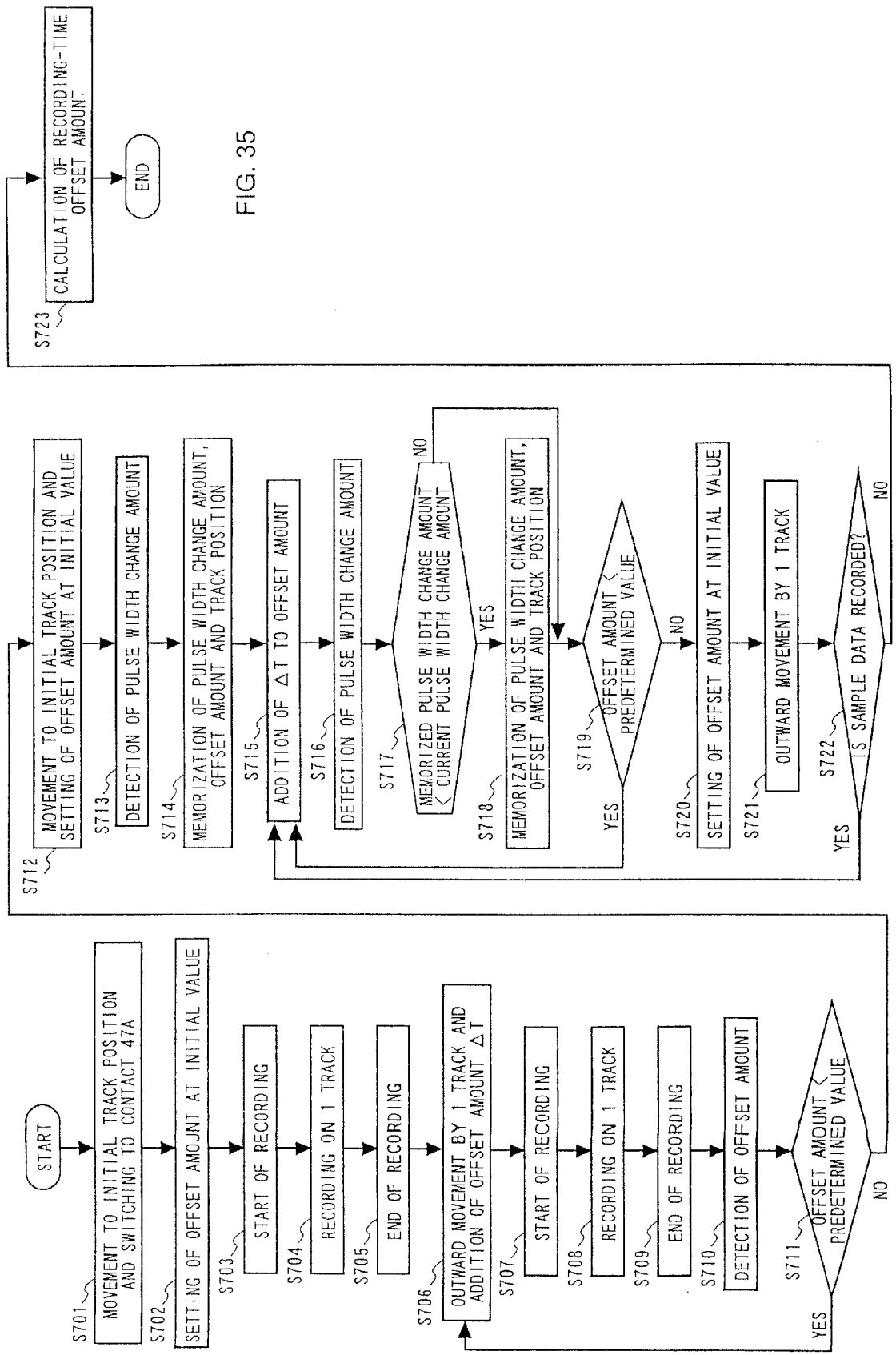
FIG. 35 is a flowchart showing the correction-mode operation of the optical information recording and reproducing apparatus in accordance with the embodiment 9 of the present invention.

The correction mode will be described referring to the flowchart of FIG. 35.

Since the processes at steps S701 to S712 are the same as those at S601 to S612, their overlapping explanations are omitted.

At step S712, the optical pickup 302 is moved over the first track; when the offset amount is set at the initial value, the optical pickup 302 is switched to reproduction by the system controller 343 to reproduce recorded sample data. The reproduced signal is binarized, and the pulse width change amount of the binary RF signal 348A is detected (step S713). The detected pulse width change amount, the offset amount and the track position are stored in the memory circuit 346 as a group (step S714). The system controller 343 adds ΔT to the current offset amount (step S715). The rerecorded sample data is reproduced, and the pulse width change amount is detected (step S716). The pulse width change amount stored in the memory circuit 346 is read and compared with the current pulse width change amount (step S717). When the stored pulse width change amount is larger, the current pulse width change amount, the offset amount and the track position are stored in the memory circuit 346 (step S718). When the stored pulse width change amount is not more than the current pulse width change amount, the sequence advances to step S719. Since steps S719 to S723 are the same as steps S619 to S623, their overlapping explanations are omitted.

By the operation in the above-mentioned correction mode, the minimum of the pulse width change amount of the binary RF signal 348A obtained by binarizing the reproduced signal, the recording-time offset amount and the reproduction-time offset amount at which the pulse width change amount is a minimum are stored in the memory circuit 346.

In the above-mentioned correction mode, by changing the offset amount, the tilt angle of the optical pickup 302 changes accordingly. As the tilt angle changes, the intensity distribution of the light beam of the optical pickup 302 shown in FIG. 51(a) or (b) changes. If the tilt angle is set at a predetermined angle when the intensity distribution of the light beam is not symmetrical with respect to the optical axis OC, the optical axis is tilted just like an optical axis OC1 indicated in a one-dot chain line as shown In FIG. 51(b). While the offset amount is changed stepwise, the sample data is recorded on plural tracks, and the recorded sample data is reproduced. The offset amount at which the pulse width change amount is a minimum is obtained from the reproduced sample data, whereby the predetermined value of the above-mentioned tilt angle can be obtained. The level of the tilt error signal 401 corresponding to "the predetermined value of the tilt angle" described above is referred to as the "recording-time offset amount." In addition, the offset amount at which the amplitude 342A of the reproduced signal is a maximum is referred to as the "reproduction-time offset amount." As a result, the intensity distribution of the light beam changes as indicated in a dotted line, whereby the intensity distribution of the light beam becomes symmetrical with the untilted original optical axis OC. Therefore, the recorded pits become symmetrical with respect to the track center TC as shown in FIG. 51(c). The above-mentioned effect is obtained similarly even when the optical sensitivity in the area A of the disk 301 in FIG. 51(a) differs from that in the area B.

Embodiment 10

In a write-once disk (a disk on which recording is possible only once), such as a DVD-R, the area usable in the correction modes of the above-mentioned embodiments 8 and 9 is limited, thereby causing a problem wherein the number of additional writing times is limited in the correction. In addition, there is a problem of requiring a long time for the recording of sample data. To solve these problems, the difference between the recording-time offset amount and the reproduction-time offset amount is obtained beforehand as a recording-time addition offset amount. At the time for recording data, a mode (hereafter referred to as a learning mode) is carried out wherein only the reproduction-time offset amount is read, and the recording-time addition offset amount is added thereto to obtain the recording-time offset amount. Since the operation in the ordinary mode of the embodiment 9 (sic 10) is the same as that of the embodiment 9, its explanation is omitted.

The embodiment 10 of the present invention will be described referring to FIGS. 31, 32, 36, 37 and 51. The same components as those of the above-mentioned embodiments are designated by the same numerals and their overlapping explanations are omitted. The configuration of the optical information recording and reproducing apparatus in accordance with the present embodiment is the same as that in accordance with the embodiment 8 shown in FIG. 31.

The basic operation of the present embodiment will be described below.

The correction mode of the embodiment 8 or the embodiment 9 is carried out at a predetermined time (at the time of the shipment of the apparatus, for example), and the difference between the recording-time offset amount and the reproduction-time offset amount is stored as the "recording-time addition offset amount" in the memory circuit 346 shown in FIG. 31. When data is recorded on the disk 301, sample data is recorded on a predetermined track of the disk 301 in the learning mode. However, the selection switch 347 does not make contact with either the contact 347A or the contact 347B but is set at an open state. The sample data is recorded while tilt control is carried out so that the tilt angle detected by the tilt error detection circuit 311 becomes zero. Next, the recorded sample data is stored as the "reproduction-time offset amount" in the memory circuit 346 by changing the tilt angle stepwise, and specifying the offset amount at which the amplitude RFA of the RF signal 342A is a maximum. In addition, the offset amount obtained by adding the recording-time addition offset amount to the reproduction-time offset amount is stored as the "recording-time offset amount" in the memory circuit 346.

In the ordinary mode, the recording-time offset amount stored in the recording circuit is added to or subtracted from the tilt error signal 401 by the offset correction circuit 320 to correct the tilt angle.

Next, the operations in the correction mode and the learning mode of the present embodiment will be described in detail.

Figure 36:
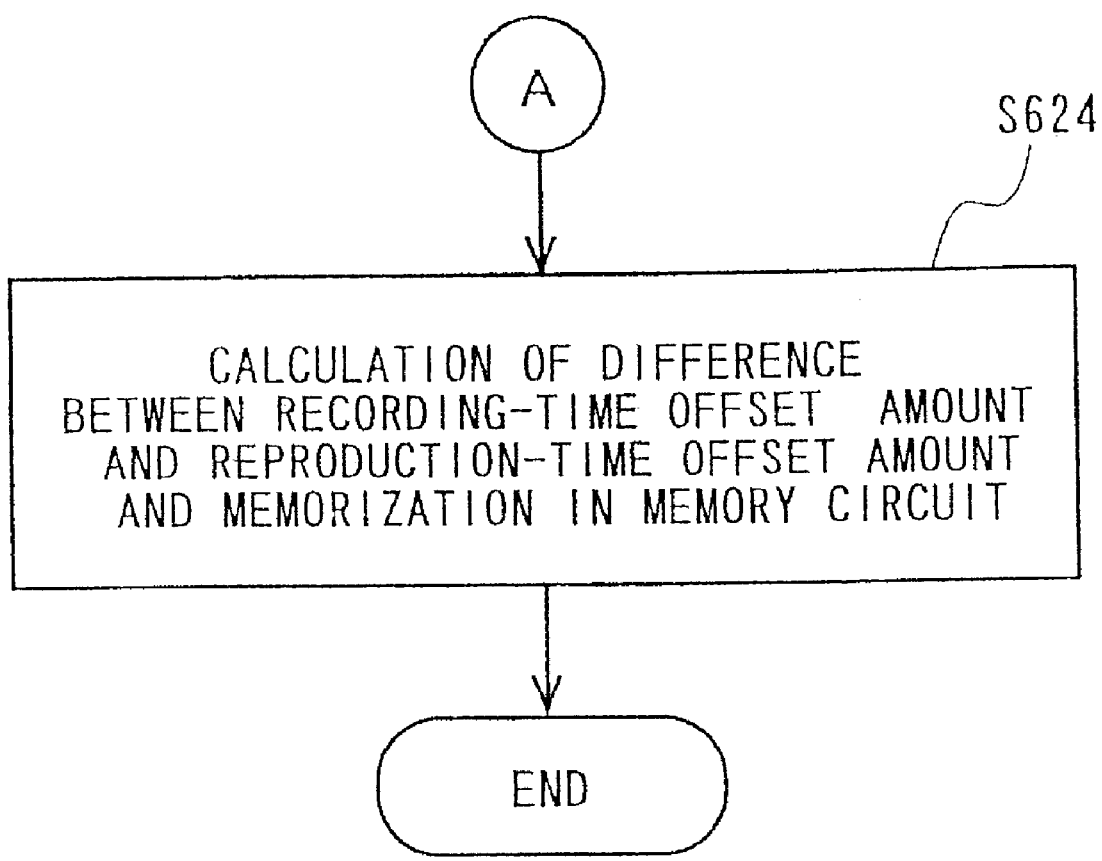
FIG. 36 is a flowchart showing the correction-mode operation of the optical information recording and reproducing apparatus in accordance with embodiment 10 of the present invention.
Figure 38:
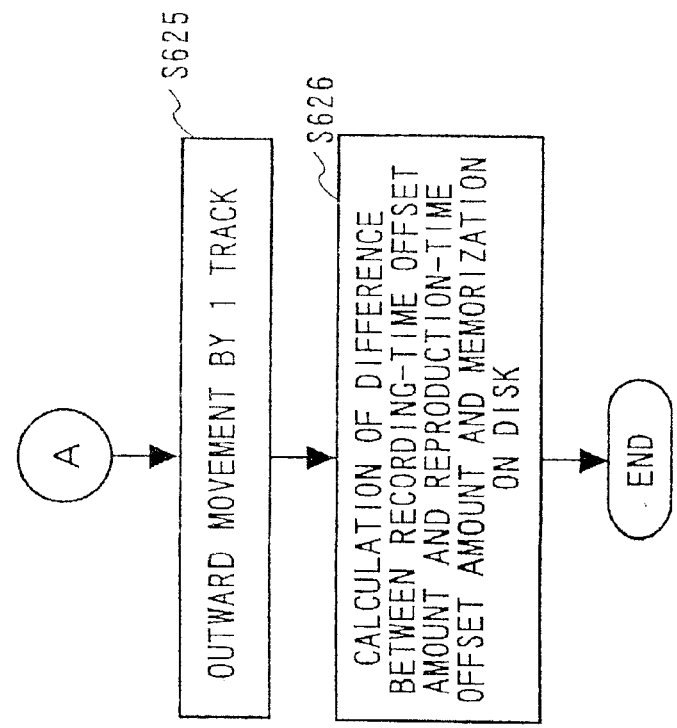
FIG. 38(a) is a flowchart showing the correction-mode operation of the optical information recording and reproducing apparatus in accordance with embodiment 11 of the present invention, and (b) is a flowchart showing the learning-mode operation of the apparatus in accordance with the embodiment 11.
Figure 38:
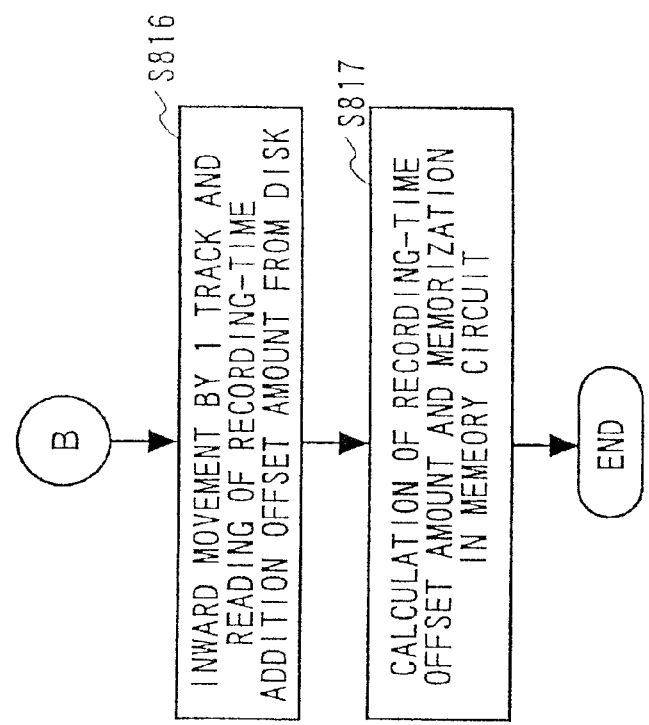

First, the correction mode will be described referring to the flowchart shown in FIG. 36. Process A indicates the processes at step S601 to S623 of FIG. 32. At step S624, the system controller 343 reads the recording-time offset amount and the reproduction-time offset amount from the memory circuit 346 and calculates the difference therebetween, and the difference is stored as the recording-time addition offset amount in the memory circuit 346. By the operation in this correction mode, the difference between the recording-time offset amount and the reproduction-time offset amount at which the amplitude RFA of the RF signal is a maximum is stored in the memory circuit 346.

Next, the learning mode will be described referring to the flowchart shown in FIG. 37. The optical pickup 302 is moved to the initial track position on the disk 301. The initial track is the innermost track of the unrecorded tracks on the disk 301 and located in an area not used for ordinary data recording. The selection switch 347 does not make contact with either the contact 347A or the contact 347B but is set at the open state so that the offset amount to be applied to the offset correction circuit becomes zero, and then tilt control is carried out so that the tilt angle detected by the tilt error detection circuit 311 becomes zero (step S801). Next, the system controller 343 outputs the recording and reproducing switching signal for directing the optical pickup 302 to record the sample data. At step S802, the optical pickup 302 starts recording the sample data. At step S803, the recording is carried out on one track, and the recording ends at step S804. At step 805, the optical pickup 302 is moved over the initial track; at step S806, the switch 347 is switched to the contact 347A, and the offset amount is set at its initial value. This initial value is the minimum of the tilt error signal 401 output from the tilt error detection circuit 311 at the time when the tilt cams 309 are rotated. Next, the optical pickup 302 is switched to reproduction by the system controller 343, the recorded sample data is reproduced, and the RF amplitude value indicating the amplitude RFA of the output is detected (step S807). The detected RF amplitude value and the offset amount are stored in the memory circuit 346 as a pair (step S808). The system controller 343 adds an offset amount ΔT to the current offset amount (step S809). The rerecorded sample data is reproduced, and the RF amplitude value is detected (step S810). The RF amplitude value stored in the memory circuit 346 is read and compared with the current RF amplitude value (step S811); when the stored RF amplitude value is smaller, the current RF amplitude value and the offset amount are stored in the memory circuit 346 (step S812). When the stored RF amplitude value is not less than the current RF amplitude value, the sequence advances to step S813. The offset detection circuit 344 detects the offset amount output from the offset application circuit 345; when the offset amount does not reach a predetermined value, the sequence returns to step S809. Then, the system controller 343 adds the offset amount ΔT to the offset amount output from the offset addition circuit 345. When the offset amount is not less than the predetermined value, the sequence advances to step S814, and the recording-time addition offset amount and the reproduction-time offset amount stored in the memory circuit 346 are read. At step S815, the recording-time addition offset amount is added to the reproduction-time offset amount and stored as the recording-time offset amount in the memory circuit 346, and then the leaning mode ends. By the operation in the above-mentioned learning mode, the maximum of the amplitude of the RF signal, the recording-time offset amount and the reproduction-time offset amount at which the amplitude value of the RF signal is a maximum are stored in the memory circuit 346.

In the ordinary mode, by carrying out the same recording/reproducing operation as that of the embodiment 9, pits symmetrical with respect to the track center line TC shown in FIG. 51(c) are formed. In addition, at the time of reproduction, the amplitude value of the RF signal 341A is a maximum, whereby the detection accuracy for the recording/reproducing signal is improved greatly. The present embodiment only differs from the embodiment 8 in that only the learning mode is carried out after the correction mode is done. Since the recording of the sample data is carried out on only one track in the learning mode, it is possible to reduce the disk area to be used for adjustment and to reduce the time for the adjustment.

In the present embodiment, the offset amounts at which the amplitude of the RF signal is a maximum are used for the learning; however, a similar effect can be obtained even if offset amounts at which the pulse change amount of the binary RF signal is a minimum are used for the learning just as in the case of the embodiment 9. Since the operation in the ordinary mode of the present embodiment is the same as that of the above-mentioned embodiment 8, its explanation is omitted.

Embodiment 11

An embodiment 11 in accordance with the present invention will be described referring to FIGS. 31, 37, 38 and 51.

The configuration of the optical information recording and reproducing apparatus in accordance with the present embodiment is the same as that of the embodiment 8 shown in FIG. 31.

The basic operation of the present embodiment will be described below.

The correction mode of the embodiment 8 or the embodiment 9 is carried out at a predetermined time (at the time of the shipment of the disk, for example), and the difference between the recording-time offset amount and the reproduction-time offset amount is stored as the "recording-time addition offset amount" on the disk 301. When data is recorded on the disk 301, sample data is recorded on a predetermined track of the disk 301 in the learning mode. However, the selection switch 347 does not make contact with either the contact 347A or the contact 347B but is set at an open state. The sample data is recorded on the disk 301 while tilt control is carried out so that the tilt angle detected by the tilt error detection circuit 311 becomes zero. Next, the recorded sample data is reproduced while the tilt angle is changed stepwise, and an offset amount at which the amplitude RFA of the RF signal 341A is a maximum is specified and stored as the "reproduction-time offset amount" in the memory circuit 346. In addition, the offset amount obtained by adding the recording-time addition offset amount to the reproduction-time offset amount is stored as the "recording-time offset amount" in the memory circuit 346.

In the ordinary mode, the recording-time offset amount stored in the recording circuit is added to or subtracted from the tilt error signal 401 by the offset correction circuit 320 to correct the tilt angle.

Next, the operations in the correction mode and the learning mode of the present embodiment will be described in detail.

First, the correction mode will be described referring to the flowchart shown in FIG. 38(a). Process A indicates the processes at step S601 to S623 of FIG. 32. At step S625, the system controller 343 moves the optical pickup to the track one track outward from the track used to record the sample data in the correction mode. Next, at step S626, the recording-time offset amount and the reproduction-time offset amount are read from the memory circuit 346, and the difference therebetween is calculated and recorded as the recording-time addition offset amount on the disk 301. By the operation in this correction mode, the difference between the recording-time offset amount and the reproduction-time offset amount at which the amplitude RFA of the RF signal is a maximum is recorded on the disk 301.

Next, the learning mode will be described referring to the flowchart shown in FIG. 38(b). Process B indicates the processes at step S801 to S814 of FIG. 37.

At step S816, the optical pickup is moved to the inner track by one on which the recording-time addition offset amount has recorded in the correction mode, and the recording-time addition offset amount and the reproduction-time offset amount are read. At step S817, the recording-time addition offset amount is added to the reproduction-time offset amount, and the result of the addition is stored as the recording-time offset amount in the memory circuit 346, and then the leaning mode ends. By the operation in the above-mentioned learning mode, the maximum of the amplitude of the RF signal, the recording-time offset amount and the reproduction-time offset amount at which the amplitude value of the RF signal is a maximum are stored in the memory circuit 346. In the ordinary mode, by carrying out the recording/reproducing operation similar to that of the embodiment 8, pits symmetrical with respect to the track center line TC shown in FIG. 51(c) are formed. Hence, at the time of reproduction, the amplitude RFA of the RF signal 341A is amaximum, whereby the detection accuracy for the recording/reproducing signal is improved greatly. The present embodiment only differs from the embodiment 8 in that only the learning mode is carried out after the execution of the correction mode. Since the recording of the sample data is carried out on only one track in the learning mode, it is possible to reduce the disk area to be used for adjustment and to reduce the time for the adjustment.

In the present embodiment, the offset amounts at which the amplitude RFA of the RF signal is a maximum are used for the learning; however, a similar effect can be obtained even if offset amounts at which the pulse change amount of the binary RF signal is a minimum are used for the learning just as in the case of the embodiment 9. Since the operation in the ordinary mode of the present embodiment is the same as that of the above-mentioned embodiment 8, its explanation is omitted.

Embodiment 12

Figure 39:
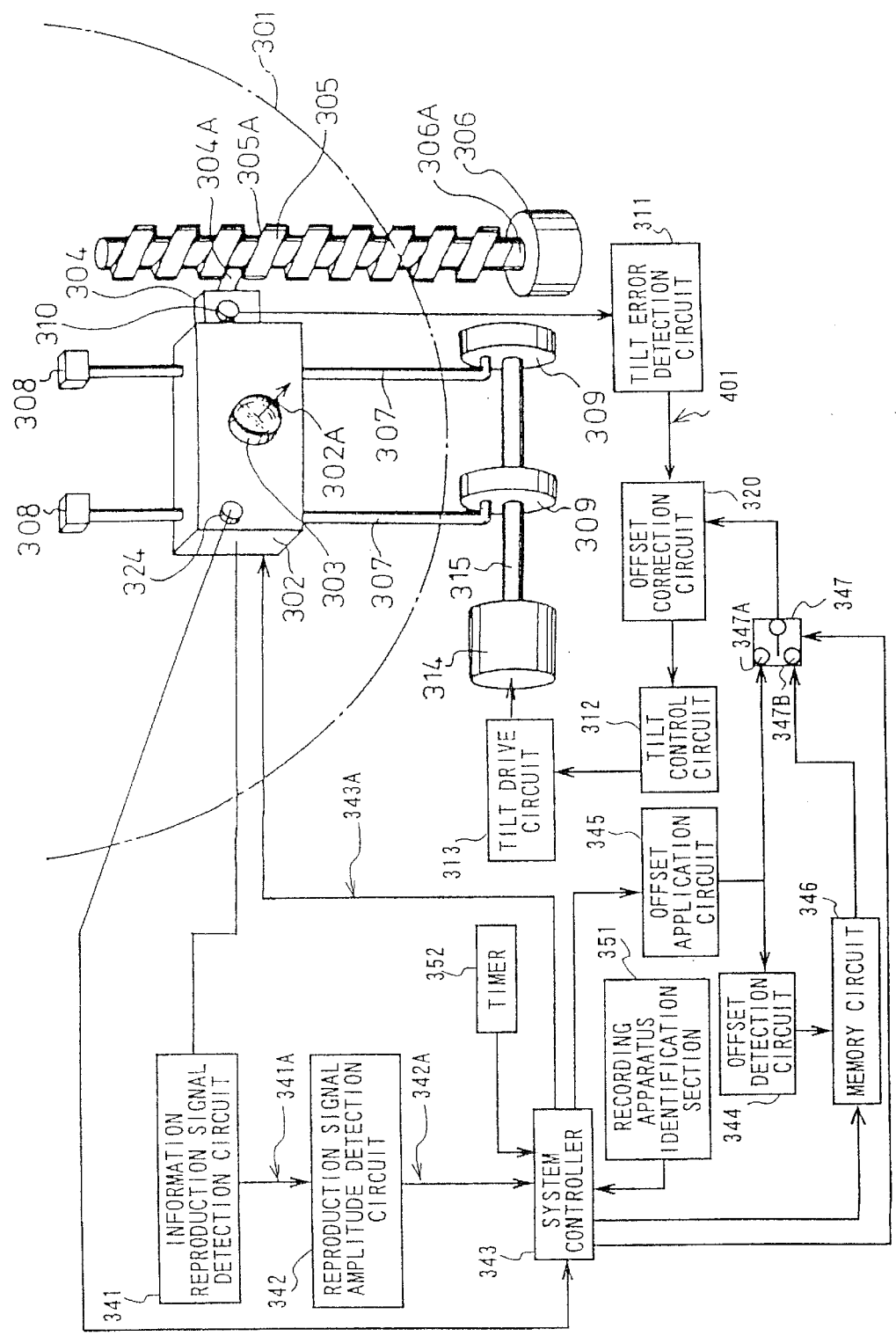
FIG. 39 is a block diagram showing the configuration of an optical information recording and reproducing apparatus in accordance with embodiment 12 of the present invention.

An embodiment 12 in accordance with the present invention will be described referring to FIGS. 39, 40 and 51(c). The same components as those of the above-mentioned embodiments are designated by the same numerals and their overlapping explanations are omitted. The operation sin the correction mode, learning mode and ordinary mode of the present-embodiment are the same as those of the above-mentioned embodiments 8 to 10; however, the operations in these modes of the present embodiment differ from those of the above-mentioned embodiments 8 to 10 in that the operations are carried out appropriately and selectively depending on the ambient temperature of the apparatus and the operation time of the apparatus. FIG. 39 is a block diagram showing the configuration of an optical information recording and reproducing apparatus in accordance with the embodiment 12. In FIG. 39, in addition to the components of the embodiment 8, the apparatus of the embodiment 12 has a timer 352 for measuring the total operation time of the apparatus and a recording apparatus identification section 351 provided with recorded information (hereafter referred to as an apparatus number) capable of uniquely specifying the apparatus, such as the name of the manufacturer, model number, production number and the like of the recording apparatus to identify the recording apparatus. Furthermore, the apparatus has a temperature sensor 324 for detecting the temperature around the apparatus. The time information of the timer 352, the apparatus identification number read from the recording apparatus identification section 351 and the temperature information of the temperature sensor 324 are input to the system controller 343. The operation of the optical information recording and reproducing apparatus of the embodiment 12 configured as described above will be described.

The basic operation of the present embodiment will be described below.

The correction mode of the embodiment 8 or the embodiment 9 is carried out at a predetermined time (at the time of the shipment of the disk for example), and the difference between the recording-time offset amount and the reproduction-time offset amount is stored as the recording-time addition offset amount on the track one track outward from the track on which the sample data is recorded in the correction mode. During the operation period of the apparatus, the correction mode or the learning mode is carried out as necessary depending on the following conditions. The correction mode is necessary when the optical sensitivity characteristic of the disk 301 and the optical characteristic of the optical pickup 302 are changed owing to the passage of time and the change in the environmental operation conditions of the apparatus (for example, temperature humidity and atmospheric pressure).

Figure 40:
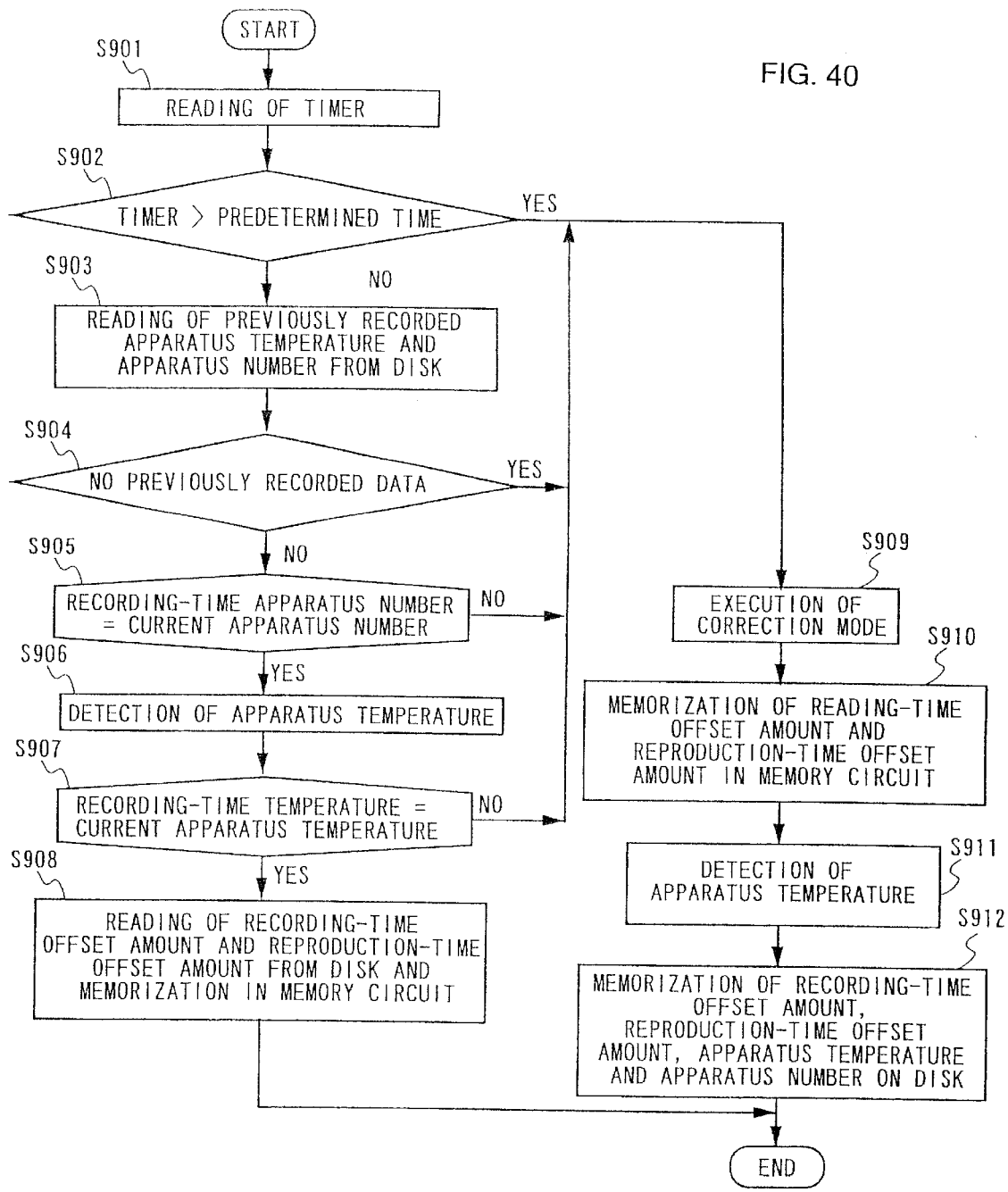
FIG. 40 is a flowchart showing the correction-mode operation of the optical information recording and reproducing apparatus in accordance with embodiment 12 of the present invention.
Figure 41:
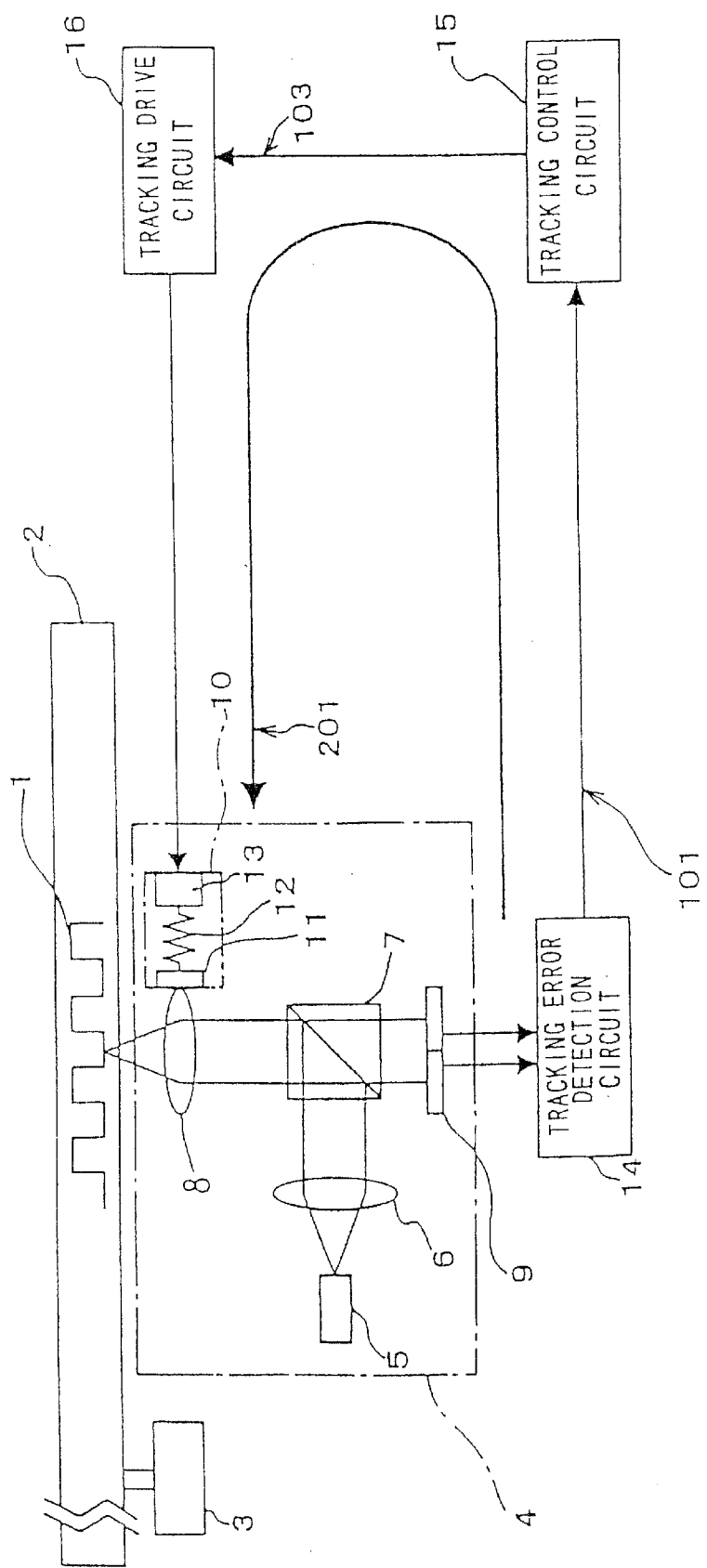
FIG. 41 is a block diagram showing the configuration of a conventional optical information recording and reproducing apparatus.
Figure 42:
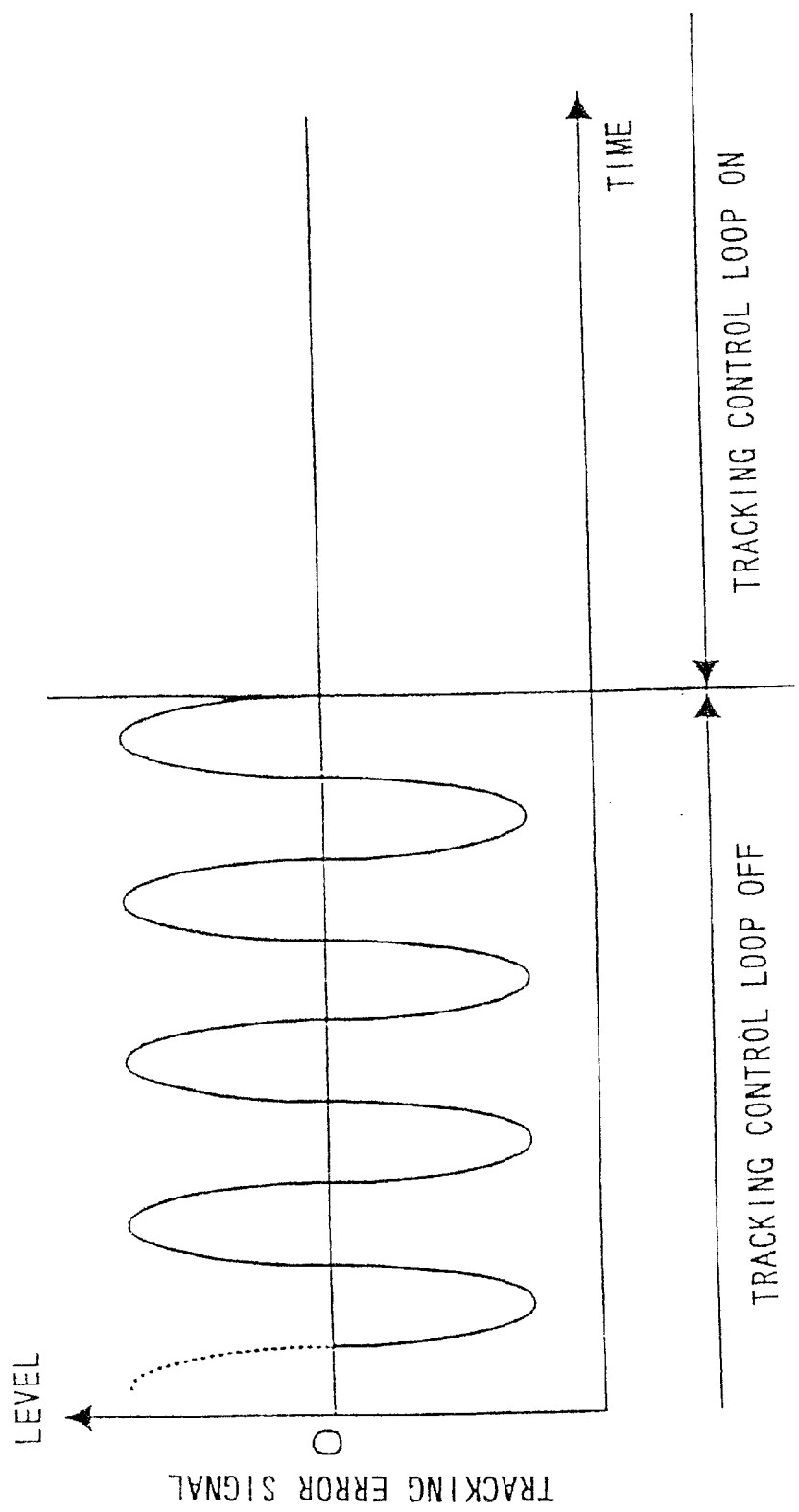
FIG. 42 is a graph showing the change in the level of the tracking error signal at the time when a tracking control loop is switched from OFF to ON in a state wherein no object lens displacement occurs in the conventional optical information recording and reproducing apparatus.

FIG. 40 is a flowchart showing the detailed operation in the correction mode of the present embodiment.

First, the system controller 343 reads the total operation time of the apparatus from the timer 352 (step S901), and determines whether the total operation time of the apparatus is more than a predetermined time or not (step S902). If the time is more than the predetermined time, the timer 352 is initialized, and the sequence advances to step S909. This predetermined time should preferably be set at for example ¹⁄₁₀ of the operation warranty time of the optical pickup 302. If the total operation time of the apparatus is not more than the predetermined time, the sequence advances to step S903, and the temperature of the apparatus and the apparatus number recorded previously are read from the disk 301. If there is no previously recorded data (step S904), the sequence advances to step S909. If there is previously recorded data, the current apparatus number is read by the recording apparatus identification section 351 and compared with the previously recorded apparatus number (step S905). If the apparatus numbers do not coincide with each other, the sequence advances to step S909. If the apparatus numbers coincide with each other, the sequence advances to step S906, the temperature sensor 324 detects the current apparatus temperature, and the previously recorded temperature is compared with the current apparatus temperature (step S905). If the temperatures coincide with each other or they are within a predetermined temperature difference range, the sequence advances to step S908, the recording-time offset amount and the reproduction-time offset amount previously recorded are read from the disk 301 and stored in the memory circuit 346, and then the operation ends. If the temperatures do not coincide with each other or they are beyond the predetermined temperature difference range, the sequence advances to step S909, and the correction mode described in the embodiments 8 to 10 is carried out. Then, the recording-time offset amount and the reproduction-time offset amount are stored in the recording circuit 346 (step S910). The temperature sensor 324 then detects the current apparatus temperature (step S911); and the recording-time offset amount, the reproduction-time offset amount, the apparatus temperature and the apparatus number are recorded on the disk 301 (step S912). By the above-mentioned operation, the maximum of the amplitude RFA of the RF signal, the recording-time offset amount and the reproduction-time offset amount at which the amplitude RFA of the RF signal is a maximum are stored in the memory circuit 346. In the ordinary mode, by carrying out the recording/reproducing operation similar to that of the embodiment 9, pits symmetrical with respect to the track center line TC shown in FIG. 51(c) are formed. In addition, at the time of reproduction, the amplitude value of the RF signal 341A is a maximum, whereby the detection accuracy for the recording/reproducing signal is improved greatly.

Furthermore, in comparison with the embodiment 8, when the recording environment conditions, such as the recording apparatus and recording-time temperature, are the same, sample recording is not carried out twice or more, it is possible to reduce the disk area to be used for adjustment and to reduce the time for the adjustment. In the present embodiment, the offset amounts at which the amplitude RFA of the RF signal is a maximum are used for the learning; however, a similar effect can be obtained even if offset amounts at which the pulse width change amount of the binary RF signal is a minimum are used for the learning just as in the case of the embodiment 9. Moreover, although the correction mode was carried out at step S909, by carrying out the learning mode, it is possible to reduce the disk area to be used for adjustment and to reduce the time for the adjustment. In addition, although the total operation time of the apparatus is measured by the timer 352 and compared with the predetermined value, a similar effect can be obtained even if an absolute time (a time including non-operation time) or the total recording operation time of the apparatus is compared with the predetermined time. By using a humidity sensor or a pressure sensor instead of the. temperature sensor 324, the operation in the correction mode can be carried out on the basis of humidity or pressure. In the present embodiment, the optimum tilt of the optical axis of the light beam of the optical pickup with respect to the above-mentioned disk face in a direction perpendicular to the information tracks is learnt and controlled at the optimal control target value at all times as described above. However, the direction of the tilt to be controlled is not limited to the direction perpendicular to the information tracks; by changing the configuration of the lead shaft 307, the optimal tilt in parallel with the tangents of the information tracks may be learnt and controlled at the optimal control target value at all times.

INDUSTRIAL APPLICABILITY

As described above in detail in the explanations of the embodiments, even if the characteristic of the optical pickup is changed owing to the change in temperature and the deterioration of the components constituting the optical pickup with the passage of time, by optimally changing the characteristic of the equivalent filter, the optical information recording and reproducing apparatus in accordance with the present invention can detect the displacement amount of the object lens from the optical pickup center highly accurately by using the drive command of the tracking actuator. In other words, the relationship among the displacement amount of the object lens and the offset and amplitude of the tracking error signal is determined beforehand, and the offset and amplitude of the tracking error signal are corrected so that the relationship becomes equal to that obtained when the displacement amount of the object lens is zero. By this correction, even if the object lens is displaced, stable tracking control operation is made possible. Furthermore, the relationship among the displacement amount of the object lens, the tilt amount and the offset and amplitude of the tracking error signal is determined beforehand, and the offset and amplitude of the tracking error signal are corrected so that the relationship becomes equal to that obtained when the displacement amount is zero and when the tilt angle is zero. By this correction, even if the object lens is displaced and the disk is tilted, stable tracking control operation is made possible. Furthermore, in the optical information recording and reproducing apparatus in accordance with the present invention, the offset of the tilt error signal depending on the movement direction of the optical pickup is stored beforehand. The movement direction of the optical pick is detected by the rotation direction detection section, and the tilt error signal is corrected on the basis of the above-mentioned stored offset, whereby the tilt control error depending on the moving direction is prevented even if the offset of the tilt error signal is changed owing to the deformation of the lead rack caused by the change in temperature or the movement of the optical pickup. Therefore, even if the disk is tilted, the tilt is controlled so that the light beam output from the optical pickup is perpendicularly applied to the disk 301 at all times, whereby the stability of the information recording and reproducing apparatus can be improved significantly. Furthermore, in the case of a recordable disk, the control target value of the tilt angle is obtained by recording and reproducing sample data on the disk in the correction mode. By changing this control target value depending on the environment conditions of the apparatus, the optimal control target value is maintained at all times. Moreover, the difference between the recording-time and reproduction-time optimal control target values is leant and stored in the memory device of the apparatus or stored on the disk beforehand. When data is recorded, only the reproduction-time optimal control target value is obtained, and the difference between the recording-time and reproduction-time optimal control target values obtained beforehand is added thereto thereby to obtain the recording-time control target value. As a result, it is possible to reduce the recording area of the disk and recording time required when obtaining the optimal control target value.

What is claimed is:

1. An optical information recording and reproducing apparatus comprising:

a disk on which information is recorded along tracks, an optical pickup having an object lens and means for applying a light spot to the recording face of said disk, a tracking error detection section for detecting the positional displacement amount between said light spot and an information track recorded on said optical disk and for outputting a tracking error signal corresponding to said positional displacement amount, a lens movement section for moving the object lens of said optical pickup in a direction crossing said information tracks, a tracking control section, including a compensation calculation section, for controlling said lens movement section depending on said tracking error signal, an object lens displacement estimation section for estimating the displacement of the optical axis of said object lens from the center position of the light beam of said optical pickup on the basis of the output of said compensation calculation section, an offset detection section for detecting the offset of said tracking error signal, a memory section for storing the output of said offset detection section and the output of said object lens displacement estimation section as a pair, and an offset correction section for outputting the output of said offset detection section corresponding to the output of said object lens displacement estimation section from said memory section and for correcting the offset of said tracking error signal.

2. An optical information recording and reproducing apparatus in accordance with claim 1, wherein said tracking control section is equipped with at least an integration calculation section and a proportional calculation section, and said object lens displacement estimation section is an observer section having a transfer characteristic nearly equal to the transfer characteristic of said lens movement section.

3. An optical information recording and reproducing apparatus in accordance with claim 2, wherein a temperature detection section is provided to detect the temperature around said tracking movement section, and the transfer characteristic of said observer section is changed on the basis of the output of said temperature detection section.

4. An optical information recording and reproducing apparatus in accordance with claim 1, wherein the output of said integration calculation section or the addition signal of the output of said integration calculation section and the output of said proportional calculation section is input to said observer section.

5. An optical information recording and reproducing apparatus in accordance with claim 4, wherein a temperature detection section is provided to detect the temperature around said tracking movement section, and the transfer characteristic of said observer section is changed on the basis of the output of said temperature detection section.

6. An optical information recording and reproducing apparatus in accordance with claim 1, wherein at the time when said tracking control section starts operation from an operation stop state, the offset amount detected by said offset detection section is input to said offset correction section, the amplitude value detected by said amplitude detection section is input to said amplitude correction section, after a lapse of a certain time from the operation start of said tracking control section, the output of said first memory section is input to said offset correction section, and the output of said second memory section is input to said amplitude correction section.

7. An optical information recording and reproducing apparatus comprising:

a disk on which information is recorded along tracks, an optical pickup having an object lens and means for applying a light spot to the recording face of said disk, a tracking error detection section for detecting the positional displacement amount between said light spot and an information track recorded on said optical disk and for outputting a tracking error signal corresponding to said positional displacement amount, a lens movement section for moving said object lens of said optical pickup in a direction crossing said information tracks, a tracking control section including a compensation calculation section, for controlling the said lens movement section depending on said tracking error signal, an object lens displacement estimation section for estimating the displacement of the optical axis of said object lens from the center position of the light beam of said optical pickup on the basis of the output of said compensation calculation section, an amplitude detection section for detecting the amplitude of said tracking error signal, a memory section for storing the output of said amplitude detection section and the output of said object lens displacement estimation section so as to correspond to each other, and an amplitude correction section for outputting the output of said amplitude detection section corresponding to the output of said object lens displacement estimation section from said memory section and for correcting the amplitude value of said tracking error signal.

8. An optical information recording and reproducing apparatus in accordance with claim 7, wherein said tracking control section is equipped with at least an integration calculation section and a proportional calculation section, and said object lens displacement estimation section is equipped with an observer section having a transfer characteristic nearly equal to the transfer characteristic of said lens movement section.

9. An optical information recording and reproducing apparatus in accordance with claim 8, wherein a temperature detection section is provided to detect the temperature around said tracking movement section, and the transfer characteristic of said observer section is changed on the basis of the output of said temperature detection section.

10. An optical information ecording and reproducing apparatus in accordance with claim 7, wherein the output of said integration calculation section or the addition signal of the output of said integration calculation section and the output of said proportional calculation section is input to said observer section.

11. An optical information recording and reproducing apparatus in accordance with claim 10, wherein a temperature detection section is provided to detect the temperature around said tracking movement section, and the transfer characteristic of said observer section is changed on the basis of the output of said temperature detection section.

12. An optical information recording and reproducing apparatus in accordance with claim 7, wherein at the time when said tracking control section starts operation from an operation stop state, the offset amount detected by said offset detection section is input to said offset correction section, the amplitude value detected by said amplitude detection section is input to said amplitude correction section, after a lapse of a certain time from the operation start of said tracking control section, the output of said first memory section is input to said offset correction section, and the output of said second memory section is input to said amplitude correction section.

13. An optical information recording and reproducing apparatus comprising:

a disk on which information is recorded along tracks, an optical pickup having an object lens and means for applying a light spot to the recording face of said disk, a tracking error detection section for detecting the positional displacement amount between said light spot and an information track recorded on said optical disk and for outputting a tracking error signal corresponding to said positional displacement amount, a lens movement section for moving said object lens of said optical pickup in a direction crossing said information tracks, a tracking control section for controlling said lens movement section depending on said tracking error signal, an object lens displacement detection section for detecting the displacement of the optical axis of said object lens from the center position of the light beam of said optical pickup, an offset detection section for detecting the offset of said tracking error signal, a tilt detection section for detecting the tilt amount of the light beam of said optical pickup with respect to said disk face in a direction perpendicular to said information track, a memory section for storing the output of said offset detection section, the output of said object lens displacement detection section and the output of said tilt detection section so as to correspond to one another, and an offset correction section for outputting the output of said offset detection section corresponding to the output of said object lens displacement detection section and the output of said tilt detection section from said memory section and for correcting the offset of said tracking error signal.

14. An optical information recording and reproducing apparatus comprising:

a disk on which information is recorded, an optical pickup having an object lens and means for applying a light spot to the recording face of said disk, a tracking error detection section for detecting the positional displacement amount between said light spot and an information track recorded on said optical disk and for outputting a tracking error signal corresponding to said positional displacement amount, a lens movement section for moving said object lens of said optical pickup in a direction crossing said information tracks, a tracking control section for controlling said lens movement section depending on said tracking error signal, an object lens displacement detection section for detecting the displacement of the optical axis of said object lens from the center position of the light beam of said optical pickup, a tilt detection section for detecting the tilt amount of the light beam of said optical pickup with respect to said disk face in a direction perpendicular to said information track, an amplitude detection section for detecting the amplitude of said tracking error signal, a memory section for storing the output of said amplitude detection section, the output of said object lens displacement detection section and the output of said tilt detection section so as to correspond to one another, and an amplitude correction section for outputting the output of said amplitude detection section corresponding to the output of said object lens displacement detection section and the output of said tilt detection section from said memory section and for correcting the amplitude value of said tracking detection section.

15. An optical information recording and reproducing apparatus for recording or reproducing information on the information tracks of a disk, comprising:

an optical pickup for applying a light spot to the recording face of said disk via an object lens, a pickup movement section having a pickup movement motor for moving said optical pickup in a direction crossing the information tracks on said disk, a movement direction detection section for detecting the movement direction of said optical pickup, a tilt error detection section for detecting the tilt of the optical axis of the light beam of said optical pickup with respect to said disk face and for outputting said tilt as a tilt error signal, a tilt drive section for tilting said optical pickup and said tilt error detection section as an integrated unit, a tilt control section for controlling said tilt drive section depending on said tilt error signal, an offset detection section for detecting the offset of said tilt error signal, a memory section for storing the output of said offset detection section and the output of said movement direction detection section of said optical pickup as a pair, and an offset correction section for reading the output of said offset detection section corresponding to the output of said movement direction detection section of said optical pickup from said memory section and for correcting the offset of said tilt error signal.

16. An optical information recording and reproducing apparatus in accordance with claim 15, wherein the movement direction detection section of said pickup reverses the detection direction of the movement direction of said pickup when said pickup movement motor, rotating in a positive or negative direction, is rotated in the opposite direction by a predetermined rotation angle.

17. An optical information recording and reproducing apparatus in accordance with claim 15, wherein said tilt control section is equipped with at least an integration calculation section and a proportional calculation section, the gains of which are variable, and the gains of said integration calculation section and said proportional calculation section are switched depending on the movement state of said optical pickup.

18. An optical information riding and reproducing apparatus in accordance with claim 15, wherein said tilt error detection section comprises a light source applying light to the recording face of said disk, a two-part split photodetector for receiving reflected light from said disk, an addition section for adding the output signals of said two-part split photodetector, a subtraction section for subtracting the output signals of said two-part split photodetector, and a division section for dividing the output of said subtraction section by the output of said addition section, and the output of said division section is output as a tilt error signal.

19. An optical information recording and reproducing apparatus for recording or reproducing information on the information tracks of a disk, comprising:

an optical pickup for applying a light spot to the recording face of said disk via an object lens, a pickup movement section having a pickup movement motor for moving said optical pickup in a direction crossing the information tracks on said disk, an optical pickup movement direction detection section for detecting the movement direction of said optical pickup, a tilt error detection section, provided in said optical pickup and having a tilt sensor for detecting the tilt angle of the optical axis of the light beam of said optical pickup with respect to said disk face, for outputting a tilt error signal representing said tilt angle, a tilt drive section for tilting said optical pickup and said tilt sensor as an integrated unit, a tilt control section for controlling said tilt drive section depending on said tilt error signal, an offset detection section for detecting the offset of said tilt error signal, a temperature detection section disposed in the vicinity of said tilt sensor, a memory section for storing the output of said offset detection section, the output of said optical pickup movement direction detection section and the output of said temperature detection section as a group, and and an offset correction section for reading the output of said offset detection section corresponding to the output of said optical pickup movement direction detection section and the output of said temperature detection section from said memory section and for correcting the offset of said tilt error signal.

20. An optical information recording and reproducing apparatus comprising:

an optical pickup, including an object lens, for applying a light spot to the recording face of an optical disk on which information is recorded or reproduced on information tracks, a pickup movement section including a pickup movement motor for moving said optical pickup in a direction crossing said information tracks, a tilt error detection section for detecting the tilt amount of the optical axis of the light beam of said optical pickup with respect to said disk face and for outputting the tilt amount as a tilt error signal, a tilt drive section for tilting said optical pickup and said tilt detection section as an integrated unit, a tilt control section for controlling said tilt drive section depending on said tilt error signal so that the tilt amount conforms to a tilt control target value indicating a predetermined tilt amount, and a control target value change section for changing the control target value of said tilt control section.

21. An optical information recording and reproducing apparatus in accordance with claim 20, further comprising a switching section for switching said control target value depending on the reproduction operation or the recording operation for said disk.

22. An optical information recording and reproducing apparatus in accordance with claim 21, comprising:

a reproduction signal amplitude detection section for detecting the amplitude value of the information reproduction signal read by said optical pickup, and a control target value calculation section for calculating said control target values during recording operation and reproduction operation at which the amplitude of the reproduction signal detected by said reproduction signal amplitude detection section is a maximum at the time when recording operation is carried out while said control target value is changed within a predetermined range, and when reproduction operation is carried out in said recorded area.

23. An optical information recording and reproducing apparatus in accordance with claim 21 comprising:

a reproduction signal pulse change amount detection section for detecting the pulse width change amount of the information reproduction signal read by said optical pickup, and a control target value calculation section for calculating said control target values during recording operation and reproduction operation at which the change amount detected by said reproduction signal pulse width change amount detection section is a minimum at the time when recording operation is carried out while said control target value is changed within a predetermined range, and when reproduction operation is carried out in said recorded area.

24. An optical information recording and reproducing apparatus in accordance with claim 21 comprising:

a reproduction signal amplitude detection section for detecting the amplitude amount of the information reproduction signal read by said optical pickup, a control target difference memory section for storing the difference between said control target values during said recording operation and reproduction operation, and a reproduction-time control target value calculation section for calculating said control target value at which the amplitude of the reproduction signal detected by said reproduction signal amplitude detection section is a maximum at the time when recording operation is carried out while said control target value is set at a predetermined value, and when reproduction operation is carried out in said recorded area, wherein the sum of the control target value calculated by said reproduction-time control target value calculation section and the stored value of said control target difference memory section is set as a control target value during recording operation.

25. An optical information recording and reproducing apparatus in accordance with claim 21 comprising:

a reproduction signal pulse change amount detection section for detecting the pulse width change amount of the information reproduction signal read by said optical pickup, a control target difference memory section for storing the difference between said control target values during said recording operation and reproduction operation, and a reproduction-time control target value calculation section for calculating said control target value at which the change amount detected by said reproduction signal pulse width change amount detection section is a minimum at the time when recording operation is carried out while said control target value is set at a predetermined value, and when reproduction operation is carried out in said recorded area, wherein the sum of the control target value calculated by said reproduction-time control target value calculation section and the stored value of said control target difference memory section is set as a control target value during recording operation.

26. An optical information recording and reproducing apparatus in accordance with claim 21, comprising, in an area provided on said disk in which the difference between said control target values during said recording operation and reproduction operation on the basis of the output of said reproduction signal amplitude detection section for detecting the amplitude amount of the information reproduction signal read by said optical pickup is stored, a reproduction-time control target value calculation section for calculating said control target value at which the amplitude of the reproduction signal detected by said reproduction signal amplitude detection section is a maximum at the time when recording operation is carried out while said control target value is set at a predetermined value, and when reproduction operation is carried out in said recorded area, wherein the sum of the control target value calculated by said reproduction-time control target value calculation section and the stored value of said control target difference memory section is set as a control target value during recording operation.

27. An optical information recording and reproducing apparatus in accordance with claims 21, comprising, in an area provided on said disk in which the difference between said control target values during said recording operation and reproduction operation on the basis of the output of said reproduction signal pulse change amount detection section for detecting the pulse width change amount of the information reproduction signal read by said optical pickup is stored,
   a reproduction-time control target value calculation section for calculating said control target value at which the change amount detected by said reproduction signal pulse width change amount detection section is a minimum at the time when recording operation is carried out while said control target value is set at a predetermined value, and when reproduction operation is carried out in said recorded area, wherein the sum of the control target value calculated by said reproduction-time control target value calculation section and the stored value of said control target difference memory section is set as a control target value during recording operation.

28. An optical information recording and reproducing apparatus in accordance with claim 20, wherein said control target value is changed when the change in the environment condition of said optical information recording and reproducing apparatus exceeds a predetermined range.

29. An optical information recording and reproducing apparatus in accordance with claim 28, wherein said environment conditions include the changes in temperature, humidity, atmospheric pressure and the change with time in the environment of said optical information recording and reproducing apparatus, the change of an optical memory apparatus or the change of a disk.

30. An optical information recording and reproducing method for recording or reproducing information on the information tracks of a disk, comprising:
   a step of moving an optical pickup for applying a light spot to the recording face of said disk via an object lens in a direction crossing the information tracks on said disk,
   a step of detecting the movement direction of said optical pickup,
   a step of detecting the tilt of the optical axis of the light beam of said optical pickup with respect to said disk face and of outputting the tilt as a tilt error signal from said tilt error detection section,
   a step of tilting said optical pickup and said tilt error detection section as an integrated unit,
   a step of controlling said tilt drive section depending on said tilt error signal,
   a step of detecting the offset of said tilt error signal by using said offset detection section,
   a step of storing the output of said offset detection section and the output of the movement direction detection section of said optical pickup as a pair, and
   a step of reading the output of said offset detection section corresponding to the output of the movement direction detection section of said optical pickup from said memory section and of correcting the offset of said tilt error signal.

31. An optical information recording and reproducing method for recording or reproducing information on the information tracks of a disk, comprising:
   a step of moving an optical pickup for applying a light spot to the recording face of said disk via an object lens in a direction crossing the information tracks on said disk,
   a step of detecting the movement direction of said optical pickup,
   a step of detecting the tilt angle of the optical axis of the light beam of said optical pickup with respect to said disk face by using a tilt sensor provided in said optical pickup,
   a step of detecting a tilt error signal representing said tilt angle and of outputting said signal,
   a step of tilting said optical pickup and said tilt sensor as an integrated unit,
   a step of controlling said tilt drive section depending on said tilt error signal,
   a step of detecting the offset of said tilt error signal by using said offset detection section,
   a step of detecting the temperature in the vicinity of said tilt sensor,
   a step of storing the output of said offset detection section, the detection output of the movement direction of said optical pickup and the detection output of said temperature as a group, and
   a step of reading the output of said offset detection section corresponding to the detection output in the movement direction of said optical pickup and the detection output of said temperature from said memory section and of correcting the offset of said tilt error signal.

32. An optical information recording and reproducing method comprising:
   a step of moving an optical pickup, including an object lens, for applying a light spot to the recording face of an optical disk, on the information tracks of which information is recorded or reproduced, in a direction crossing said information tracks,
   a step of detecting the tilt amount of the optical axis of the light beam of said optical pickup with respect to said disk face and of outputting the tilt amount as a tilt error signal,
   a step of tilting said optical pickup and said tilt detection section as an integrated unit,
   a step of controlling said tilt drive section depending on said tilt error signal so that said tilt amount conforms to a tilt control target value indicating a predetermined tilt amount, and
   a control target value change step of changing the control target value of said tilt control section.

33. An optical information recording and reproducing method comprising:
   a step of moving an optical pickup, including an object lens, for applying a light spot to the recording face of an optical disk, on the information tracks of which information is recorded or reproduced, in a direction crossing said information tracks,
   a step of detecting the tilt amount of the optical axis of the light beam of said optical pickup with respect to said disk face and of outputting the tilt amount as a tilt error signal, a step of tilting said optical pickup and said tilt detection section as an integrated unit, a step of controlling said tilt drive section depending on said tilt error signal so that said tilt amount conforms to a tilt control target value indicating a predetermined tilt amount, a control target value change step of changing the control target value of said tilt control section, and a step of recording said tilt control target value in a predetermined area on said disk.

34. An optical information recording and reproducing method in accordance with claim 33, wherein a predetermined area on said disk is set on the inner circumferential side from an area determined as a data recording area, and this area is used to record said tilt control target value.

* * * * *

UNITED STATES PATENT AND TRADEMARK OFFICE
CERTIFICATE OF CORRECTION

PATENT NO. : 6,434,096 B1
DATED : August 13, 2002
INVENTOR(S) : Noritaka Akagi et al.

It is certified that error appears in the above-identified patent and that said Letters Patent is hereby corrected as shown below:

Title page,
Item [56], References Cited, FOREIGN PATENT DOCUMENTS, please delete
"JP      6-318331      11/1999", and insert therefor
-- JP  6-318331      11/1994 --.

Figure 44:
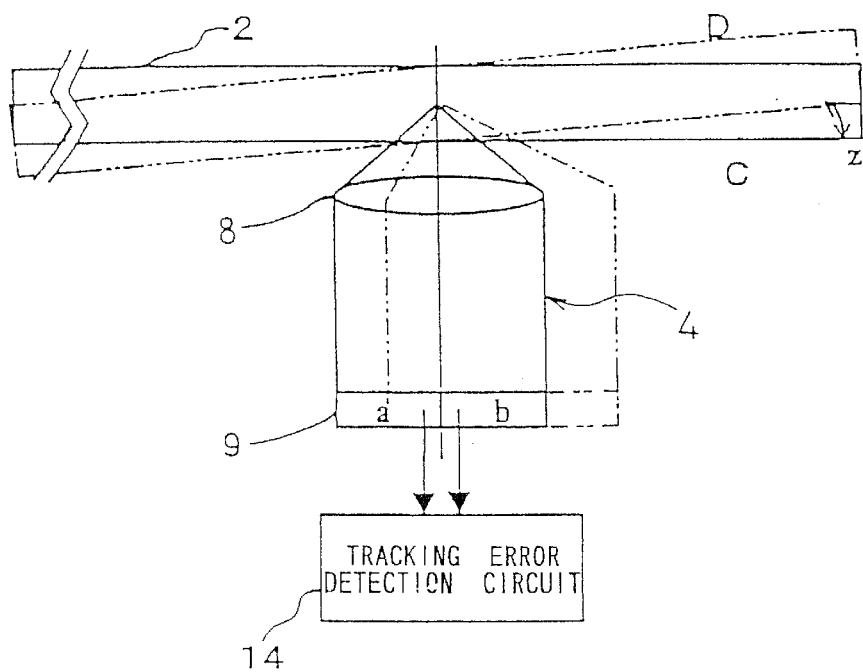
FIG. 44(a) is a side view showing the positions of the optical axis and the two-part split PD at the time when the disk is tilted, (b) is a graph showing the tracking error signal with respect to the positional displacement of the object lens because of the tilt of the disk.
Figure 44:
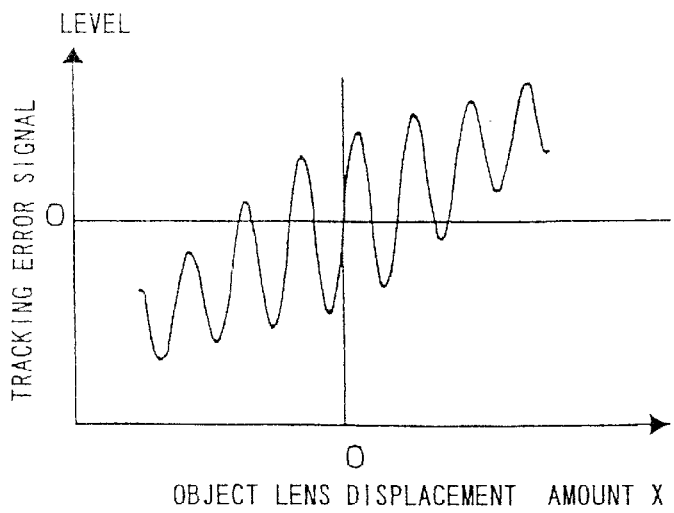
Figure 45:
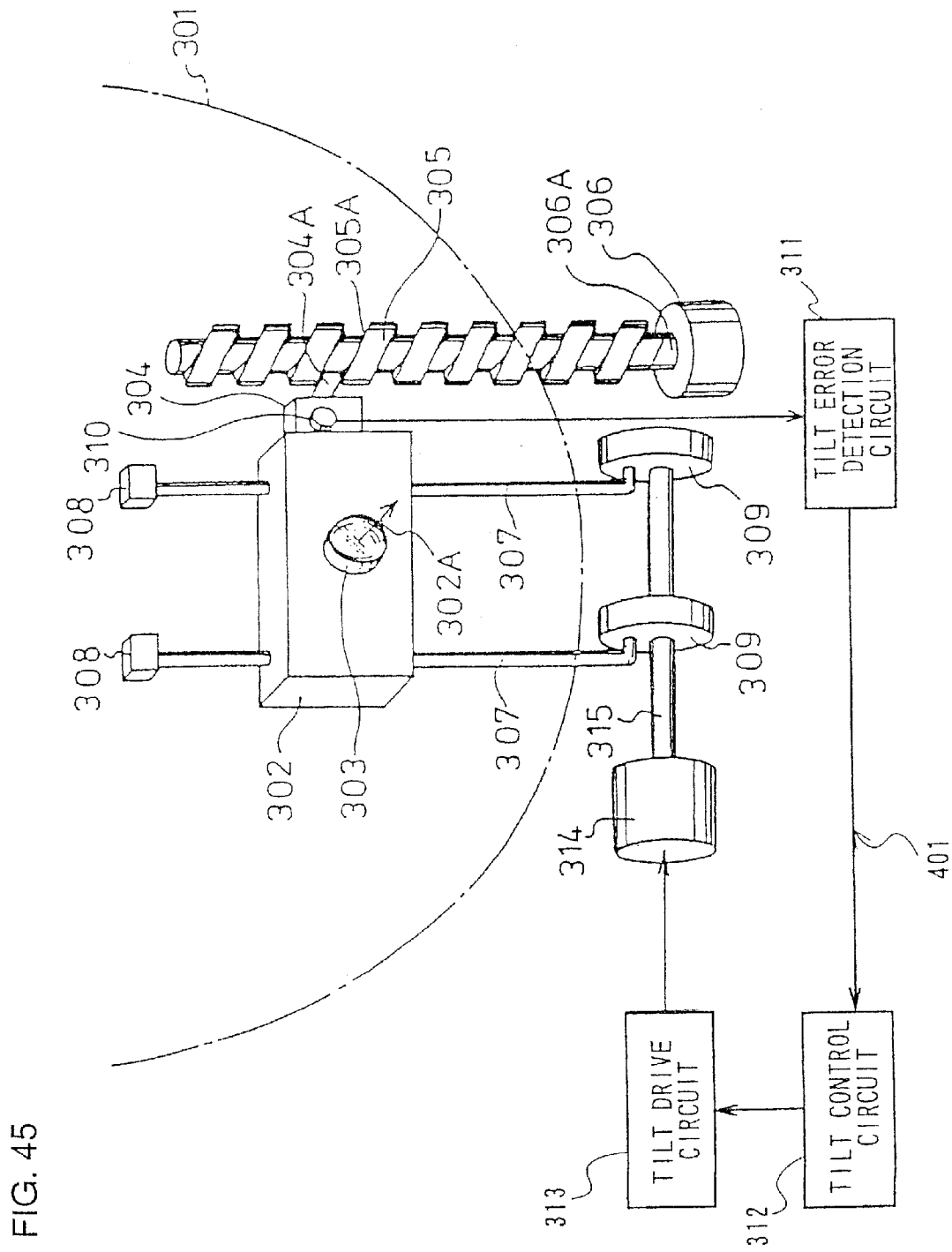
FIG. 45 is a block diagram showing the configuration of another conventional optical information recording and reproducing apparatus.

Column 4,
Lines 19 and 20, please delete "(sic FIG. 44(b))"
Line 58, please delete "ends", and insert therefor -- end --.

Column 6,
Lines 10 and 11, please delete "(sic two-dot chain lines)".

Figure 50:
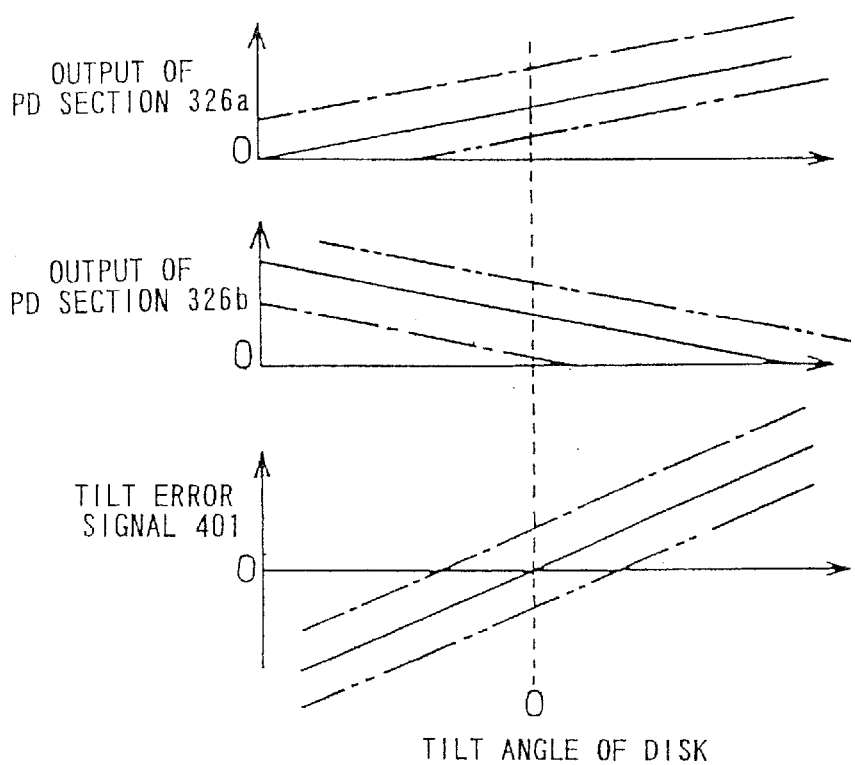
FIG. 50(a) is a graph showing the relationship between the tilt angle of the disk, the output of the two-part split PD and the tilt error signal at the time when the lead screw rotates in the conventional optical information recording and reproducing apparatus, and (b) is a graph showing the relationship between the tilt angle of the disk, the output of the two-part split PD and the tilt error signal at the time when the reflectivity of the disk changes in the conventional optical information recording and reproducing apparatus.
Figure 50:
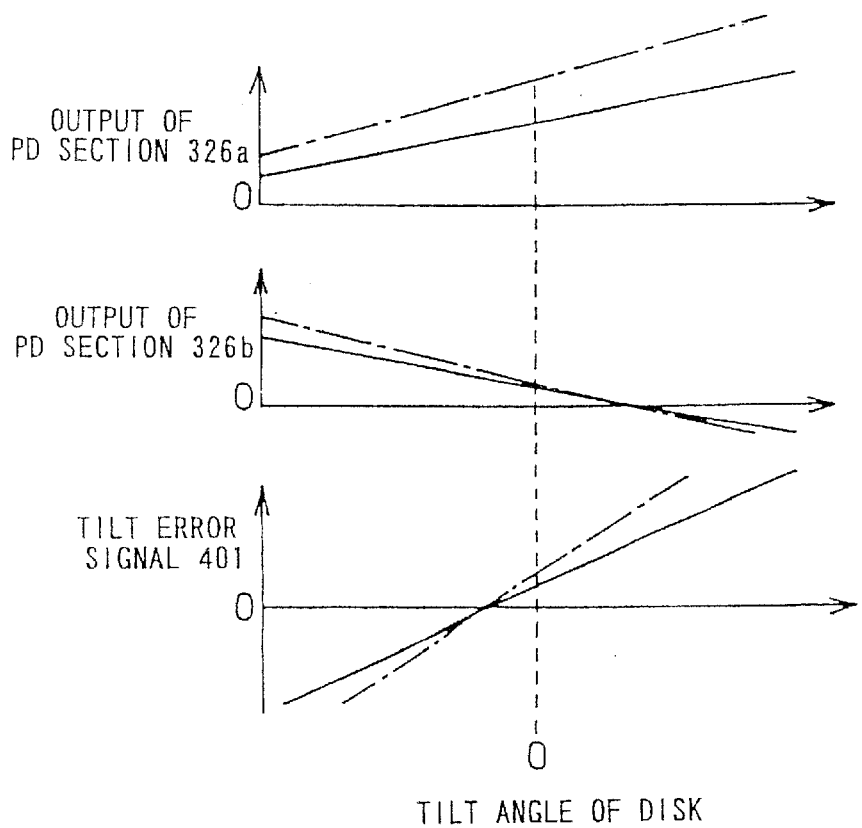

Column 7,
Line 7, please delete "(sic FIG. 50(a))".
Line 27, please delete "becomes", and insert therefor -- become --.
Line 49, please delete "FIG. 51", and insert therefor -- FIGS. 51(a) through 51(i) --.
Line 57, please delete "(b)", and insert therefor -- 51(b) --.

Column 8,
Line 53, please delete "(sic FIG. 51(i))".

Column 11,
Line 36, please delete "other", and insert therefor -- another --.

Column 13,
Line 30, please delete "other", and insert therefor -- another .

Column 14,
Line 27, please delete "(sic a step)".

Column 15,
Line 4, please delete "(b) and (c)", and insert therefor -- FIGS. 2(b) and 2(c) --.
Line 11, please delete "(b)", and insert therefor -- FIG. 3(b) --.
Line 19, please delete "(b)", and insert therefor -- FIG. 4(b) --.
Line 27, please delete "(b)", and insert therefor -- 6(b) --.
Line 30, please delete "(b)", and insert therefor -- 7(b) --.
Line 33, please delete "(b)", and insert therefor -- 8(b) --.
Line 46, please delete "(b) and (c)", and insert therefor -- FIGS. 11(b) and 11(c) --.
Line 61, please delete "(b)" and insert therefor -- 15(b) --.

UNITED STATES PATENT AND TRADEMARK OFFICE
CERTIFICATE OF CORRECTION

PATENT NO. : 6,434,096 B1
DATED : August 13, 2002
INVENTOR(S) : Noritaka Akagi et al.

It is certified that error appears in the above-identified patent and that said Letters Patent is hereby corrected as shown below:

Column 16,
Line 9, please delete "(b)", and insert therefor -- FIG. 18(b) --.
Line 27, please delete "(b)", and insert therefor -- 23(b) --.
Line 53, please delete "(e)", and insert therefor -- 30(e) --.

Figure 43:
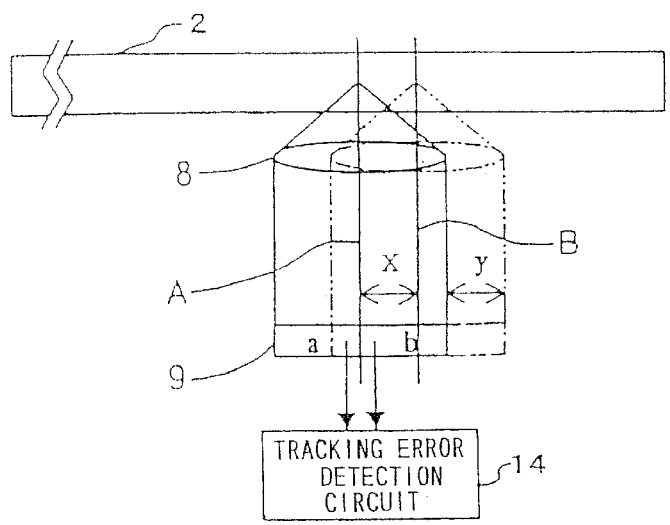
FIG. 43(a) is a side view showing the positions of an optical axis and a two-part split PD at the time when an object lens displacement occurs, (b) is a graph showing the change in the level of the tracking error signal with respect to the positional displacement amount of the object lens, and (c) is a graph showing the tracking error signal at the time when the tracking control loop is switched from OFF to ON in a state wherein an object lens displacement occurs in the conventional optical information recording and reproducing apparatus.
Figure 43B:
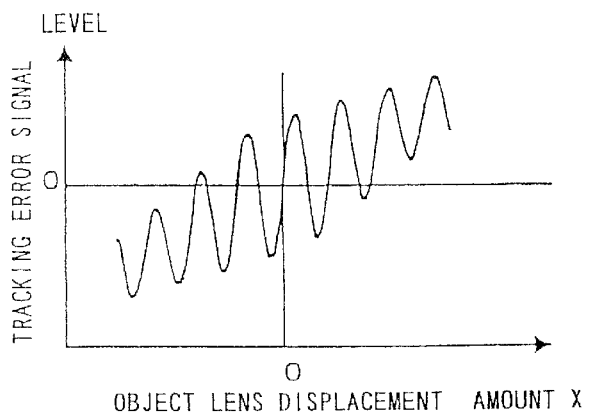
Figure 43:
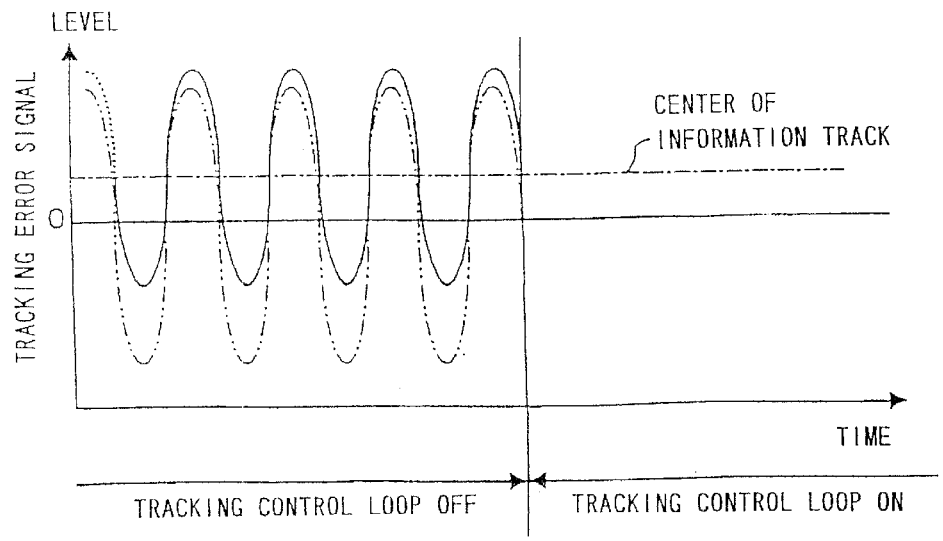
Figure 47:
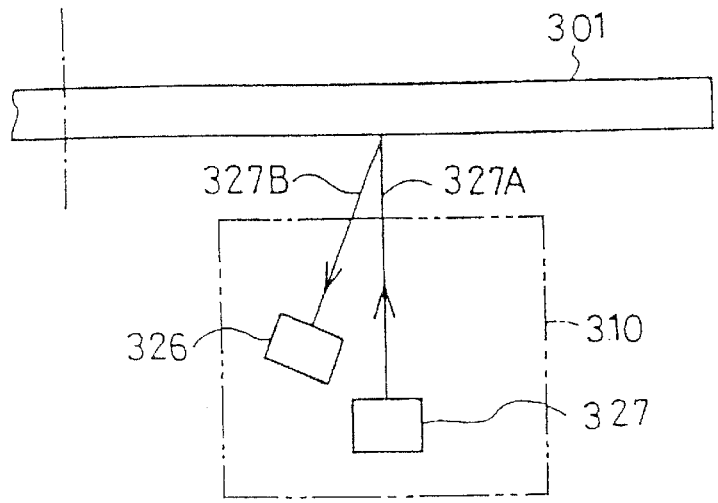
FIG. 47(a) is a side view showing the positional relationship between the light source of the tilt sensor and the two-part split PD of the conventional optical information recording and reproducing apparatus, and (b) is a plan view showing the two-part split PD having received a light beam.
Figure 47:
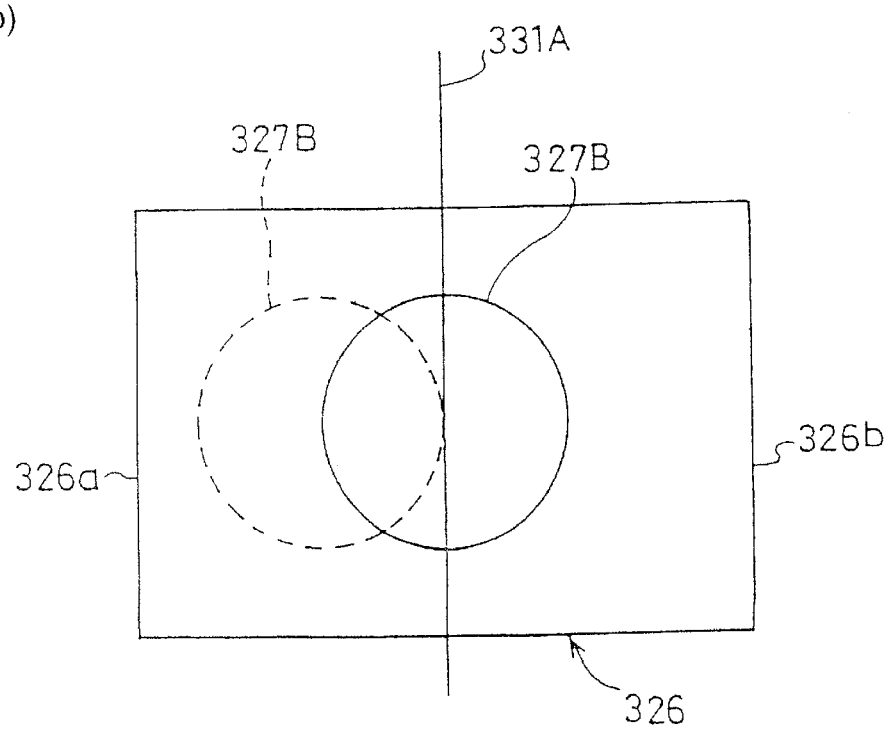
Figure 48:
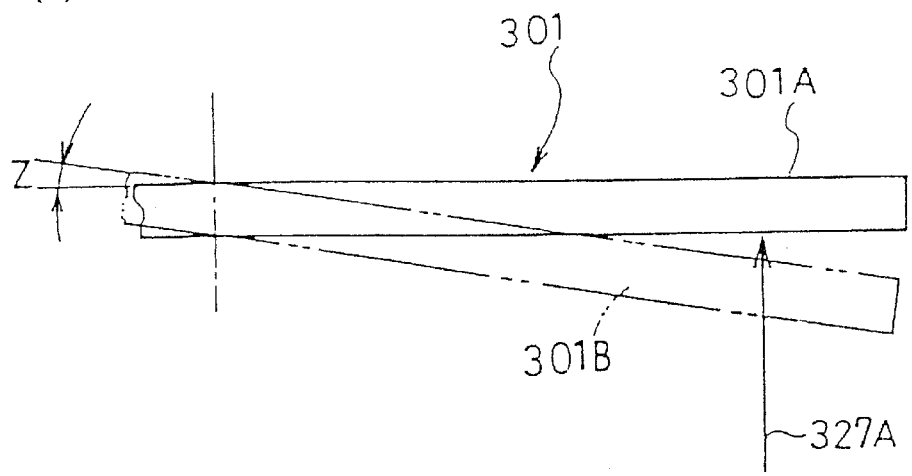
FIG. 48(a) is a side view showing the tilt of the disk 301, and (b) is a graph showing the changes in the outputs of the PD sections of the two-part split PD and the tilt error signal with respect to the tilt angle of the disk.
Figure 48:
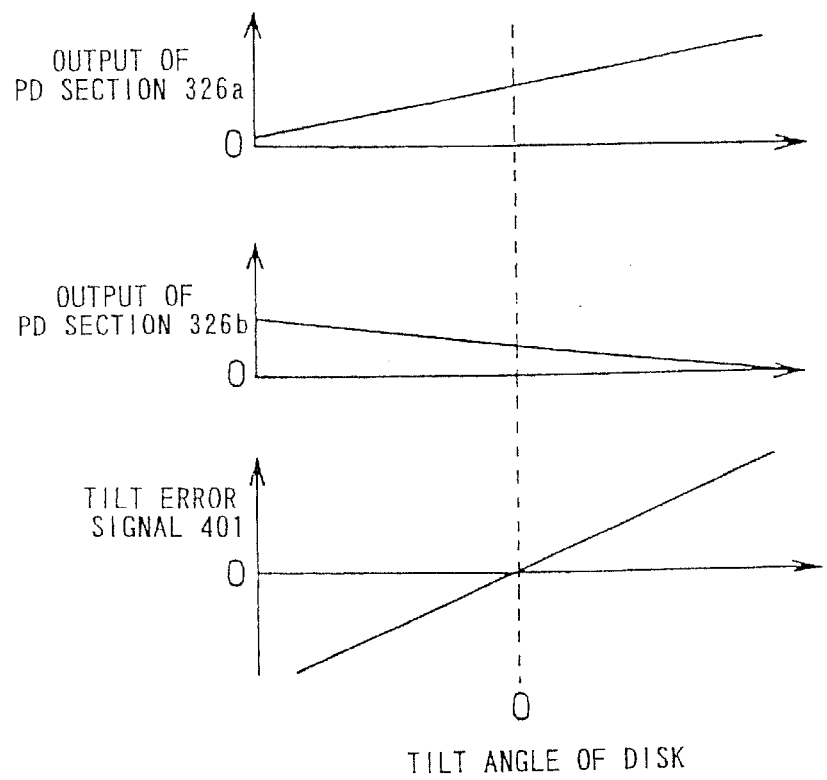
Figure 49:
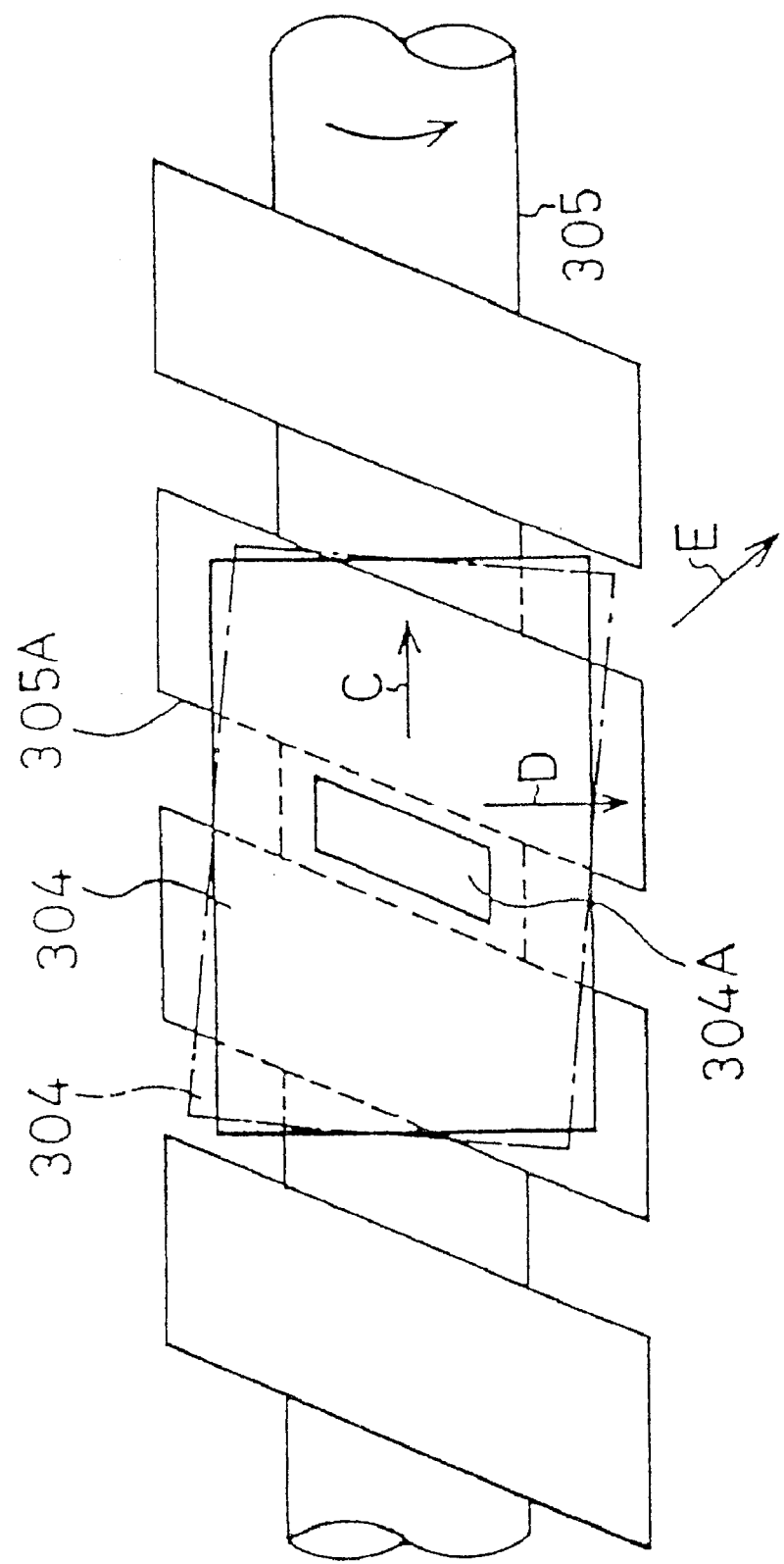
FIG. 49 is a side view showing a force exerted to the lead rack at the time when the lead screw of the conventional optical information recording and reproducing apparatus rotates.

Column 17,
Line 20, please delete "(b)", and insert therefor -- FIG. 38(b) --.
Line 40, please delete "(b)", and insert therefor -- FIG. 43(b) --.
Line 43, please delete "(c)", and insert therefor -- FIG. 43(c) --.
Line 50, please delete "(b)", and insert therefor -- FIG. 44(b) --.
Line 64, please delete "(b)", and insert therefor -- FIG. 47(b) --.
Line 67, please delete "(b)", and insert therefor -- FIG. 48(b) --.

Column 18,
Line 11, please delete "(b)", and insert therefor -- FIG. 50(b) --.
Line 18, please delete "FIGS. 51(a), (b) and (i)", and insert therefor -- FIG. 51(a), 51(b) and 51(i) --.
Line 20, please delete "(c) and (f)", and insert therefor -- FIGS. 51(c) and 51(f) --.
Line 20, please delete "(d), (e), (g) and (h)", and insert therefor -- FIGS. 51(d), 51(e), 51(g) and 51(h) --.
Line 30, please delete "8", and insert therefor -- 8(b) --.

Column 24,
Line 32, please delete "FIG. 6", and insert therefor -- FIGS. 6(a) and 6(b) --.
Line 35, please delete "(b)", and insert therefor -- 6(b) --.
Line 52, please delete "(sic 502)".

Column 25
Line 63, please delete "FIG. 5 (sic FIG. 6)", and insert therefor -- FIGS. 6(a) and 6(b) --.
Line 63, please delete "representedby", and insert therefor -- represented by --.
Line 65, please delete "(b)", and insert therefor -- 7(b) --.

Column 26,
Lines 3 and 6, please delete "(b)", and insert therefor -- 7(b) --.
Line 65, please delete "(b)", and insert therefor -- 8(b) --.

Column 27,
Lines 4 and 5, please delete "(b)", and insert therfor -- 8(b) --.

UNITED STATES PATENT AND TRADEMARK OFFICE
CERTIFICATE OF CORRECTION

PATENT NO.      : 6,434,096 B1
DATED           : August 13, 2002
INVENTOR(S)     : Noritaka Akagi et al.

It is certified that error appears in the above-identified patent and that said Letters Patent is hereby corrected as shown below:

Column 28,
Line 25, please delete "GE (Sic)".

Column 29,
Line 9, please delete "(sic 37)".
Line 35, please delete "FIG. 11", and insert therefor -- FIGS. 11(a) through 11(c) --.
Line 36, please delete "FIG. 11 is", and insert therefor -- FIGS. 11(a) through 11(c) are --.
Line 47, please delete "(sic 32)".

Column 31,
Line 1, please delete "(sic control)".
Line 2, please delete "(sic drive)".
Line 2, please delete "(sic 16)".
Line 64, please delete "(sic 24)".
Lines 65 and 66, please delete "25 (sic 24)", and insert therefor -- 24 --.

Column 33,
Line 4, please delete "(sic 8)".
Line 5, please delete "(sic S78)".
Line 15, please delete "(b)", and insert therefor -- 15(b) --.

Column 35,
Line 34, please delete "and 18", and insert therefor -- through 18(b) --.

Column 36,
Line 59, please delete "to 23", and insert therefor -- through 23(b) --.

Column 37,
Line 27, please delete "and 23", and insert therefor -- through 23(b) --.

Column 38,
Line 21, please delete "(sic 373)".

Column 39,
Line 9, please delete "FIG. 23", and insert therefor -- FIGS. 23(a) and 23(b) --.
Line 11, please delete "(b)", and insert therefor -- FIG. 23(b) --.
Line 12, please delete "(b)", and insert therefor -- 23(b) --.
Line 27, please delete "(sic 312A)".

UNITED STATES PATENT AND TRADEMARK OFFICE
CERTIFICATE OF CORRECTION

PATENT NO. : 6,434,096 B1
DATED : August 13, 2002
INVENTOR(S) : Noritaka Akagi et al.

It is certified that error appears in the above-identified patent and that said Letters Patent is hereby corrected as shown below:

Column 41,
Line 9, please delete "to 30", and insert therefor -- through 30(e) --.
Line 65, please delete "(e)", and insert therefor -- 30(e) --.
Line 65, please delete "FIG. 30", and insert therefor -- FIGS. 30(a) through 30(e) --.

Column 42,
Line 3, please delete "(b)", and insert therefor -- 30(b) --.
Lines 50 and 51, please delete "FIG. 51", and insert therefor -- FIGS. 51(a) through 51(i) --.
Line 67, please delete "(g)", and insert therefor -- 51(g) --.

Column 45,
Line 5, please delete "(b)", and insert therefor -- 51(b) --.
Line 59, please delete "an-example", and insert therefor -- an example --.
Line 67, please delete "whereby", and insert therefor -- hereby --.

Column 46,
Line 5, please delete "51", and insert therefor -- 51(a) through 51(e) --.
Line 31, please delete "describe", and insert therefor -- described --.

Column 47,
Line 27, please delete "(b)", and insert therefor -- 51(b) --.

Column 48,
Line 2, please delete "9 (sic 10)", and insert therefor -- 10 --.
Line 5, please delete "51", and insert therefor -- 51(a) through 51(i) --.

Column 49,
Line 67, please delete "38 and 51", and insert therefor -- 38(a), 38(b) and 51(a) through 51(e) --.

Column 54,
Line 14, please delete "leant", and insert therefor -- learnt --.

UNITED STATES PATENT AND TRADEMARK OFFICE
CERTIFICATE OF CORRECTION

PATENT NO.   : 6,434,096 B1
DATED        : August 13, 2002
INVENTOR(S)  : Noritaka Akagi et al.

It is certified that error appears in the above-identified patent and that said Letters Patent is hereby corrected as shown below:

Column 56,
Line 21, please delete "ecording", and insert therefor -- recording --.

Signed and Sealed this

Thirty-first Day of August, 2004

JON W. DUDAS
*Director of the United States Patent and Trademark Office*